United States Patent
Edge et al.

(10) Patent No.: US 9,491,575 B2
(45) Date of Patent: Nov. 8, 2016

(54) POSITIONING BEACONS WITH WIRELESS BACKHAUL

(71) Applicant: QUALCOMM Incorporated, San Diego, CA (US)

(72) Inventors: Stephen William Edge, Escondido, CA (US); Edward George Tiedemann, Jr., Concord, MA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/738,312

(22) Filed: Jun. 12, 2015

(65) Prior Publication Data

US 2015/0365790 A1    Dec. 17, 2015

Related U.S. Application Data

(60) Provisional application No. 62/022,109, filed on Jul. 8, 2014, provisional application No. 62/012,087, filed on Jun. 13, 2014.

(51) Int. Cl.
| | |
|---|---|
| H04W 4/02 | (2009.01) |
| G01S 5/06 | (2006.01) |
| H04W 64/00 | (2009.01) |
| G01S 5/00 | (2006.01) |

(Continued)

(52) U.S. Cl.
CPC .............. *H04W 4/02* (2013.01); *G01S 1/042* (2013.01); *G01S 1/20* (2013.01); *G01S 5/0018* (2013.01); *G01S 5/0081* (2013.01); *G01S 5/06* (2013.01); *H04W 4/22* (2013.01); *H04W 12/08* (2013.01); *H04W 40/244* (2013.01); *H04W 64/003* (2013.01); *H04W 72/1263* (2013.01); *H04W 88/04* (2013.01); *H04W 88/16* (2013.01); *G01S 5/0221* (2013.01)

(58) Field of Classification Search
CPC ........ H04W 4/02; H04W 4/22; H04W 12/08
USPC ...................................... 455/404.2
See application file for complete search history.

(56) References Cited

U.S. PATENT DOCUMENTS

| | | | |
|---|---|---|---|
| 2009/0109924 A1* | 4/2009 | Sato ................. | H04W 36/0055 370/331 |
| 2010/0099435 A1* | 4/2010 | Druzinic-Fiebach et al. ......................... | 455/456.3 |

(Continued)

FOREIGN PATENT DOCUMENTS

| | | |
|---|---|---|
| WO | 2012075052 A1 | 6/2012 |
| WO | 2014060225 A1 | 4/2014 |

OTHER PUBLICATIONS

Choi J., Yun, J. Y., & Oh, H. (Jun. 10, 2011). "Time Synchronization for M-WiMAX Femtocells using IEEE 802.11 based Wireless Backhaul", IEICE Electronics Express, 8(11), 795-801. doi:10.1587/elex.8.795.

(Continued)

*Primary Examiner* — Michael Neff
(74) *Attorney, Agent, or Firm* — Hunter Clark PLLC

(57) ABSTRACT

A method includes establishing, at a positioning beacon, a wireless backhaul connection to a communication network; receiving, at the positioning beacon, scheduling information for a positioning reference signal (PRS) from the communication network over the wireless backhaul; and transmitting, from the positioning beacon, the PRS according to the scheduling information.

66 Claims, 25 Drawing Sheets

(51) Int. Cl.

| | | |
|---|---|---|
| *H04W 4/22* | (2009.01) | |
| *H04W 12/08* | (2009.01) | |
| *H04W 40/24* | (2009.01) | |
| *H04W 72/12* | (2009.01) | |
| *H04W 88/04* | (2009.01) | |
| *H04W 88/16* | (2009.01) | |
| *G01S 1/04* | (2006.01) | |
| *G01S 1/20* | (2006.01) | |
| *G01S 5/02* | (2010.01) | |

(56) References Cited

U.S. PATENT DOCUMENTS

| | | | |
|---|---|---|---|
| 2012/0082161 A1* | 4/2012 | Leung et al. | 370/392 |
| 2012/0094687 A1* | 4/2012 | Choi et al. | 455/456.1 |
| 2012/0100855 A1* | 4/2012 | Zhang | H04B 7/155 455/436 |
| 2012/0165012 A1* | 6/2012 | Fischer et al. | 455/435.1 |
| 2012/0258730 A1* | 10/2012 | Tinnakornsrisuphap et al. | 455/456.1 |
| 2013/0040558 A1* | 2/2013 | Kazmi | H04W 16/26 455/9 |
| 2013/0163440 A1 | 6/2013 | Issakov et al. | |
| 2013/0324154 A1* | 12/2013 | Raghupathy | G01S 19/10 455/456.1 |
| 2014/0010206 A1 | 1/2014 | Bi et al. | |
| 2014/0099970 A1 | 4/2014 | Siomina et al. | |
| 2014/0106782 A1 | 4/2014 | Chitre et al. | |
| 2014/0126530 A1 | 5/2014 | Siomina et al. | |
| 2014/0162686 A1 | 6/2014 | Lee et al. | |
| 2014/0185480 A1* | 7/2014 | Lee | H04W 36/30 370/252 |
| 2015/0131750 A1* | 5/2015 | Xue | H04B 7/0482 375/267 |

OTHER PUBLICATIONS

International Search Report and Written Opinion—PCT/US2015/035708—ISA/EPO—Oct. 9, 2015, 11 pgs.

International Preliminary Report on Patentability—PCT/US2015/035708—European Patent Office—Berlin, Germany—May 6, 2016—5 pgs.

(ROC) Taiwan Intellectual Property Office (TIPO)—Search Report (Translation) for Application No. 104119298—Jul. 22, 2016—2 pgs.

* cited by examiner

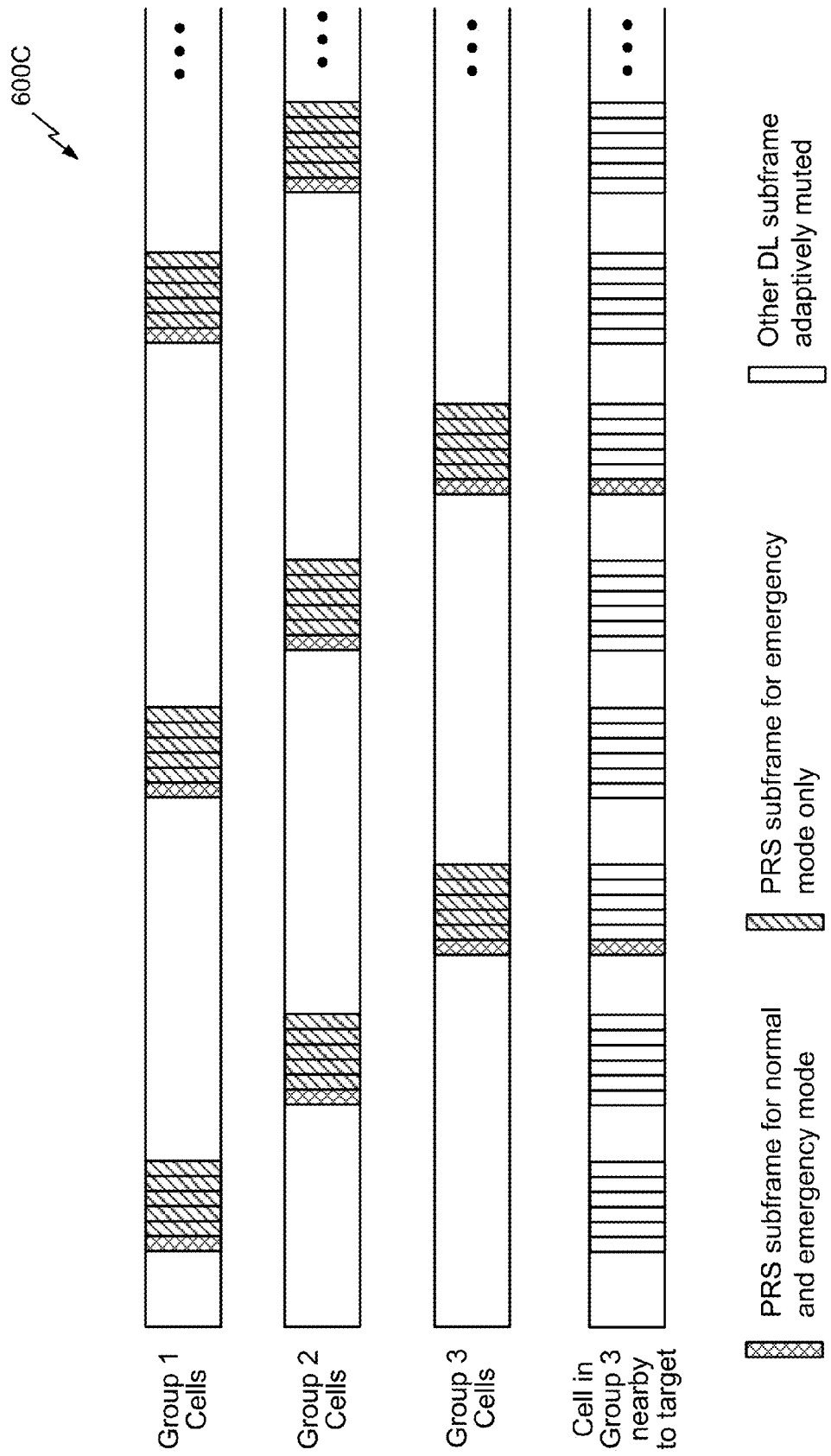

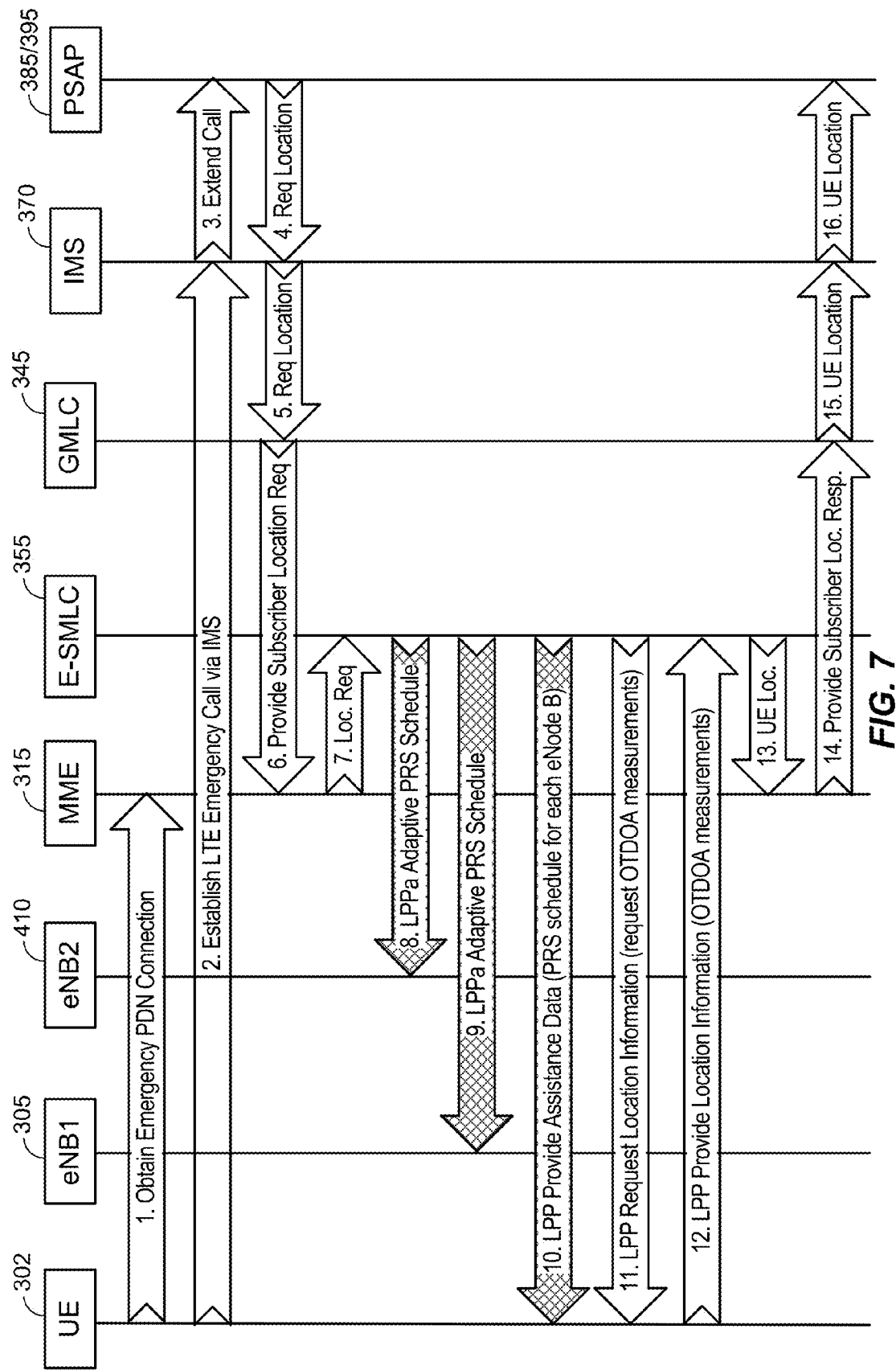

POSITIONING BEACONS WITH WIRELESS BACKHAUL

CROSS-REFERENCE TO RELATED APPLICATIONS

This application claims the benefit of U.S. Provisional Application No. 62/012,087, entitled "Standalone eNB Beacons for TBS with Wireless Backhaul," filed Jun. 13, 2014, and U.S. Provisional Application No. 62/022,109, entitled "Positioning Beacons with Wireless Backhaul," filed Jul. 8, 2014, both of which are assigned to the assignee hereof and expressly incorporated herein by reference.

BACKGROUND OF THE DISCLOSURE

1. Field of the Disclosure

Aspects of the disclosure are related to positioning beacons with wireless backhaul for indoor location of a mobile device or terminal.

2. Description of the Related Art

Wireless communication systems have developed through various generations, including a first-generation analog wireless phone service (1G), a second-generation (2G) digital wireless phone service and third-generation (3G) and fourth-generation (4G) high speed data/Internet-capable wireless services.

More recently, Long Term Evolution (LTE) has been developed by the $3^{rd}$ Generation Partnership Project (3GPP) as a radio access network technology for wireless communication of high-speed data for mobile phones and other data terminals. LTE has evolved from the Global System for Mobile access (GSM) and from derivatives of GSM, such as Enhanced Data rates for GSM Evolution (EDGE), Universal Mobile Telecommunications System (UMTS), and High-Speed Packet Access (HSPA).

In North America, wireless communications systems, such as LTE, use a solution for Enhanced 911, or E911, that links emergency callers with the appropriate public resources. The solution attempts to automatically associate the caller, i.e., the caller's user equipment (UE), with a specific location, such as a physical address or geographic coordinates. Automatically locating the caller with high accuracy (e.g. with a distance error of 50 meters or less) and providing the location to a Public Safety Answering Point (PSAP) can increase the speed with which the public safety side can locate the required resources during emergencies, especially where the caller may be unable to communicate his/her location.

To locate a UE geographically, there are several approaches. One is to use some form of terrestrial radio location based on measurements made by a UE of signals transmitted by wireless network base stations and access points and/or based on measurements made by network elements (e.g. base stations and access points (APs)) of signals transmitted by the UE. Another approach is to use a Global Positioning System (GPS) receiver or Global Navigation Satellite System (GNSS) receiver built into the UE itself. Terrestrial radio location in a cellular telephony system may use measurements made by a UE of transmission timing differences between pairs of base stations or APs and may employ trilateration or multilateration techniques to determine the position of the UE based on two, or more commonly three or more, timing difference measurements. One such terrestrial radio location method that is applicable to measurements of LTE base stations (referred to as eNodeBs or eNBs) and that is standardized by 3GPP in 3GPP Technical Specifications (TSs) 36.211, 36.214, 36.305, 36.355 and 36.455 is Observed Time Difference of Arrival (OTDOA). OTDOA is a multilateration method in which the UE measures the time difference between specific signals, which may be positioning reference signals (PRS), from pairs of eNodeBs and either computes a location itself from these measurements or reports the measured time differences (known as reference signal time differences (RSTDs), to an Enhanced Serving Mobile Location Center (E-SMLC) or to a Secure User Plane Location (SUPL) Location Platform (SLP) which then computes the UE location. In either case, the measured time differences and knowledge of the eNodeBs' locations and relative (or synchronized) transmission timing are used to calculate the UE's position.

Determination of an accurate location of a UE indoors may often be challenging. For example, signals from GPS or other GNSS satellites (e.g., for the Galileo, Glonass or Beidou GNSS systems) are usually attenuated and subject to multipath and often difficult to acquire and accurately measure by a UE when the UE is indoors. Signals transmitted from network base stations (e.g., LTE eNBs) may be received and measured by a UE in the case of a serving base station or other nearby base station but are typically also difficult to acquire and measure from a sufficient number of base stations to enable accurate location when a UE is indoors. There is thus a benefit to enhancing positioning methods such as OTDOA to enable more accurate location indoors. Furthermore, any enhancements in indoor positioning accuracy for a method such as OTDOA may be used not only to accurately locate a UE that is making an E911 call but may also be used to locate a UE accurately for other purposes—e.g., to locate a lost child or guide a user to some destination inside a large building. Therefore the embodiments and examples described herein to improve location accuracy for a UE that is indoors or in a difficult outdoor environment such as a dense urban area may be used to locate the UE in the case of an emergency call or for other reasons.

SUMMARY

A first example of a method as described herein includes establishing, at a positioning beacon, a wireless backhaul connection to a communication network; receiving, at the positioning beacon, scheduling information for a positioning reference signal (PRS) from the communication network over the wireless backhaul; and transmitting, from the positioning beacon, the PRS according to the scheduling information.

A second example of a method as described herein includes obtaining, at a location server in a communication network, configuration information for a positioning beacon, where the positioning beacon has a wireless backhaul connection to the communication network; receiving, at the location server, a request for positioning of a user equipment (UE) within communication range of the positioning beacon; and transmitting a positioning reference signal (PRS) scheduling adjustment instruction from the location server to the positioning beacon in response to the receiving the request for positioning of the UE and based on the configuration information.

An example of a positioning beacon for providing a positioning reference signal includes means for establishing a wireless backhaul connection to a communication network; means for receiving scheduling information for a positioning reference signal (PRS) from the communication network over the wireless backhaul connection; and means for transmitting the PRS according to the scheduling information.

Another example of a positioning beacon for providing a positioning reference signal includes a User Equipment (UE) module configured to: establish a wireless backhaul connection to a communication network; receive scheduling information for a positioning reference signal (PRS) from the communication network over the wireless backhaul connection, with the positioning beacon further including a Home eNodeB (HeNB) module communicatively coupled to the UE module and configured to transmit the PRS according to the scheduling information.

An example of a non-transitory processor-readable medium includes processor-executable instructions configured to cause a processor to: establish a wireless backhaul connection from a positioning beacon to a communication network; receive scheduling information for a positioning reference signal (PRS) from the communication network over the wireless backhaul connection; and transmit the PRS according to the received scheduling information.

Additionally, other systems and methods are described herein.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 6C illustrates exemplary subframe sequences showing adaptive muting among three groups of cells.

FIG. 7 illustrates an exemplary flow for OTDOA with adaptive PRS.

DETAILED DESCRIPTION

Figure 1:
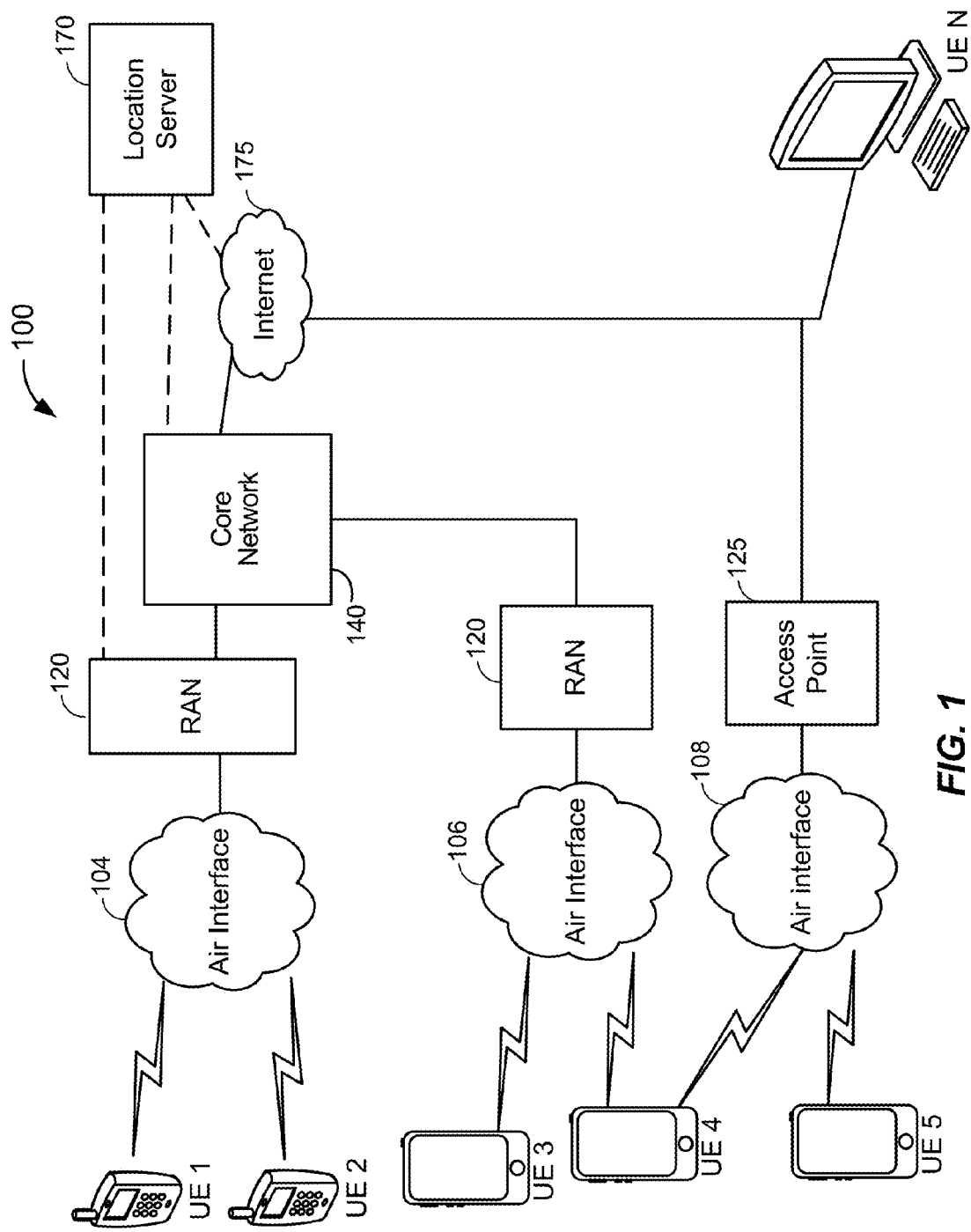
FIG. 1 illustrates a high-level system architecture of a wireless communications system in accordance with an aspect of the disclosure.

Aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary", an "example", "illustrative", "illustrating" or an "illustration" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. Various actions described herein can be performed by specific circuits (e.g., application specific integrated circuits (ASICs)), by program instructions being executed (either directly or after compiling) by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The following table provides a list of abbreviations used in this disclosure:

TABLE 1

| Abbreviations | |
|---|---|
| 3GPP | 3rd Generation Partnership Project |
| 3GPP2 | 3rd Generation Partnership Project 2 |
| A-GNSS | Assisted GNSS |
| AP | Access Point |
| ASN.1 | Abstract Syntax Notation One |
| ATIS | Alliance for Telecommunications Industry Solutions |
| BGCF | Breakout Gateway Control Function |
| BW | Bandwidth |
| CDMA | Code Division Multiple Access |
| CI | Cell Identity |
| CS | Circuit Switched |
| DeNB | Donor eNodeB |
| D-SLP | Discovered SLP |
| ECID | Enhanced Cell ID |
| E-CSCF | Emergency Call Session Control Function |
| ELP | EPC LCS Protocol |
| eNB | Evolved Node B |
| eNodeB | Evolved Node B |
| EPC | Evolved Packet Core |
| EPS | Evolved Packet System |
| ES | Emergency Services |
| ESInet | Emergency Services IP network |
| E-SLP | Emergency Services SLP |
| E-SMLC | Enhanced Serving Mobile Location Center |
| FDD | Frequency Division Duplex |
| FQDN | Fully Qualified Domain Name |
| GGSN | Gateway GPRS Support Node |
| GMLC | Gateway Mobile Location Center |
| GNSS | Global Navigation Satellite System |
| GPRS | General Packet Radio Service |
| GSM | Global System for Mobile communications |
| GTP | GPRS Tunneling Protocol |
| GTP-U | GTP for user data |
| HeMS | Home eNB Management System |
| HeNB | Home eNB |
| HeNB GW | Home eNB Gateway |
| H-SLP | Home SLP |
| HSS | Home Subscriber Server |
| IBCF | Interconnection Border Control Functions |
| IEEE | Institute of Electrical and Electronics Engineers |
| IETF | Internet Engineering Task Force |
| IMEI | International Mobile Equipment Identity |
| IMS | Internet Protocol (IP) Multimedia Subsystem |
| IMSI | International Mobile Subscriber Identity |
| ID | Identity |
| IP | Internet Protocol |
| IPsec | IP security |
| L1 | Layer 1 |
| L2 | Layer 2 |
| LCS | Location Services |
| LCS-AP | LCS Application Protocol |
| LPP | LTE Positioning Protocol |
| LPPa | LTE Positioning Protocol A |
| LPPe | LPP Extensions |
| LRF | Location Retrieval Function |
| LS | Location Service |
| LTE | Long Term Evolution |
| LTE-U | LTE Unlicensed |
| MAC | Media Access Control |
| MBMS | Multimedia Broadcast Multicast Service |
| MGCF | Media Gateway Control Function |
| MIB | Master Information Block |
| MME | Mobility Management Entity |
| MO-LR | Mobile Originated Location Request |
| NAS | Non-Access Stratum |
| O&M | Operations and Maintenance |
| OFDM | Orthogonal Frequency Division Multiplexing |
| OMA | Open Mobile Alliance |
| OTDOA | Observed Time Difference Of Arrival |
| PDG | PDN Gateway |
| PCRF | Policy and Charging Rules Function |
| P-CSCF | Proxy Call Session Control Function |
| PDCP | Packet Data Convergence Protocol |
| PDE | Position Determining Entity |
| PDN | Packet Data Network |
| PLMN | Public Land Mobile Network |
| PRS | Positioning Reference Signal |
| PS | Packet Switched |
| PSAP | Public Safety Answering Point |
| QCI | QoS Class Identifier |
| QoS | Quality of Service |
| RAN | Radio Access Network |
| RDF | Routing Determination Function |
| RFC | Request For Comments |
| RLC | Radio Link Control |
| RN | Relay Node |
| RRC | Radio Resource Control |
| RRLP | Radio Resource LCS Protocol |
| RSTD | Reference Signal Time Difference |
| S1 AP | S1 Application Protocol |
| SAS | Standalone SMLC |
| S-CSCF | Serving Call Session Control Function |
| SCTP | Stream Control Transmission Protocol |
| SeGW | Security Gateway |
| SFN | System Frame Number |
| SGSN | Serving GPRS Support Node |
| SGW | Serving Gateway |
| SIB | System Information Block |
| SLP | SUPL Location Platform |
| SMLC | Serving Mobile Location Center |
| SPS | Satellite Positioning System |
| SUPL | Secure User Plane Location |
| TAC | Tracking Area Code |
| TBS | Terrestrial Beacon System, |
| TCP | Transmission Control Protocol |
| TDD | Time Division Duplex |
| TLS | Transport Layer Security |
| TS | Technical Specification |
| UE | User Equipment |
| UDP | User Datagram Protocol |
| ULP | User Plane Location Protocol |
| UMTS | Universal Mobile Telecommunications System |
| WAN | Wide Area Network |
| WCDMA | Wideband CDMA |
| WLAN | Wireless Local Area Network |

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "mobile device", a "subscriber terminal", a "subscriber station", a "user terminal" or UT, a "mobile terminal", a "mobile station", a SUPL enabled terminal (SET), a target, a target device, a target UE, and variations thereof. A UE may be a cell phone, smart phone, laptop, tablet, asset tag, PDA or any other device that is enabled to communicate wirelessly with other UEs and/or other entities via direct means and/or via one or more networks or one or more network elements. Generally, UEs can communicate with a core network via the RAN, and through the core network (or sometimes through the RAN) the UEs can be connected with external networks such as the Internet. The RAN may support wireless communication from UEs using cellular based radio technologies such as GSM, UMTS and LTE as defined by 3GPP or cdma2000 as defined by the 3rd Generation Partnership Project 2 (3GPP2). A UE may employ other mechanisms of connecting to the core network and/or the Internet such as over wired access networks, WiFi networks (e.g., based on IEEE 802.11, etc.), Bluetooth® networks and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains a number N of UEs labelled UE 1, UE 2, . . . UE N and referred to as UEs UE 1 . . . UE N. The UEs UE 1 . . . UE N can include cellular telephones, personal digital assistant (PDAs), smartphones, pagers, a laptop computer, a desktop computer, and so on. For example, in FIG. 1, UE 1 and UE 2 are illustrated as cellular calling phones, UE 3, UE 4, and UE 5 are illustrated as cellular touchscreen phones or smart phones, and UE N is illustrated as a desktop computer or PC.

Referring to FIG. 1, UEs UE 1 . . . UE N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Enhanced Voice Data Optimized (EVDO), Enhanced High Rate Packet Data (eHRPD), GSM, EDGE, Wideband CDMA (WCDMA), LTE, LTE-U, etc.), while the air interface 108 can comply with a wireless local area network (WLAN) protocol (e.g., IEEE 802.11 or Bluetooth). The RAN 120 (shown in FIG. 1 as comprising two separate portions associated with air interfaces 104 and 106, respectively) includes a plurality of access points that serve UEs over air interfaces, such as the air interfaces 104 and 106. The access points in the RAN 120 can be referred to as access nodes or ANs, access points or APs, base stations or BSs, Node Bs, eNodeBs, and so on. These access points can be terrestrial access points (or ground stations), or satellite access points. The RAN 120 is configured to connect to a core network 140 (such as an LTE core network) that can perform a variety of functions, including connecting circuit switched (CS) calls and/or packet switched (PS) connections between UEs served by the RAN 120 and other UEs served by the RAN 120 or a different RAN altogether, and can also mediate an exchange of PS data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to connect PS data communications between UE N and UEs UE 1 . . . UE N-1 via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example.

Referring to FIG. 1, a location server 170 is shown as connected to the Internet 175, the core network 140 or the RAN 120 or to any two or all three of these. The location server 170 can be implemented as a plurality of structurally separate servers, or alternately may correspond to a single server. As will be described below in more detail, the location server 170 may be configured to support one or more positioning services for UEs that can communicate with the location server 170 via the RAN 120, the core network 140 and/or the Internet 175.

Figure 2:
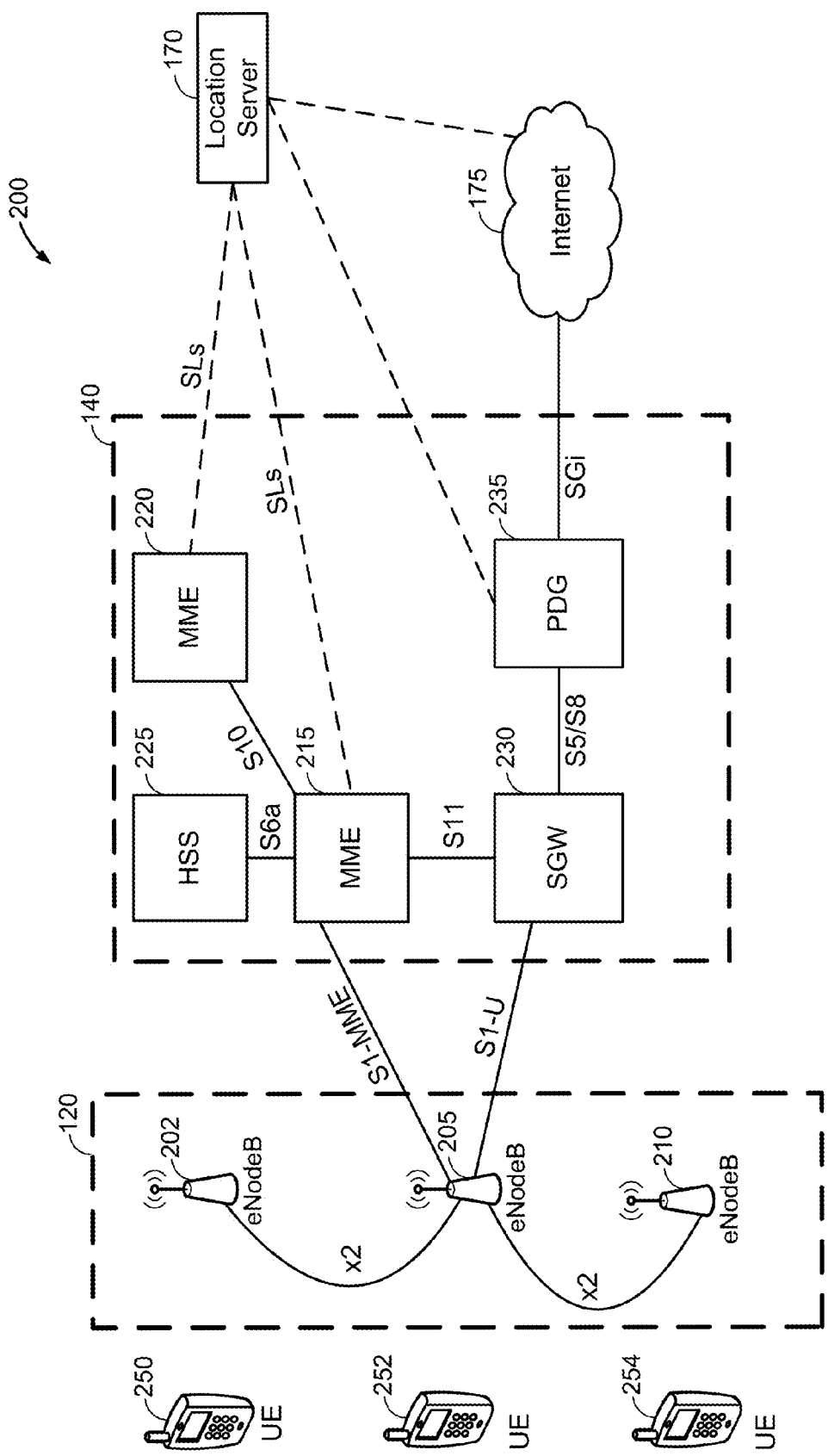
FIG. 2 illustrates an example configuration of a radio access network (RAN) and a packet-switched portion of the core network that is based on an Evolved Packet System (EPS) or Long Term Evolution (LTE) network in accordance with an aspect of the disclosure.

FIG. 2 illustrates an example architecture 200 that is a configuration of the RAN 120 and a packet-switched portion of the core network 140 based on an Evolved Packet System (EPS) or LTE network, in accordance with an aspect of the disclosure. Referring to FIG. 2, the RAN 120 in the EPS/LTE network is configured with a plurality of Evolved Node Bs (eNodeBs or eNBs) 202, 205 and 210. In FIG. 2, the core network 140 includes a plurality of Mobility Management Entities (MMEs) 215 and 220, a Home Subscriber Server (HSS) 225, a Serving Gateway (SGW) 230 and a Packet Data Network Gateway (PDG) 235. Network interfaces between these components, the RAN 120, the location server 170 and the Internet 175 are illustrated in FIG. 2 and are defined in Table 2 (below) as follows:

TABLE 2

EPS/LTE Core Network Connection Definitions

| Network Interface | Description |
|---|---|
| S1-MME | Reference point for the control plane protocol between RAN 120 and MME 215. |
| S1-U | Reference point between RAN 120 and SGW 230 for the per bearer user plane tunneling and inter-eNodeB path switching during handover. |
| S5 | Provides user plane tunneling and tunnel management between SGW 230 and PDG 235. It is used for SGW relocation due to UE mobility and if the SGW 230 needs to connect to a non-collocated PDG for the required PDN connectivity. |
| S6a | Enables transfer of subscription and authentication data for authenticating/authorizing user access to the evolved system (Authentication, Authorization, and Accounting [AAA] interface) between MME 215 and HSS 225. |
| S8 | Inter-PLMN reference point providing user and control plane between the SGW 230 in a Visited Public Land Mobile Network (VPLMN) and the PDG 235 in a Home Public Land Mobile Network (HPLMN). S8 is the inter-PLMN variant of S5. |
| S10 | Reference point between MMEs 215 and 220 for MME relocation and MME to MME information transfer. |
| S11 | Reference point between MME 215 and SGW 230. |
| SGi | Reference point between the PDG 235 and a packet data network, shown in FIG. 2 as the Internet 175. The Packet data network may be an operator external public or private packet data network or an intra-operator packet data network (e.g., for provision of IMS services). |
| SLs | Interface between an MME and the location server 170 in the event that location server 170 is or contains an E-SMLC |
| X2 | Reference point between two different eNodeBs used for UE handoffs. |

A high-level description of the components shown in FIG. 2 will now be described. However, these components are each well-known in the art from various 3GPP Technical Specifications (TSs), and the description contained herein is not intended to be an exhaustive description of all functionalities performed by these components.

Referring to FIG. 2, the eNBs 202, 205 and 210 are configured to provide LTE radio access to UEs (e.g. any of UEs 250, 252 and 254) and to provide signaling and voice/data connectivity between any UE and elements in core network 140 such as MME 215 and SGW 230. Although three UEs are shown in FIG. 2, there may be more of fewer UEs. The eNBs 202, 205 and 210 are configured to wirelessly communicate with the UEs 250, 252 and 254 via antennas. Each of the eNBs 202, 205 and 210 may provide communication coverage for a respective geographic area, e.g., a corresponding cell or several corresponding cells. The RAN 120 may include only macro base stations or it can have base stations of different types, e.g., macro base stations and femto base stations (also referred to as Home Evolved Node Bs (HeNBs), femto cells or as small cells). A macro base station may cover a relatively large geographic area (e.g., several kilometers in radius) and may allow unrestricted access by terminals with a service subscription. A femto base station may cover a relatively small geographic area (e.g., a home or office) and may in some cases allow restricted access by terminals having association with the femto cell (e.g., terminals for users in a home). The eNBs 202, 205 and 210, in turn, are configured to communicate with the core network 140 through one or more backhaul links between the eNBs 202, 205 and 210 and the core network 140. A backhaul link may be a wired or a wireless (e.g. a microwave) connection between an eNB and one or more components of the core network 140. Additionally or alternatively, a wireless backhaul link can be used, as described in further detail below.

The eNBs 202, 205 and 210 may be configured to broadcast a positioning reference signal (PRS) to nearby UEs to enable any UE to make measurements of PRS timing differences between pairs of eNBs and thereby enable a location estimate of the UE to be obtained by the UE itself or by a location server (e.g. location server 170) to which the timing difference measurements may be sent using OTDOA positioning, as previously described. The term location estimate is used herein to refer to an estimate of a location for a UE (e.g. any of UEs 250, 252 and 254) which may be geographic (e.g. may comprise a latitude, longitude and possibly altitude) or may be civic (e.g. may comprise a street address, building designation or precise point or area within or nearby to a building or street address such as a particular entrance to a building, a particular room or suite in a building or a landmark such as a town square). A location estimate may also be referred to as a location, a position, a fix, a position fix, a location fix, a position estimate, a fix estimate or by some other term. The means of obtaining a location estimate may be referred to generically as positioning, locating or position fixing; a particular solution for obtaining a location estimate may be referred to as a location solution; and a particular method for obtaining a location estimate as part of a location solution may be referred to as a position method or location method.

Referring to FIG. 2, the MMEs 215 and 220 are configured to support network attachment of UEs (e.g. UEs 250, 252, 254), mobility of UEs and bearer assignment to UEs. MME functions include: Non-Access Stratum (NAS) signaling to UEs, NAS signaling security, mobility management for inter- and intra-technology handovers of UEs, PDG and SGW selection, and MME selection for UE handovers with MME change.

Referring to FIG. 2, the SGW 230 is the gateway that terminates the interface toward the RAN 120. For each UE attached to the core network 140 for an EPS-based system, at a given point of time, there may be a single SGW. The functions of the SGW 230 may include: mobility anchor point, packet routing and forwarding, and transport level packet marking in the uplink and the downlink (e.g. setting the DiffServ Code Point (DSCP) based on a QoS Class Identifier (QCI) of an associated EPS bearer).

Referring to FIG. 2, the PDG 235 is the gateway that terminates the SGi interface toward the Packet Data Network (PDN), e.g., the Internet 175. If a UE is accessing multiple PDNs, there may be more than one PDG for that UE. PDG functions may include: packet filtering (e.g. using deep packet inspection), UE IP address allocation, transport level packet marking in the uplink and downlink (e.g. setting the DSCP based on the QCI of an associated EPS bearer), accounting for inter operator charging, uplink (UL) and downlink (DL) bearer binding, UL and DL rate enforcement and service level rate enforcement, and UL bearer binding. The PDG 235 may provide PDN connectivity to both GSM/EDGE Radio Access Network (GERAN)/UTRAN only UEs and E-UTRAN-capable UEs using any of E-UTRAN, GERAN, or UTRAN. The PDG 235 may provide PDN connectivity to E-UTRAN capable UEs using E-UTRAN only over the S5/S8 interface. The PDG 235 may provide IP connectivity to UEs 250, 252 and 254 by serving as the first entity on the network side with IP access and IP routing capability. As discussed later herein, the PDG 235 may also provide IP connectivity to an eNB beacon (e.g. to eNB 202, 205 or 210 when any of these eNBs function as an eNB beacon) in the case that the eNB beacon has a wireless backhaul connection.

In FIG. 2, the location server 170 is shown as connected to one or more of the Internet 175, the PDG 235, MME 220 and MME 215. The connections to MME 215 and MME 220 are applicable when location server 170 is or contains an E-SMLC. The connections to the Internet 175 and to the PDG 235 are applicable when location server 170 is or contains an SLP. Location server 170 may be used (i) to obtain a location for any of UEs 250, 252 and 254 (e.g. from signal measurements obtained and transferred to location server 170 by any of UEs 250, 252 and 254) and/or (ii) to provide assistance data to any of UEs 250, 252 and 254 to enable any of UEs 250, 252 and 254 to acquire and measure signals (e.g. signals from one or more of eNBs 202, 205 and 210) and/or, in some cases, compute a location from these signal measurements. Examples of assistance data can be orbital and timing data for GPS or other GNSS satellites when GPS or GNSS positioning is used or information concerning downlink transmission from eNBs nearby to a UE (e.g. any of eNBs 202, 205 and 210) when OTDOA is used for positioning.

The core network 140, RAN 120 and location server 170 in FIG. 2 may correspond, respectively, to core network 140, RAN 120 and location server 170 in FIG. 1. In addition, UEs 250, 252 and 254 in FIG. 2 may each correspond to any of UEs 1 to N in FIG. 1.

As discussed above, to locate a UE geographically, there are several approaches one of which is the OTDOA positioning method, available in LTE. OTDOA is a multilateration method in which the UE measures the time difference between specific signals (e.g. PRS signals) from different pairs of eNodeBs and either reports these time differences to a location server, such as an E-SMLC or SLP, or computes a location itself from these time differences. The location computation can be based on the measured time differences and knowledge of the eNodeBs' locations and relative transmission timing (e.g., regarding whether eNBs are accurately synchronized or whether each eNB transmits with some known time difference relative to other eNBs). When a UE obtains a location estimate itself using OTDOA measured time differences, the necessary additional data (e.g. eNodeBs' locations and relative transmission timing) may be provided to the UE by a location server (e.g. location server 170 in FIG. 2). In some implementations, a location estimate for a UE may be obtained (e.g. by the UE itself or by a location server) from OTDOA measured time differences and from other measurements made by the UE (e.g. measurements of signal timing from GPS or other GNSS satellites). In these implementations, known as hybrid positioning, the OTDOA measurements may contribute towards obtaining a UE location estimate but may not wholly determine the location estimate.

Figure 3A:
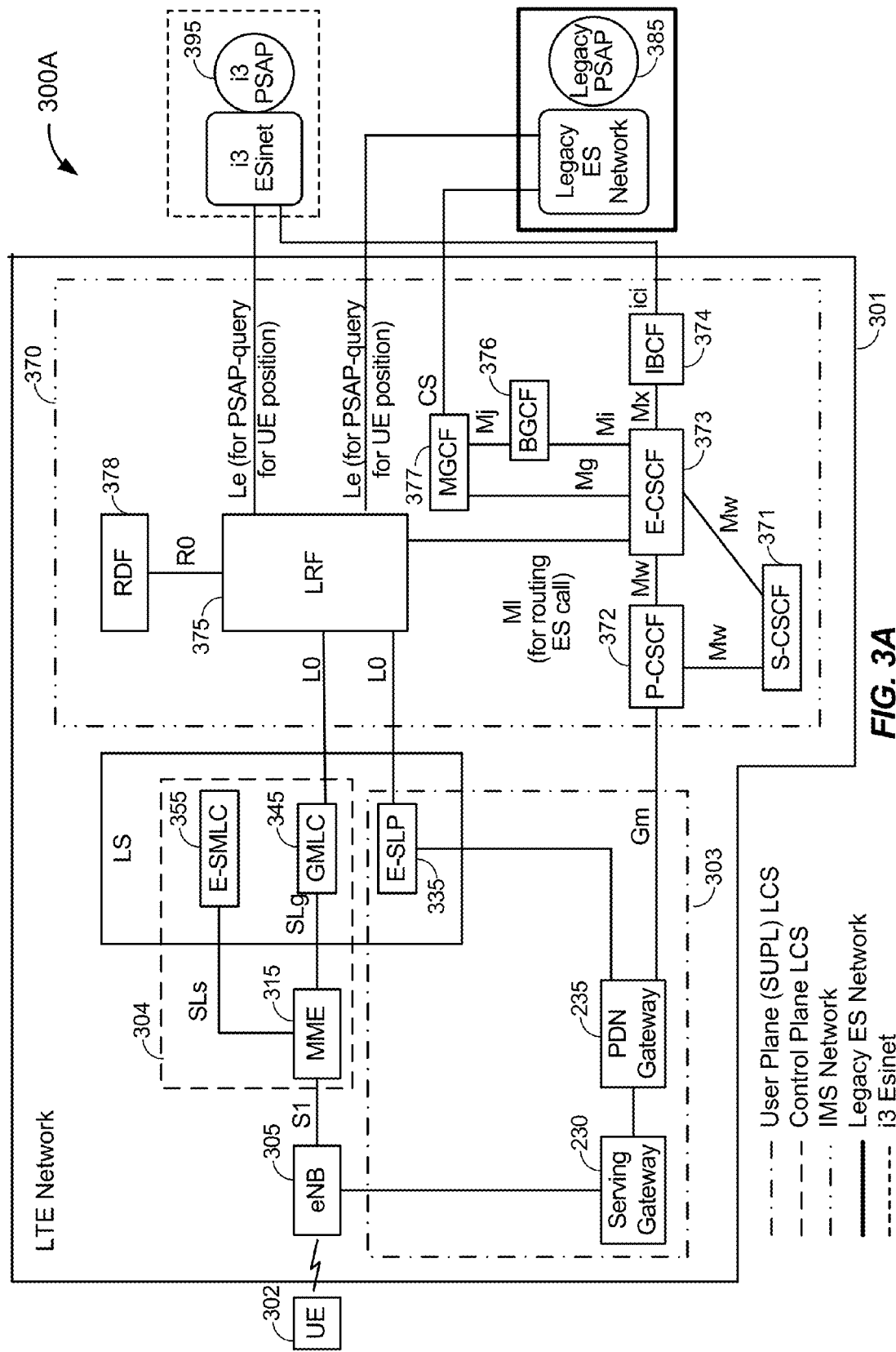
FIG. 3A illustrates an exemplary system architecture for E911 location in an LTE network.
Figure 3B:
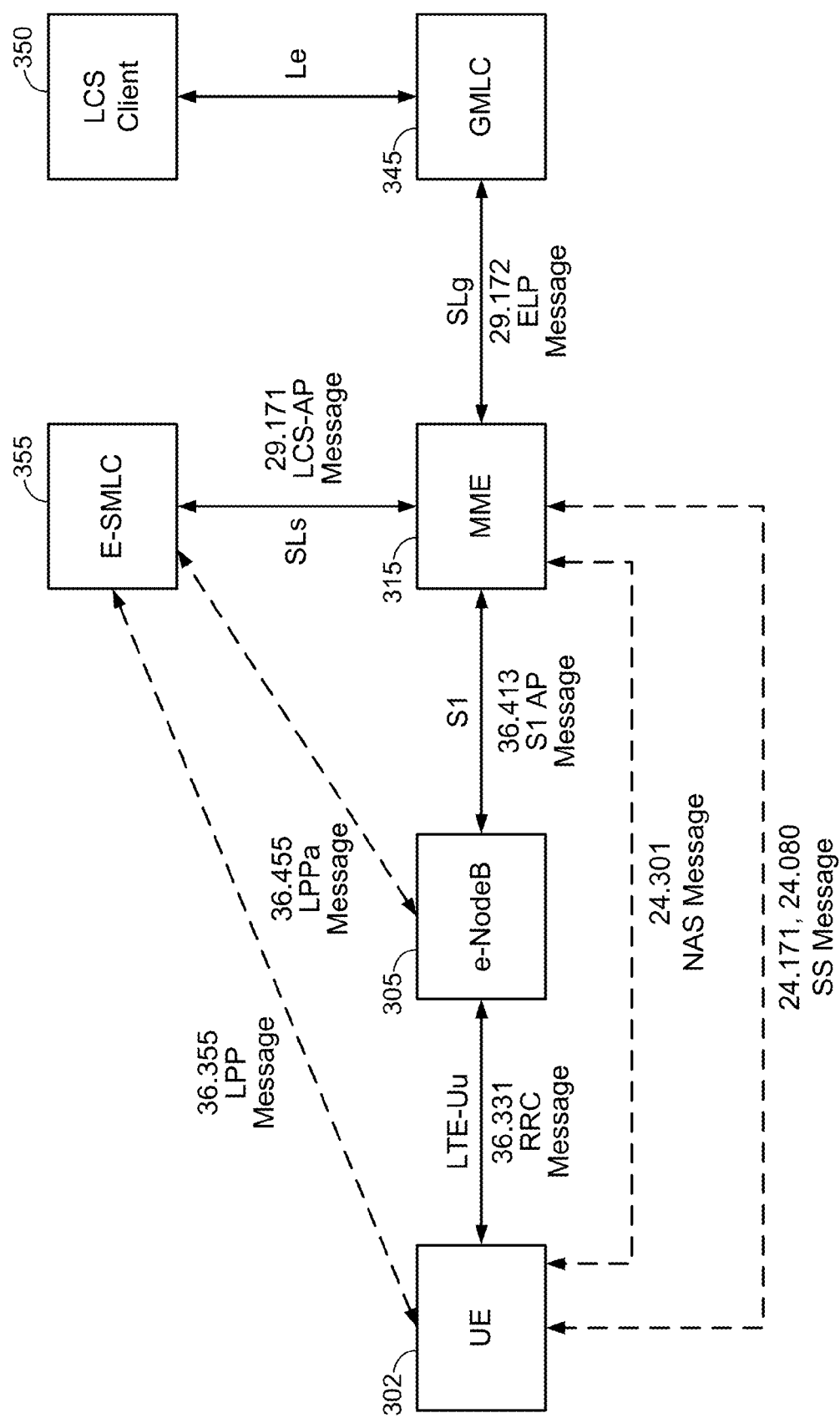
FIG. 3B illustrates exemplary control plane elements of the system architecture for E911 location in the LTE network illustrated in FIG. 3A.

FIG. 3A illustrates an exemplary system architecture 300A for obtaining a location estimate for a UE (such as the UE 302 shown in FIG. 3A) served by an LTE network 301 when the UE is establishing or has already established an E911 call. FIG. 3B illustrates exemplary control plane elements of the LTE network 301 shown in FIG. 3A that may be used for E911 location services. More specifically, FIG. 3B illustrates the various protocols that may be used and the associated types of messages that may be transmitted between the various network elements in the case that a control plane location solution is used.

In a control plane location solution, a location server (e.g., location server 170 in FIGS. 1 and 2 or E-SMLC 355 in FIGS. 3A and 3B) is accessed by other elements including UEs via signaling interfaces and signaling protocols in a network which typically include existing signaling interfaces and existing protocols as well as new protocols and interfaces dedicated to location support. All signaling related to the location of a UE is then explicitly transported as signaling on all interfaces. In the case of LTE access, the control plane location solution is defined in 3GPP TSs 23.271 and 36.305.

In a user plane location solution, such as the SUPL solution defined by the Open Mobile Alliance (OMA), a UE and location server communicate by exchanging data from the perspective of the network, such as via IP or TCP/IP. In the case of the SUPL solution, location server 170 in FIGS. 1 and 2 would be an SLP and E-SLP 335 in FIG. 3A would be used for location rather than E-SMLC 355. In some cases, a network may employ both a control plane location solution and a user plane location solution such as SUPL. In that case, both E-SMLC 355 and E-SLP 335 may be present in FIG. 3A and these servers may be combined (e.g., in the same physical entity) or connected to one another in order to allow both solutions to be used to locate a UE.

FIG. 3A illustrates both the control plane location elements, i.e., Gateway Mobile Location Center (GMLC) 345, MME 315 (which may be the same as either of MMEs 215 and 220 in FIG. 2), and E-SMLC 355, and the alternative user plane (e.g., SUPL) location element, i.e., the E-SLP 335, that may be used to determine the location of UE 302 when the user of UE 302 instigates an E911 call. The eNodeB 305 may be the same as any of eNodeBs 202, 205 and 210 in FIG. 2. Either or both of E-SMLC 355 in FIGS. 3A and 3B and E-SLP 335 in FIG. 3A may correspond to location server 170 in FIGS. 1 and 2. Further, UE 302 in FIGS. 3A and 3B may correspond to any of UEs 250, 252 and 254 in FIG. 2 and to any of UEs UE 1 ... UE N in FIG. 1.

FIG. 3A also illustrates other components, including network elements and subsystems of the LTE network 301, that may be used to (i) support establishment of an E911 call over LTE from a UE such as UE 302 and/or (ii) provide location support for the E911 call. The components that may be used to support user plane location are shown enclosed in the dashed box 303 in FIG. 3A and comprise the E-SLP 335 as already mentioned, the PDN Gateway (PDG) 235 (which may correspond to PDG 235 in FIG. 2) and the Serving Gateway (SGW) 230 (which may correspond to SGW 230 in FIG. 2). PDG 235 and SGW 230 may transfer location related signaling (e.g. SUPL messages) between UE 302 and E-SLP 335 in the form of data (e.g. IP or TCP/IP data packets). The components that may be used to support control plane location are shown enclosed in the dashed box 304 in FIG. 3A and comprise the MME 315, the GMLC 345 and the E-SMLC 355, as already mentioned. Components comprising an IMS for the LTE network 301 are shown enclosed in the dashed box 370 in FIG. 3A and comprise the S-CSCF 371, the P-CSCF 372, the E-CSCF 373, the IBCF 374, the LRF 375, the BGCF 376, the MGCF 377, and the RDF 378. The IMS may be used to establish and later release an E911 call by supporting the SIP signaling with the UE (e.g. UE 302) needed to establish and later release the E911 call and either the SIP signaling with the PSAP side in the case that the PSAP side supports SIP (e.g. in the case that the E911 call is routed to the i3 PSAP 395) or CS associated signaling with the PSAP side in the case that the PSAP side supports CS calls (e.g. in the case that the E911 call is routed to the legacy PSAP 385). E911 call establishment and release details relevant to the system architecture 300A are specified further in a number of publicly available standards including 3GPP TS 23.167, the Alliance for Telecommunications Industry Solutions (ATIS) standard ATIS-0700015 and the National Emergency Number Association (NENA) i3 solution (e.g. "Detailed Functional and Interface Specification for the NENA i3 Solution—Stage 3").

In the case of a UE 302 making an E911 call over LTE, any of the elements shown in FIG. 3A may be involved in establishing and maintaining the call and/or in helping locate the UE 302, with the exception of elements specifically used for just control plane location or just user plane SUPL location, but not both. For control plane location, MME 315, GMLC 345, and E-SMLC 355 may be used to help locate UE 302 but not E-SLP 335. Conversely for user plane SUPL location, E-SLP 335 may be used to help locate UE 302 but not MME 315, GMLC 345, or E-SMLC 355. Various location solutions provide connectivity through the LRF 375 to the PSAP (either a legacy PSAP 385 or a NENA i3 capable PSAP 395). The LRF 375 is the common network element in the IMS for LTE network 301 that is able to request and receive a location estimate for UE 302 from either E-SLP 335 when user plane location is used or from GMLC 345 when control plane location is used. LRF 375 may then provide the location estimate for UE 302 to a PSAP (e.g. legacy PSAP 385 or i3 PSAP 395) when requested by the PSAP.

Referring to FIG. 3B, which as remarked shows network elements in the LTE network 301 in FIG. 3A that support control plane location, the dashed lines indicate protocols, associated message types and relevant 3GPP TSs (referenced by TS number) for positioning interaction between pairs of entities that communicate with one another but are not directly connected to one another and the solid lines indicate protocols, message types, interface designations and relevant 3GPP TSs (referenced by TS number) for communication links used for positioning between directly connected communicating entities. For example, the E-SMLC 355 and the eNodeB 305 employ the LPPa positioning protocol (shown as a dashed line in FIG. 3B) that is defined in 3GPP 36.455 and in which the E-SMLC 355 may request and obtain measurements made by eNodeB 305 of UE 302 by exchanging LPPa messages with eNB 305. The messages for the LPPa protocol are physically transferred over (i) the SLs interface (shown as a solid line in FIG. 3B) between the E-SMLC 355 and the MME 315 using the LCS-AP protocol defined in 3GPP TS 29.171 and (ii) over the S1 interface (also shown as a solid line in FIG. 3B) between the MME 315 and the eNodeB 305 using the S1 AP protocol defined in 3GPP TS 36.413. The MME 315 also communicates with the GLMC 345 over the SLg interface and the GMLC 345 communicates with an LCS client 350

(which may be a PSAP such as legacy PSAP 385 or i3 PSAP 395) over an Le interface. In some cases and not shown in FIG. 3B (e.g. for the exemplary system architecture 300A of FIG. 3A), GMLC 345 may communicate with an LRF (e.g. LRF 375 in FIG. 3A over an L0 interface defined in ATIS standard ATIS-0700015) with the LRF rather than the GMLC 345 then communicating with a PSAP over an Le interface.

Similarly, the E-SMLC 355 and UE 302 may employ the LPP Positioning Protocol (shown as a dashed line in FIG. 3B) that is defined in 3GPP TS 36.355 and in which the E-SMLC 355 may (i) request and obtain measurements (e.g., OTDOA measurements) made by UE 302 of signals transmitted by eNodeB 305 and other eNBs and/or (ii) provide assistance data to UE 302 (e.g., assistance data for OTDOA). Messages for the LPP protocol are physically transferred over the SLs interface between the E-SMLC 355 and the MME 315, over the S1 interface between the MME 315 and the eNodeB 305, and over the LTE Uu air interface between the eNodeB 305 and UE 302 (all shown as solid lines in FIG. 3B). In some implementations, an additional LPP Extensions (LPPe) message may be embedded inside an LPP message to provide information for additional position methods including extensions to OTDOA. The LPPe protocol is defined by OMA and when used in combination with LPP may be referred to as LPP/LPPe.

During an OTDOA positioning procedure, the E-SMLC 355 may request OTDOA measurements from the UE 302 through the LPP layer. The requested measurements may be a set of Reference Signal Time Difference (RSTD) measurements. Together with or prior to this request, the E-SMLC 355 may send the UE 302 assistance data, which may include a list of cells (such as a cell or cells corresponding to eNodeB 305) and parameters defining a Positioning Reference Signal (PRS) transmitted in each cell (by the eNB that supports the cell) to support OTDOA, including the bandwidth (BW), number of LTE subframes, periodicity, etc. for the PRS signal. The LPP request and assistance data applicable to OTDOA are described in more detail below.

UE 302 then obtains some or all of the requested OTDOA measurements during a given period of time (e.g. up to 30 seconds in the case of an E911 call). These measurements consist of measuring the exact time differences between the PRS signals received by UE 302 from different pairs of eNodeBs (or from different pairs of cells in the case that a common eNB supports two cells measured by UE 302). The UE 302 then reports these measured time differences to the E-SMLC 355 together with an estimate of the measurement quality for each measurement (e.g. which may be an estimate of the measurement error in each time difference measurement). Using these time difference estimates and the knowledge of the eNodeBs' positions and any transmit time offsets, the E-SMLC 355 estimates the position of the UE 302. In some implementations of OTDOA (e.g. when OTDOA is supported using LPP combined with LPPe), a UE 302 may not only make OTDOA time difference measurements but may also compute a location estimate from these measurements if E-SMLC 355 has provided LPP/LPPe assistance data to UE 302 comprising the eNodeB (e.g. eNB antenna) position for each cell and any transmit time offsets.

A similar procedure is possible for use of OTDOA when a SUPL user plane location solution is used instead of a control plane solution. In this case, an SLP (e.g., E-SLP 335 in FIG. 3A) and a UE (e.g., UE 302) exchange LPP messages (or combined LPP/LPPe messages) embedded inside SUPL messages (e.g., SUPL POS messages) that may be transferred between the SLP and UE using TCP/IP. The LPP (or LPP/LPPe) message exchange in the case of SUPL may be the same as or similar to the LPP (or LPP/LPP) message exchange in the case of a control plane solution (e.g., the same sequence of LPP or LPP/LPPe messages may be transferred) and only the method of transport may differ.

Figure 3C:
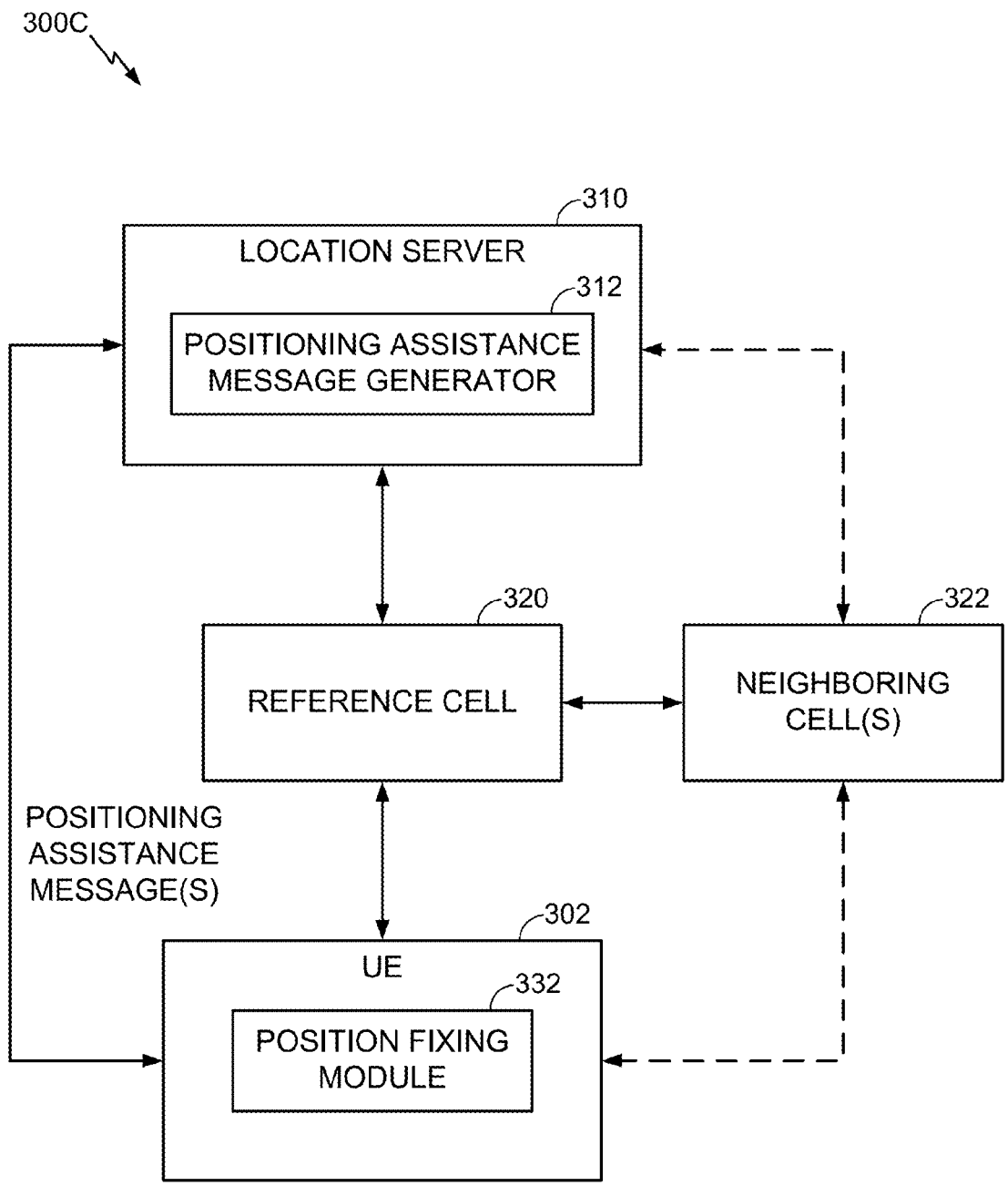
FIG. 3C illustrates an exemplary system for conducting network-assisted positioning using OTDOA.

FIG. 3C illustrates an exemplary system 300C for conducting network-assisted positioning using OTDOA. FIG. 3C may be applicable to fixed PRS signaling from eNBs in different cells (e.g. where PRS signaling is defined by parameters for bandwidth, frequency and other characteristics that do not change) and/or to OTDOA positioning with dynamic adaptation of PRS signaling from one or more eNBs. Dynamic adaptation of PRS signaling refers to temporarily changing the quality of PRS signaling (e.g. temporarily increasing the PRS bandwidth, PRS repetition rate and/or PRS transmission power) within a particular cell in order to: (i) improve the accuracy of OTDOA measurement of the PRS signal by a UE; (ii) increase the distance and/or amount of building penetration for which the PRS signal can be received and measured by a UE and/or (iii) reduce the level of interference by the PRS signal in the case of an eNB close to a UE with PRS signals received by the UE from other more distant eNBs. Adaptation of PRS signals may be scheduled at an eNB for one or more cells supported by the eNB by a location server. More details of adaptive PRS scheduling are provided later herein.

Referring to FIG. 3C, system 300C can include one or more network cells (which may correspond to cells of eNodeBs 202, 205 and 210, eNodeB 305, etc., or to eNodeBs 202, 205 and 210 and/or eNodeB 305 themselves), such as a reference cell 320 and one or more neighboring cells 322. In an example, reference cell 320 and/or neighboring cell(s) 322 or other non-reference cells can transmit signals (e.g. PRS signals) that can be received (e.g. measured) by one or more UEs 302. Reference cell 320 and/or one or more of neighboring cell(s) 322 can be a serving network cell for any UE 302 or a non-serving network cell for any UE 302.

In accordance with one aspect, any UE 302 and/or other entities within system 300C (e.g. location server 310) can determine the position of the UE 302 using OTDOA, wherein timing measurements are made by UE 302 for reference signals (e.g. PRS signals) supported by LTE and/or for other highly detectable pilot signals, etc., transmitted by reference cell 320 and/or neighboring cell(s) 322. As used generally herein, a "neighboring cell" or "neighbor cell" is used to refer to a cell that is nearby to (including, e.g., adjacent to or separated from but close to) a serving network cell for a given UE 302 or is otherwise nearby the UE 302 (e.g., is transmitted by an eNB that is within a few miles of UE 302). However, other suitable network cells, such as network cells that border a designated reference cell 320, could additionally be utilized as described herein.

As shown in system 300C, a UE 302 can utilize a position fixing module 332 and/or other suitable means to perform position fixing within system 300C. In an example, a UE 302 can utilize positioning assistance data to help determine a position fix, acquire and measure PRS signals more quickly and/or more reliably, reduce complexity of measurements, improve performance of the UE 302, and/or other suitable ends. In some implementations, the positioning assistance data may include information such as: (i) identification of the reference cells 320 and/or neighboring cells 322 (e.g. using global cell identities and/or local physical cell identities); (ii) identification or characterization of PRS signals transmitted by the reference cell 320 and/or neighboring cells 322 (e.g. PRS bandwidth, PRS subframe assignments, PRS encoding); (iii) relative transmit time differences between the PRS signals transmitted by the reference cell 320 and neighboring cells 322; (iv) the approximate RSTD measurement expected (e.g., by location server 310) to be made by UE 302 for each neighboring cell 322; and/or (v) locations of the eNB antennas for the reference cell 320 and/or neighboring cells 322. The positioning assistance data may further include adaptive PRS scheduling information, as discussed later herein.

As further shown in FIG. 3C, the positioning assistance data can be obtained by a UE 302 from a location server 310 associated with system 300C. The location server 310 can be an E-SMLC, such as E-SMLC 355, an Emergency SUPL Location Platform (E-SLP), such as E-SLP 335, an eNB, or any other suitable entity that can provide UE 302 with information to aid in the performance of position fixing module 332. Position fixing module 332 may be a legacy system or can include the ability to decode new versions of PRS which may be used to increase PRS duty cycle as described later. Position fixing module 332 may be used by UE 302 to make measurements of PRS signals transmitted by different reference cells 320 and/or neighboring cells 322 (e.g. make RSTD measurements of the PRS signal transmitted by one reference cell 320 and each of several different neighboring cells 322) with the measurements being returned by UE 302 to location server 310 to enable location server 310 to compute a location estimate for UE 302. Alternatively, positioning fixing module 332 may be used by UE 302 to make measurements of PRS signals transmitted by different reference cells 320 and/or neighboring cells 322 and to compute a location estimate from these measurements (e.g. using positioning assistance data received from location server 310 to help determine the location estimate).

In an example, location server 310 can include a positioning assistance message generator 312 and can coordinate positioning of respective UEs 302 by generating and communicating an adaptive PRS schedule within system 300C. For example, location server 310 can be configured to identify a group of network cells based on which positioning assistance message generator 312 can be utilized to generate the adaptive PRS messaging. A group of identified network cells can include, for example, a serving network cell for one or more network users (e.g., a UE 302), a reference cell 320 (e.g. which may also be a serving network cell for a UE) and one or more neighbor network cells. Further, some or all of the identified network cells may be supported by standalone eNB beacons such as standalone eNB beacon 400 described later for FIG. 4A.

In accordance with one aspect, positioning assistance message generator 312 can be utilized to generate positioning assistance data for a given UE 302 in various manners as described in further detail herein. Upon generation of such data, location server 310 can transfer the generated data to the given UE 302 via one or more positioning assistance messages (e.g. LPP or LPP/LPPe positioning assistance messages). In an example, positioning assistance messages generated and transferred by location server 310 can include adaptive PRS scheduling information as described below.

The United States Federal Communications Commission (FCC) has mandated a location accuracy of 50 meters for E911 calls made using cellular wireless means indoors in the US which is to be phased in starting in 2017. Existing outdoor methods for locating UEs, such as, Assisted Global Navigation Satellite System (A-GNSS), Enhanced Cell ID (ECID), OTDOA, etc., may not be able to achieve this accuracy indoors. Although using the location of Wireless Local Area Network (WLAN) access points, such as access point 125 in FIG. 1, may achieve this accuracy and better, it may not always be reliable. For example, in some locations, a UE may not detect any WLAN APs, In addition, any WLAN AP detected by a target UE may not have a known accurate location or the AP may have a known location but may have been moved from this location after the location was obtained.

OTDOA for LTE may achieve the indoor accuracy requirements with the enhancements described herein. For OTDOA for LTE to achieve indoor accuracy of 50 meters or better for E911 calls, a high PRS duty cycle may need to be used, in which the PRS signal used for OTDOA RSTD measurements is transmitted frequently, and in which a large proportion (e.g., 25% to 100%) of operator available downlink bandwidth may need to be used. Such a PRS duty cycle may need to be significantly more than operators are likely to deploy for outdoor location use. However, a problem with such a PRS duty cycle is that significant licensed bandwidth may need to be allocated for the OTDOA PRS, which would reduce network capacity for voice and data traffic.

Accordingly, an adaptive PRS duty cycle may be used for indoor location enhancement. In an aspect, the PRS usage of operator bandwidth is adapted to the needs of E911 calls and potentially to other uses of location where it is important to obtain an accurate location of a UE that is or may be indoors (or is in some difficult outdoor environment such as a dense urban area). When no E911 callers near an eNodeB need to be located, cells supported by the eNodeB may operate in a "normal PRS mode" (also referred to as a "non-emergency PRS mode"), in which only a small amount of bandwidth is allocated to the PRS signal. However, when an E911 caller near an eNodeB, and potentially indoors, needs to be located, the eNodeB may switch into an "emergency PRS mode," in which a higher proportion of bandwidth (e.g., an increased frequency range) and/or a higher transmission power is allocated to the PRS signal, thereby improving building penetration, signal acquisition, and measurement accuracy by a UE. The emergency PRS mode may be backward compatible with a legacy UE that does not support the emergency PRS mode but only supports normal PRS mode if the emergency PRS mode includes PRS positioning occasions that may be used in normal PRS mode. For example, the emergency PRS mode may include up to six consecutive PRS subframes that may be periodically repeated as described later in FIG. 5 and may be coded and use bandwidth according to the existing definition of OTDOA in 3GPP TSs 36.211 and 36.355 in which emergency PRS mode is not included. Legacy UEs may then measure this portion of the emergency PRS transmission and ignore additional PRS subframes or differently encoded PRS subframes that may also be transmitted by an eNB as part of emergency PRS mode.

In a related aspect, the interference between PRS signals in emergency mode can be reduced and an even higher PRS duty cycle for the emergency PRS mode can be enabled by scheduling when different eNodeBs switch between normal and emergency PRS modes. Specifically, the durations of the emergency PRS modes in eNodeBs near a target UE can be staggered such that only a few eNodeBs are using the emergency PRS mode at the same time. The scheduling times can be referenced to the serving cell (or other reference cell) for the target UE and made known to the UE in assistance data provided by the E-SMLC or SUPL Location Platform (SLP).

Figure 4A:
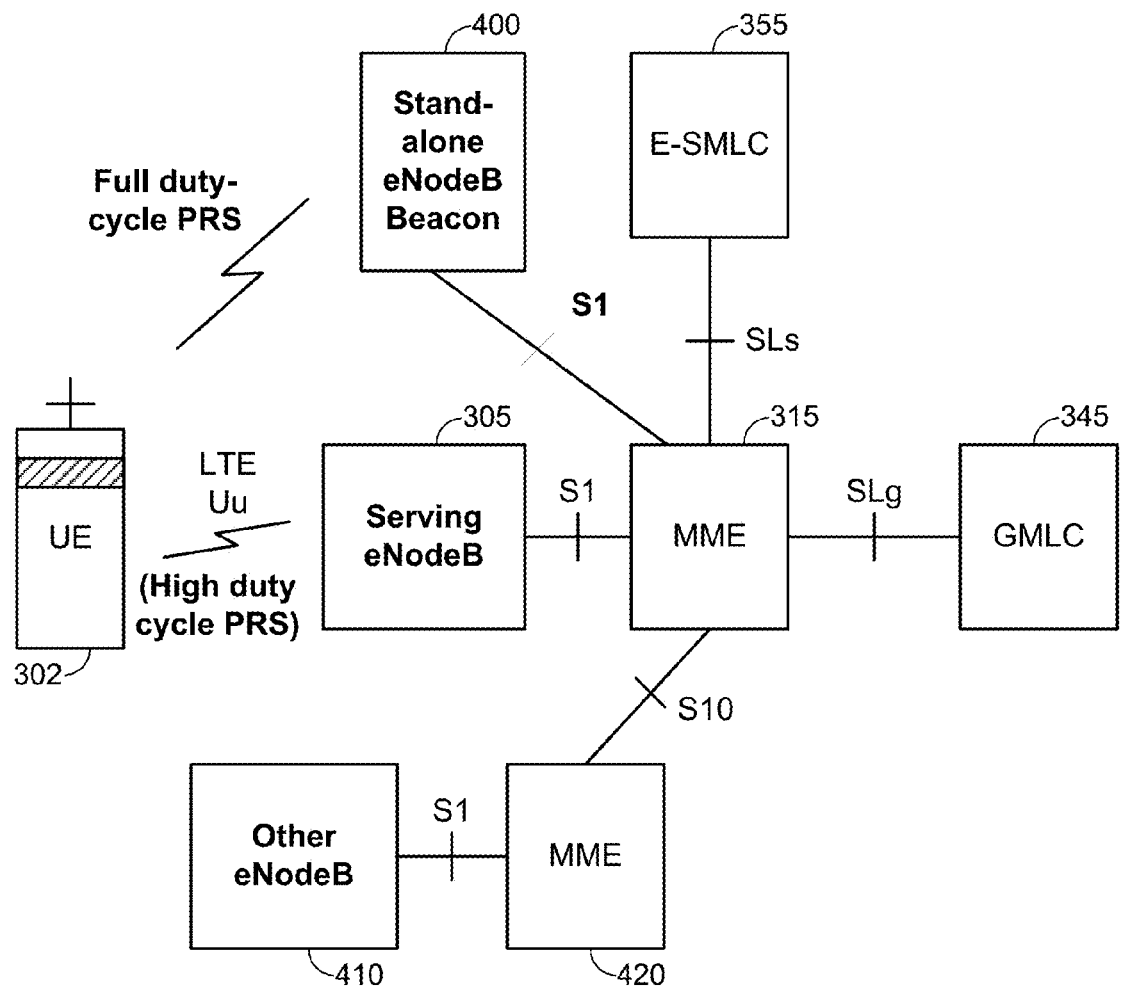
FIG. 4A illustrates an exemplary extension of the LTE architecture for E911 location illustrated in FIGS. 3A and 3B that permits the use of OTDOA indoors.

FIG. 4A illustrates an exemplary extension of the system architecture for E911 location in an LTE network illustrated in FIGS. 3A-3B that permits the use of OTDOA indoors.

The architecture illustrated in FIG. 4A applies to the control plane solution and can be applicable to location of a UE with LTE access either with or without an E911 call.

In the LTE architecture illustrated in FIG. 4A, a standalone eNB Beacon 400 has been added to the LTE E911 location architecture illustrated in FIGS. 3A-3B. In the example of FIG. 4A, the eNB Beacon 400 (which may correspond to any of eNBs 202, 205 and 210 in FIG. 2) is connected to, for example, the MME 315, possibly over an S1 link, and provides additional coverage for indoor location. The eNB Beacon 400 acts as a standalone beacon that can transmit a PRS signal to support positioning of UEs and may also transmit information needed to support UE acquisition and measurement of the PRS such as an LTE master information block (MIB) and one or more LTE system information blocks (SIBs) but may not transmit or receive data or control information to support normal LTE access by UEs (e.g., may not support wireless access by UEs for the purpose of sending and receiving voice and data). As discussed later herein, the standalone eNB Beacon 400 (also referred to as an eNB beacon) may be connected using a wireless backhaul link to the MME 315 or may be supported as a repeater or relay node (RN) with no direct link to an MME but with a direct link instead to another eNB known as a donor eNB. The eNB Beacon 400 is a particular example of a positioning beacon. The terms eNB beacon, standalone eNB beacon, RN beacon and positioning beacon are all used herein to refer to entities in a RAN that transmit positioning reference signals to assist in positioning of one or more target UEs and that may or may not support other functions such as providing wireless access (e.g. for voice and data connectivity) to one or more UEs. Further, an eNB beacon, standalone eNB beacon and RN beacon may be particular examples of a positioning beacon.

The MME 315 in FIG. 4A may also communicate with a serving eNodeB 305 for a UE 302 over an S1 interface and with an MME 420 over an S10 interface, which may communicate with another eNodeB 410 over an S1 interface. The eNodeBs 305 and 410 (which may correspond to any of eNodeBs 202, 205 and 210 in FIG. 2 and/or to eNodeB 305 in FIGS. 3A and 3B) may each act as normal eNBs in supporting LTE access by UEs for voice and data transfer and may each additionally transmit a PRS signal to support OTDOA positioning of UEs. In the case of an emergency call from the UE 302, the standalone eNodeB beacon 400 may transmit in an emergency PRS mode at a high or full duty cycle and the serving eNodeB 305 and/or other eNodeB 410 may transmit in an emergency PRS mode at a high duty cycle, as will be discussed below. The UE 302 may receive the adapted PRS signals for the emergency PRS mode from the standalone eNodeB beacon 400, the serving eNodeB 305 and/or the other eNodeB 410 as well possibly as adapted PRS signals for an emergency PRS mode from other eNBs not shown in FIG. 4A.

Figure 4B:
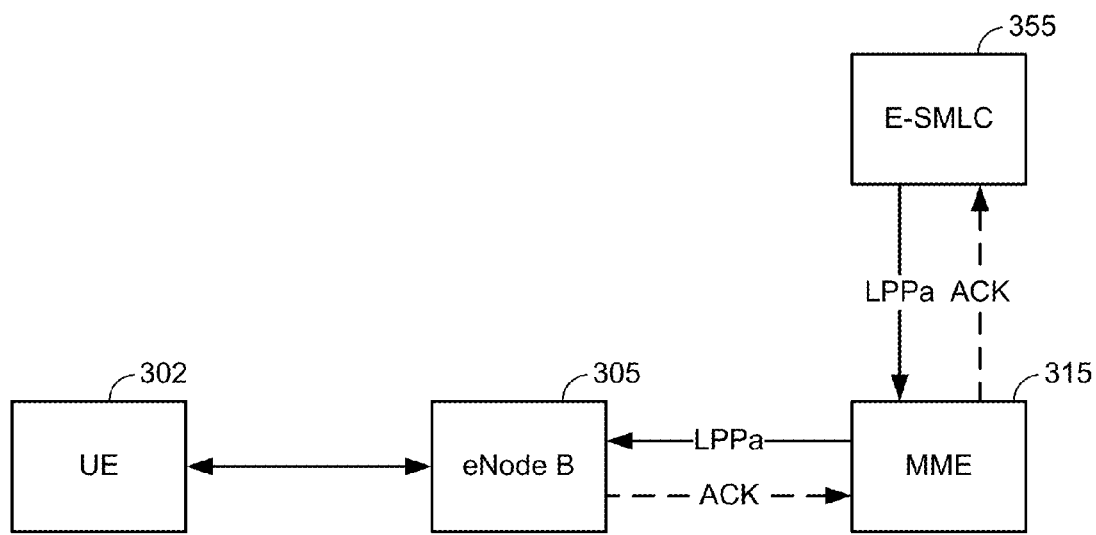
FIG. 4B illustrates an exemplary messaging flow for configuring emergency mode Positioning Reference Signal (PRS) scheduling.

FIG. 4B illustrates an exemplary messaging flow for configuring emergency mode PRS scheduling in the case that a control plane location solution is used such as that shown in FIGS. 3A, 3B and 4A. FIG. 4B illustrates the transfer of LPPa messages from an E-SMLC 355 to one or more eNBs 305 to configure adaptive PRS in the eNBs 305 for certain cells. The eNB 305 in FIG. 4B may not only correspond to the serving eNB 305 in FIG. 4A but may also represent the standalone eNB beacon 400 and the other eNB 410 in FIG. 4A from the point of view of configuring adaptive PRS in these eNBs. In the case that eNB 305 in FIG. 4B corresponds to eNB Beacon 400 in FIG. 4A, the link between eNB 305 and MME 315 may be transferred via intermediate entities and using a wireless backhaul as described in more detail further on herein. The LPPa messages transferred between E-SMLC 355 and eNB 305 in FIG. 4B may indicate the start (e.g. the start time or a starting LTE system frame number) for an emergency PRS mode and/or the start (e.g. the start time or a starting LTE system frame number) of adaptive muting of PRS transmission and/or adaptive muting of non-PRS downlink transmission (as described later herein) for a temporary period (e.g., 30 seconds) at the start of an E911 call from some target UE 302. The LPPa messages sent by the E-SMLC 355 may be transferred to the eNB 305 (or to each eNB 305) via an MME such as MME 315. The LPPa messages may be, but need not be (as indicated by the dashed lines), acknowledged by the recipient eNBs 305. The LPPa messages sent to the eNB 305 can contain detailed PRS transmission parameters and/or PRS muting parameters (e.g., affected subframes, affected frequencies, any new PRS frequency shift or encoding to be used, duration, start time, etc.) for one or more cells supported by a recipient eNB 305 or may simply contain a reference (e.g., a flag indicating "emergency PRS mode" or a numeric label referring to preconfigured PRS transmission and muting parameters in the eNB 305 for one or more cells supported by the eNB 305). The LPPa messages may also or instead indicate a serving cell or approximate location for the target UE 302 with the detailed PRS transmission and muting parameters and/or the cells to which adaptive PRS (e.g. emergency PRS mode) shall apply already being configured in advance in the eNB 305, such that the eNB 305 may use the serving cell or approximate UE location to lookup or otherwise discover the PRS transmission and muting parameters and the affected cells from the configured data. The detailed PRS transmission and muting parameters may define how PRS transmission and muting shall be modified in one or more cells supported by the eNB 305 and over which time period (or which sequence of LTE system frames) this modification shall persist. In essence, the eNB 305 (and any number of eNBs 305) may support PRS transmission and muting in a normal PRS mode under normal conditions when no locations are needed for nearby UEs due to emergency calls (or other emergency or high priority conditions) but may switch to PRS transmission and muting parameters for an emergency PRS mode temporarily when a location is needed for a nearby UE with an emergency call or other emergency or high priority location related condition.

Figure 5:
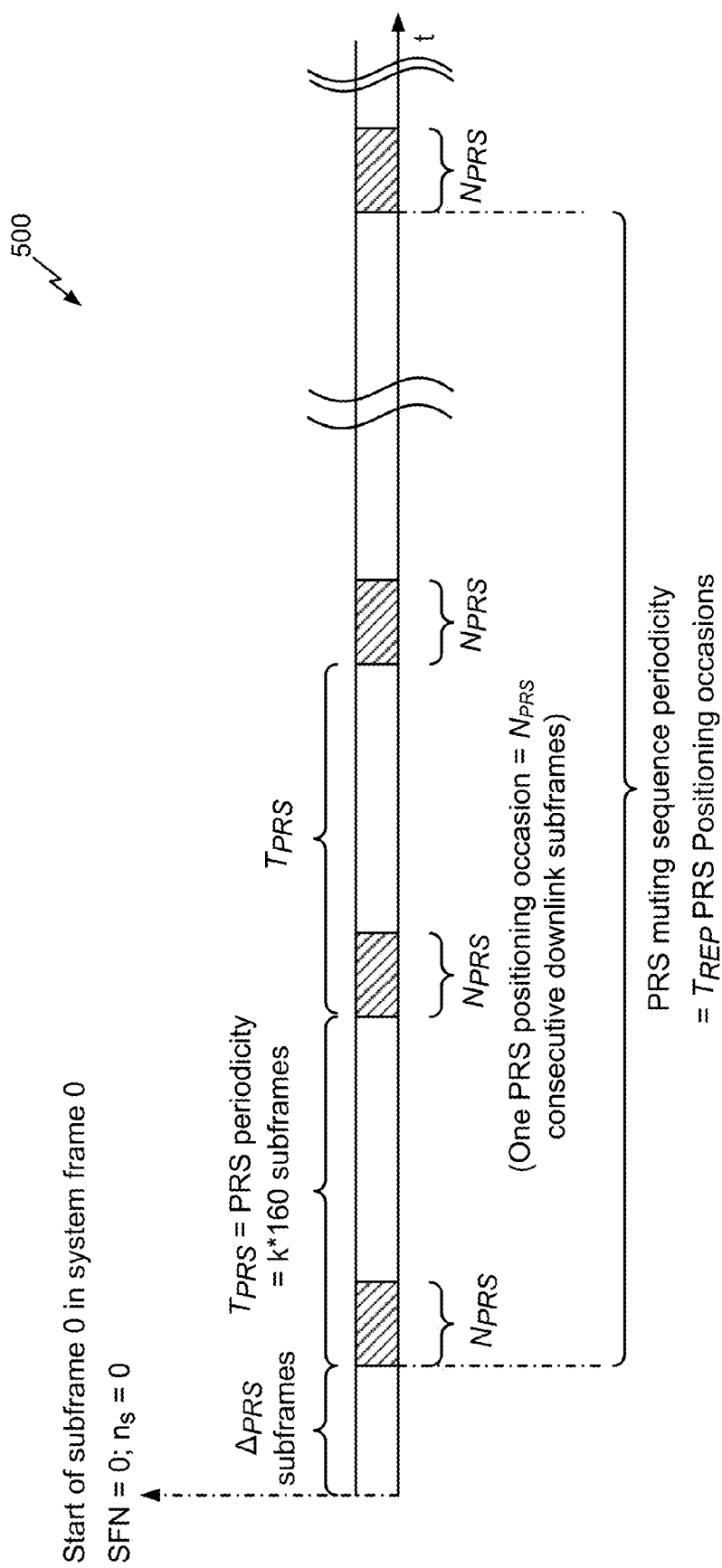
FIG. 5 illustrates a time sequence of an exemplary PRS duty cycle.

FIG. 5 shows a time sequence 500 of an exemplary PRS duty cycle. FIG. 5 illustrates a sequence of LTE subframe transmissions from an eNB (e.g. eNB 305) in a particular cell supported by the eNB starting with transmission at subframe zero in a system frame with system frame number (SFN) zero and extending to transmission from the last subframe of the system frame with SFN equal to 1023 (on the far right in FIG. 5 and not specifically shown in FIG. 5). In LTE in FDD mode, according to 3GPP TSs, each subframe has a duration of one millisecond (ms) and each system frame is composed of 10 subframes and has a duration of 10 ms. System frames can also be referred to as radio frames or simply as frames. Consecutive system frames are numbered from 0 to 1023, after which the numbering restarts again from zero for subsequent system frames. Therefore, FIG. 5 shows transmission over the longest set of subframes that can be individually and distinctly referenced (via subframe and system frame numbering) for LTE. In FIG. 5, increasing time is represented by the horizontal lines going from left to right. Groups of consecutive subframes that are used to transmit PRS, and that are referred to in 3GPP TSs (e.g., in 3GPP TS 36.211 and 36.355) as "PRS positioning occasions", are represented in FIG. 5 by the diagonally striped rectangles.

As defined by 3GPP (e.g., in TS 36.211), the sequence of subframes used to transmit PRS for OTDOA is characterized and defined by a number of parameters comprising: (i) a reserved block of bandwidth (BW); (ii) a configuration index $I_{PRS}$ (which defines both an offset $\Delta_{PRS}$ from the start of subframe zero for SFN zero to the first PRS positioning occasion and a periodicity $T_{PRS}$ in units of subframes for consecutive PRS positioning occasions); (iii) a duration $N_{PRS}$ (defining the number of consecutive PRS subframes in each PRS positioning occasion); (iv) a muting pattern (defining a sequence of consecutive PRS positioning occasions within which the PRS signal is either transmitted or is muted according to the muting pattern); and (v) a muting sequence periodicity $T_{REP}$ which can be implicitly included as part of the muting pattern in (iv). In some cases, with a fairly low PRS duty cycle, $N_{PRS}=1$, $T_{PRS}=160$ subframes (equivalent to 160 ms), and BW=1.4, 3, 5, 10, 15 or 20 MHz. To increase the PRS duty cycle, the $N_{PRS}$ value can be increased to six (i.e., $N_{PRS}=6$) and the BW value can be increased to the LTE system bandwidth (i.e., BW=LTE system bandwidth). An expanded adaptive PRS with a larger $N_{PRS}$ (e.g., greater than six) and a shorter $T_{PRS}$ (e.g., less than 160 ms), up to the full duty cycle (i.e., $N_{PRS}=T_{PRS}$), could also be used by modifying the existing definition of OTDOA, for example, in 3GPP TS 36.355. For example, a standalone eNB Beacon (e.g. eNB Beacon 400 in FIG. 4A) that is not required to reserve LTE system bandwidth for normal data and voice support could support PRS transmission at full duty cycle either normally or when using emergency PRS mode.

For the case of LTE using TDD, system frames are again each of duration 10 ms and each comprise eight available subframes for uplink or downlink transmission. The PRS parameters described above for FDD are then used to define in which downlink subframes PRS transmission occurs. Specifically, the offset $\Delta_{PRS}$ provides the number of downlink subframes from the first downlink subframe in system frame zero to the first PRS subframe; the duration $N_{PRS}$ provides the number of consecutive downlink PRS subframes in each PRS positioning occasion; and the periodicity $T_{PRS}$ provides the number of downlink subframes between the start of consecutive PRS positioning occasions. Similar to FDD mode, an expanded adaptive PRS could be defined—e.g. for emergency PRS mode.

Where the PRS usage of the operator's bandwidth is adapted to the needs of E911 calls, the PRS duty cycle and PRS power (per cell or per sector) can be adapted based on whether E911 location services are needed by a nearby UE. An operator could configure PRS parameters, including duty cycle (e.g., bandwidth BW, offset $\Delta_{PRS}$, duration $N_{PRS}$, periodicity $T_{PRS}$) and muting for two (or more) modes in each eNodeB (e.g. for each cell supported by an eNB). Configuration parameters could also include information on use of transmit diversity as described later herein in association with FIG. 18. For example, the operator could configure PRS parameters for a "normal mode" (or normal PRS mode) and an "emergency mode" (or "emergency PRS mode"). Standalone eNodeB beacons can also be adaptive to reduce interference and power usage. Configuration of PRS for normal mode may be used for location of UEs outdoors or for low priority uses of location where a UE may be indoors and may configure PRS parameters such that the fraction of downlink operator bandwidth that is used is small (e.g. 2% or less). Configuration of PRS for emergency mode may be used for location of UEs that are known to be or may be indoors or in a difficult outdoor environment where location priority is high (e.g., such as for an E911 call) and may use a higher proportion of downlink operator bandwidth (e.g., more than 2% and up to 100%).

Switching between normal and emergency PRS mode for any cell by an eNodeB can be instructed by any of (i) the MME that is serving a target UE (i.e., a UE to be located) using the S1-AP protocol defined in 3GPP TS 36.413, (ii) an E-SMLC that is attempting to locate the UE (referred to as the "target UE") using the LPPa protocol, or (iii) the serving eNodeB for the target UE using the X2 protocol. The serving MME and the serving eNodeB control can be used for both the control plane and SUPL location solutions in the case of location for an emergency call. This is because the serving MME and serving eNodeB can each be aware that a UE is instigating an emergency call due to the UE obtaining what is known in LTE as an emergency PDN connection or emergency bearer for the LTE emergency call. Hence the serving MME or serving eNodeB may send information to other eNodeBs to configure emergency PRS mode in cells nearby to the target UE in advance of location being obtained by an E-SMLC in the case of control plane location or by an E-SLP in the case of SUPL location. However, E-SMLC control may have the added benefit of allowing the E-SMLC (or an SLP associated with an E-SMLC) to send the adapted PRS parameters applicable to emergency PRS mode to the target UE thereby enabling the target UE to know which subframes in each cell will be used to transmit PRS. For a UE that establishes an emergency call using GSM, WCDMA or cdma2000 1×CS (Circuit Switched) access, a location server (in this case an SMLC, SAS or PDE) may interact with an associated E-SMLC to cause the associated E-SMLC to send emergency PRS mode configuration changes to nearby eNodeBs and the location server may also forward the emergency PRS mode parameters to the UE.

An operator could configure mode changes in eNodeBs based on the UE serving cell (e.g., use normal mode in the serving eNodeB, which may not need emergency PRS mode due to good signal strength at a UE, but use emergency PRS mode in other nearby eNodeBs). For example, an operator might determine, either via calculation or actual measurement or both, which nearby cells may be able to transmit PRS that can be acquired and accurately measured by most UEs in a particular serving cell. The particular nearby cells may be chosen so that a sufficient number will be available to be measured (e.g., 20 to 80 cells) to enable accurate OTDOA location calculation and to enable measurement of cells in all directions from a target UE (as opposed to one direction or a few directions only from a target UE) to avoid reduction in location accuracy due to geometric dilution of precision. The optimal configuration may be evaluated via manual and crowd sourced PRS measurements by UEs (e.g., test emergency PRS mode during off peak hours). For example, UEs accessing a network may be instructed by the network to perform so-called 3GPP Minimization of Drive Test (MDT) measurements, in which the UE measures characteristics (e.g. signal strength, signal quality and/or RSTD) for PRS transmission from nearby cells and in addition reports the UE serving cell, UE location and/or UE location related measurements (e.g., RSTD measurements) to an MDT server in the network. This may be done during off peak hours when some or all cells are using emergency PRS mode. An operator can then evaluate the results to determine for which cells emergency PRS mode transmission can be accurately measured in each cell of the network. An operator may then adjust emergency PRS mode configuration parameters to find an optimum configuration that typically enables accurate measurements by UEs in each serving cell of PRS transmission from a sufficient number of nearby cells to enable accurate OTDA location. This trial and error measurement and adjustment may not only optimize PRS transmission bandwidth (e.g., avoid assigning more bandwidth and more subframes for PRS than is needed) but may also attempt to reduce interference by muting normal transmission and/or PRS transmission from some cells during transmission of PRS from other cells.

In the case of scheduling when different eNodeBs/cells switch between normal and emergency PRS modes, when many E911 calls occur together over the same small area (e.g., in the case of a serious accident or a disaster), a third configuration mode could be useful in which the PRS duty cycle is increased in a large number of cells spanning an area larger than that typically affected when only a single UE is being located. The E-SMLC (or SLP) may be in the best position to infer that a widespread emergency situation has occurred since it would receive a large number of location requests for E911 calls associated with UEs in the same cell or in nearby cells. In the case that many E911 related locations were needed for the same cell or a set of nearby cells, an E-SMLC (or SLP) could invoke a third PRS mode in cells that could be measured over all serving cells for the target UEs. The third PRS mode might have a lower PRS duty cycle than for emergency mode to reduce interference between cells or might employ additional muting in some cells during PRS transmission from other cells. Configuration of emergency PRS mode could also be based on which cells a target UE reports as being receivable, for example, using the 3GPP ECID location method. As an example, cells known to be receivable by a target UE (from ECID measurements provided by the target UE) might continue to use normal PRS mode or a lower PRS duty cycle for emergency PRS mode while nearby cells not known to be receivable (e.g., a cell that is not usable as a serving cell) might switch to emergency PRS mode at a higher PRS duty cycle.

Figure 6A:
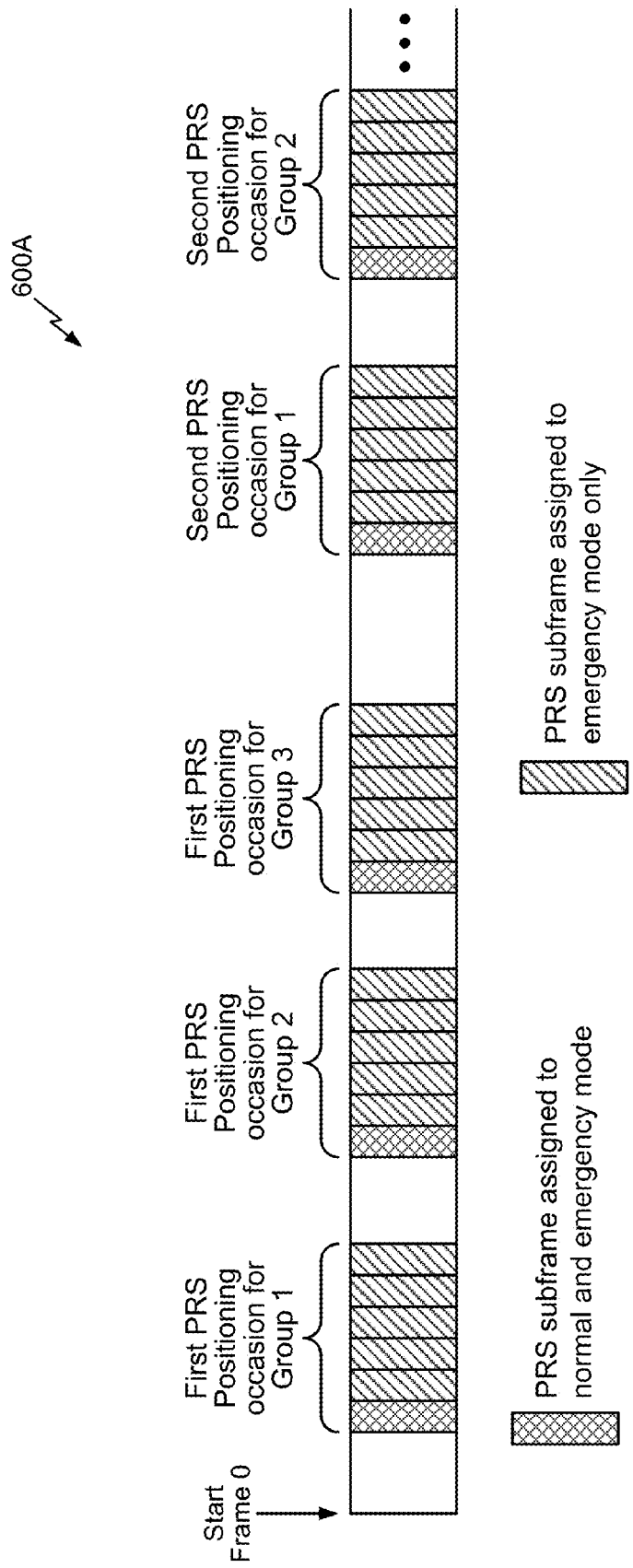
FIG. 6A illustrates an exemplary subframe sequence for an adaptive PRS configuration.

FIG. 6A illustrates an exemplary subframe sequence 600A for an adaptive PRS configuration. To simplify configuration of normal and emergency PRS modes for any possible combination of PRS modes in different cells, cells may be partitioned into groups in which each group uses the same PRS offset, PRS periodicity and PRS muting sequence periodicity parameter values (i.e. the same $I_{PRS}$ and $T_{REP}$ parameter values but with possibly different muting patterns, different PRS frequencies and/or different PRS code sequences), and where the number of consecutive PRS subframes $N_{PRS}$ for each group has a lower value for normal PRS mode and a higher value for emergency PRS mode. The subframe sequence 600A illustrated in FIG. 6A may apply when LTE transmission is synchronized in all network cells such that the same subframes (e.g. subframe zero of system frame zero and each subsequent subframe) are transmitted at exactly the same times in all cells.

FIG. 6A illustrates subframe usage for PRS transmitted in different cells over a sequence of subframes starting at subframe zero in system frame zero on the left and progressing towards the last subframe in system frame 1023 on the far right (not shown in FIG. 6A). Subframes that are used for PRS in normal mode and for PRS in emergency mode are highlighted for different groups. Three groups of cells are shown in this example and the PRS positioning occasions for each group are distinguished. Since transmission is synchronized, FIG. 6A illustrates that the PRS positioning occasions for the three groups of cells can occur at different times (in different sets of subframes) and that when one group of cells is transmitting PRS subframes, the two other groups of cells are not transmitting PRS. As illustrated in FIG. 6A, interference between the PRS positioning occasions for the three groups of cells can be avoided provided there are no overlaps between positioning occasions for the emergency mode for the three groups of cells with $N_{PRS}$ values (in this example) of one (1) for normal PRS mode and six (6) for emergency PRS mode.

The transmission arrangement shown in FIG. 6A does not necessarily avoid interference between PRS transmission by any one group of cells and non-PRS transmission by either of the two other groups of cells (though as described later herein, this interference can be avoided). Thus, in some implementations, all or most cells in a network may belong to one group (e.g. Group 1) with the other two groups not being present.

Figure 6B:
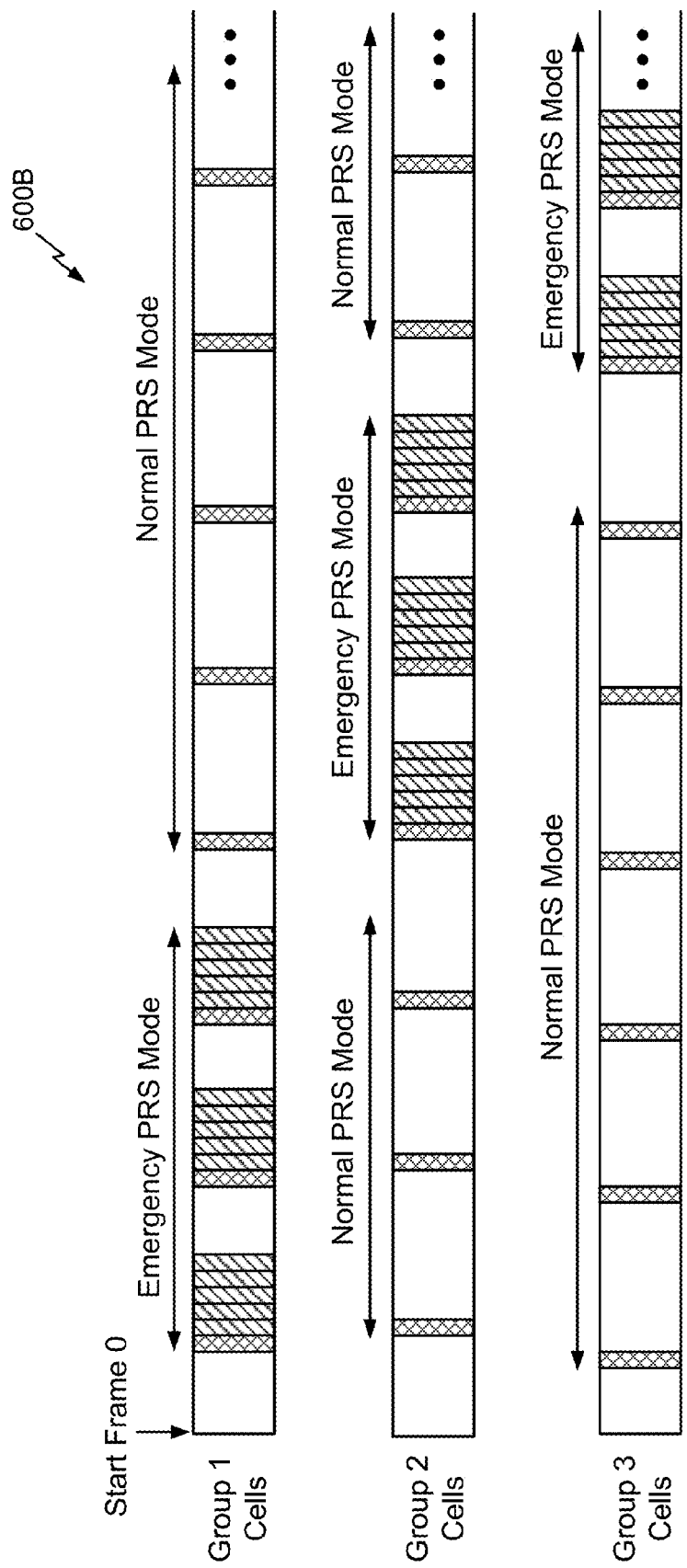
FIG. 6B illustrates exemplary subframe sequences for scheduling the emergency PRS mode.

FIG. 6B illustrates exemplary subframe sequences 600B for scheduling the emergency PRS mode in three groups of cells. With scheduling, emergency PRS mode can be used by one group of cells during different (e.g. non-overlapping) time periods to emergency PRS mode transmission by other groups of cells to reduce the impact on operator bandwidth usage. For example, a first group of cells (e.g. which may comprise only one cell or more than one cell) can be switched into emergency PRS mode from a time T (according to some time system such as UTC time or local time) to a time T+t (e.g., where T corresponds to the start of attempting to locate a target UE and t is some fraction of the overall time period available to locate the UE such as 10 seconds in the case that 30 seconds is available overall). A second group of cells may then be switched into emergency PRS mode between time T+t and T+2t and a third group of cells may be switched into emergency PRS mode from a time T+2t to T+3t. At times other than those scheduled for emergency PRS mode, each group of cells may be transmitting PRS in normal PRS mode. In this example, each group of cells is only using emergency PRS mode for a time t, although the overall period of location is 3t (or more). Therefore, the impact to operator bandwidth is reduced for each group of cells compared to the case where each group of cells transmits emergency PRS mode for the entire duration of UE location (e.g., for a period of 3t or more).

Furthermore, because each group of cells transmits emergency PRS during a different time period t than the other groups of cells, interference between PRS transmission by the different groups is avoided. The target UE may be informed (e.g., by an E-SMLC or SLP) when each group of cells will be transmitting emergency PRS mode, thereby allowing the UE to make measurements of PRS for each cell only while that cell is transmitting emergency PRS mode (as opposed to normal PRS mode).

The example in FIG. 6B shows the timing of PRS transmission by cells in each group using the convention shown in FIG. 6A to distinguish PRS subframes assigned to both normal and emergency PRS modes from PRS subframes assigned only to emergency PRS mode. In this example, emergency PRS mode for each group of cells consists of three consecutive PRS positioning occasions each containing six consecutive downlink PRS subframes which occur at different times to the emergency PRS positioning occasions for the other two groups. When any cell is not transmitting emergency PRS mode, it is transmitting normal PRS mode (in this example positioning occasions each comprising one PRS subframe). The emergency PRS mode in cells near a target UE can thus be staggered, as illustrated in FIG. 7B, by having only a fraction of the cells (e.g. a third of the cells) transmit using emergency PRS mode at the same time. This may reduce the impact to normal traffic (e.g., by reducing the amount of operator bandwidth used for PRS), may reduce interference between the PRS transmission of neighbor cells (e.g., between cells in groups 1, 2 and 3 in FIG. 6B), and may improve OTDOA measurement accuracy and the number of cells for which OTDOA measurements can be made due to the increased PRS duty cycle during emergency PRS mode (e.g. the extra number of PRS subframes and possibly higher bandwidth and higher transmit power). An E-SMLC (or an MME or a serving eNB) can schedule the time at which each cell switches from normal to emergency PRS mode and back again to normal mode and can inform the UE. Time scheduling information provided to a UE can be relative to the OTDOA reference cell, the UE serving cell or the cell for which scheduling information is provided In order to reduce interference at a target UE for PRS positioning occasions transmitted from more distant eNodeBs, eNodeBs near to a target UE can mute downlink (DL) transmission in one or more of their cell sectors during these PRS positioning occasions. Such muting is referred to herein as "adaptive muting" and may be configured as for emergency PRS by an E-SMLC, MME or eNB. The muting may occur during normal or emergency mode PRS positioning occasions, in which case for the cell that is being muted, the eNB would not transmit the PRS signal in the assigned PRS subframes and within the assigned PRS bandwidth but would instead not transmit anything (i.e., would be muted). This type of muting may need to be made known to both the eNB that is being muted and the target UE (so that the UE knows when PRS will and will not be transmitted within the cell by this eNB). However, muting does not need to occur only during PRS positioning occasions, but can also or instead be scheduled during other downlink (DL) subframes (e.g., subframes normally used to send data, voice or control information not associated with positioning). This additional muting of normal DL subframes can reduce interference to PRS transmission from other cells and can be scheduled to occur only during a limited period (e.g., of 30 seconds) as for scheduling of emergency PRS mode in order to restrict the effective reduction in operator DL bandwidth to a short period. By muting normal DL transmission from eNodeBs nearby to a target UE in addition to (or instead of) muting some of the PRS positioning occasions of these eNodeBs, it may be possible to increase the number of distant eNodeBs whose PRS positioning occasions will encounter reduced interference and can thus be acquired and accurately measured by a target UE.

In an extreme case, each eNodeB could transmit at least one PRS positioning occasion in at least one cell every 10.24 seconds during which all eNBs nearby to a target UE would be muted in cells that the target UE can receive. Such adaptive muting can be backward compatible with legacy UEs because the adaptive muting of normal DL transmission only needs to be provided to eNodeBs and need not be known by a target UE because the adaptive muting does not affect the PRS positioning occasions that the target UE needs to measure. Adaptive muting may be seen as an extension of existing PRS muting that impacts eNodeBs but not UEs.

FIG. 6C illustrates exemplary frame sequences 600C showing adaptive muting among three groups of cells. In the example shown in FIG. 6C, all cells may be approximately or exactly synchronized to the same subframe and system frame timing. FIG. 6C then shows PRS positioning occasions used for normal and emergency PRS mode from three groups of cells, where time is represented horizontally with time increasing from left to right and with the start of system frame zero for each group of cells shown on the extreme left and the end of system frame 1023 shown on the extreme right beyond the confines of FIG. 6C, and thus not shown in FIG. 6C. Adaptive muting may be used to increase the frequency of PRS positioning occasions while reducing interference.

Referring to FIG. 6C, PRS positioning occasions for normal PRS mode each comprise one subframe, but for emergency PRS mode each comprise six consecutive subframes. The first subframe in each group of six consecutive PRS subframes (for each of the three groups of cells) for emergency PRS mode comprises the single PRS subframe that would be transmitted during normal PRS mode. The next five PRS subframes are transmitted only when the eNodeB/cell is in the emergency PRS mode, for a total of six PRS subframes in emergency mode. As illustrated in FIG. 6C, the cells in the three groups transmit the six PRS subframes (for each of their emergency PRS positioning occasions) at different non-overlapping times. This means that although the cells in a particular group may interfere with each other with regard to non-PRS transmission, they would not interfere with the cells in the other groups with respect to transmitting PRS occasions at the same time.

Since PRS may be transmitted at higher power and with a more easily acquired sequence of symbols, transmitting PRS from certain cells while other cells transmit non-PRS signals may not encounter significant interference as long as the other cells are not near a target UE. However, in the case of cells near a target UE (e.g. a serving cell), normal transmission (e.g., of data, voice, or control information) may interfere with PRS transmission from more distant cells. Adaptive muting can then be used to mute normal transmissions from these nearby cells during PRS transmission from one or more distant cells.

This is illustrated in FIG. 6C in the example case of a cell in group 3 that is near a target UE. For this cell (as shown by the lowest of the four transmission sequences in FIG. 6C), the cell can mute its downlink transmissions when the other cells are transmitting using the emergency PRS mode. The muted cell would (in this example) only transmit PRS in the normal mode, and would mute its downlink transmissions when the other cells are transmitting PRS in the emergency mode. The eNB for the muted cell would receive a muting schedule (e.g., defining subframes in which normal DL transmission is to be muted) from the network entity controlling the PRS scheduling, such as the E-SMLC, the MME, or the serving eNodeB (unless the eNB being muted is the serving eNB and the serving eNB controls the muting and emergency PRS scheduling). The muting for the example cell in Group 3 in the example shown in FIG. 6C only needs to occur within the frequency and bandwidth range assigned to PRS transmission from other cells and thus the cell may be able to transmit within muted subframes using other frequencies and bandwidth if not all operator available bandwidth was assigned to PRS transmission.

In some cases, an emergency PRS schedule and a muting schedule could be preconfigured in an eNB for each cell that the eNB supports and an E-SMLC, MME, or eNB may just refer to the preconfigured information (e.g., using a flag or a number) without needing to provide all the parameters defining the emergency PRS schedule and muting schedule. In some cases, preconfiguration could be dependent on the serving cell for a target UE or an approximate location for a target UE such that the schedule and other parameters (e.g. power, bandwidth, frequency) for emergency PRS mode and an adaptive muting sequence may be different (e.g., configured differently) depending on the serving cell or approximate location for the target UE.

FIG. 7 illustrates an example message flow for OTDOA with adaptive PRS performed in association with the 3GPP control plane location solution for LTE. In FIG. 7, existing messages and sequences of messages that may not need to be modified or added to support adaptive PRS are illustrated as light (unshaded) arrows whereas new and/or modified messages are illustrated as shaded arrows. Each arrow may represent more than one message being exchanged. In this example, MME 315 is the serving MME for UE 302 and eNB1 305 is the serving eNB.

Although not illustrated in FIG. 7, the flow begins with a user making an emergency call (e.g., dialing 9-1-1). At step 1 in FIG. 7, the UE 302 obtains an emergency PDN connection to a PDG (e.g. PDG 235 in FIG. 2 or FIG. 3A but not shown in FIG. 7). At this point, the serving eNB1 305 and the serving MME 315 are aware that the UE 302 has initiated an emergency call since both are involved in providing an emergency PDN connection and an emergency bearer to UE 302. The MME 315 may also notify the GMLC 345 that the UE 302 has initiated an emergency call (not shown in FIG. 7) so that the GMLC 345 knows to which MME to send the message at step 6. In some implementations, MME 315 may instigate location of UE 302 after step 1 in which case steps 7 to 13 may occur earlier than shown in FIG. 7.

At step 2, the UE 302 sends a SIP INVITE message to the IMS 370 (e.g. the IMS 370 illustrated in FIG. 3A) to start the establishment of an emergency call. At step 3, the call is routed by the IMS 370 to the PSAP 385/395 using a SIP INVITE message if the PSAP 385/395 is IP-capable, or as a CS call if the PSAP 385/395 is not IP-capable. The routing at step 3 may involve routing through intermediate entities not shown in FIG. 7 (e.g. a SIP routing proxy in the case of IP forwarding or a Selective Router in the case of CS call forwarding). At the end of steps 2 and 3, the emergency call has been established between the UE 302 and the PSAP 385/395.

At step 4, after the emergency call is established between the UE 302 and the PSAP 385/395, the PSAP 385/395 can request the location of the UE 302 from the IMS 370 (e.g., from an LRF 375 in the IMS 370 whose address or identification may have been included with call related information transferred to PSAP 385/395 from IMS 370 as part of step 3). The IMS 370 (e.g., an LRF 375 in IMS 370) forwards the request to the GMLC 345 at step 5. At step 6, the GMLC 345 sends a Provide Subscriber Location request to the MME 315 and includes an identification for UE 302 (e.g. an IMSI or IMEI). In response, the MME 315 sends a location request for UE 302 to the E-SMLC 355 at step 7.

At this time, the E-SMLC 355 begins positioning the UE 302. At step 8 and step 9, the E-SMLC 355 sends emergency mode PRS scheduling information for one or more cells nearby to UE 302 (e.g., duration, bandwidth, power, frequencies, in which subframe(s) to transmit and/or mute PRS, other downlink time slots to mute, PRS frequency shift, etc.) to involved eNodeBs 305 and 410 using LPPa messaging, instructing them to switch to (or when to switch to) the emergency PRS mode. "Involved" eNodeBs 305 and 410 may include the serving eNB1 305, nearby eNodeBs, more distant eNodeBs and/or one more standalone eNB beacons such as eNB Beacon 400 in FIG. 4A. A wireless backhaul, as described later herein, may be used to enable transfer of LPPa messages to any eNB beacon in steps 8 and 9 and to transfer any LPPa response such as an acknowledgment back to E-SMLC 355. Although FIG. 7 only illustrates two eNodeBs, it is apparent that there may be any number of involved eNodeBs. Moreover, the involved eNodeBs may include the serving eNB1 305 as in FIG. 7 or may omit the serving eNB1 305 (not shown in FIG. 7).

In response, the involved eNodeBs 305 and 410 will begin transmitting PRS and/or muting downlink transmissions according to the adaptive PRS schedules received at steps 8 and 9. This may occur immediately the messages in steps 8 and 9 are received or sometime after the messages are received—e.g. may begin only after a new sequence of 1024 subframes starting at SFN zero begin to be transmitted or following some delay period included in or referred to by the messages sent at steps 8 and 9. The messages sent to the eNBs at steps 8 and 9 may be according to the LPPa positioning protocol (e.g., may be new or modified LPPa messages).

The emergency PRS mode scheduling information sent to each eNB at steps 8 and 9 may be detailed and define all parameters related to PRS transmission, PRS muting, normal DL transmission muting, start and stop time, use of transmit diversity, use of a different PRS frequency shift, use of a different PRS code sequence, etc. The information conveyed at steps 8 and 9 may also indicate the cell or cells for which the emergency PRS mode scheduling information applies at an eNodeB (e.g. in the case that an eNodeB supports more than one cell) and may provide different emergency PRS mode scheduling information for each cell supported by an eNB. Alternatively, the emergency PRS mode scheduling information may be a reference to information that is already configured in eNBs 305/410 defining particular types of PRS emergency transmission, muting, and start and stop times. The reference may make use of a flag, a number, an alphanumeric label or some other identifier to refer to a specific set of preconfigured parameters and possibly an indication of a particular cell. Alternatively or in addition, provided information may include characteristics of the target UE, such as the current serving cell identification and/or approximate UE location. A recipient eNB may then map the information (e.g., a serving cell ID or approximate UE location) to a particular configured set of emergency PRS and adaptive muting parameters.

The emergency mode PRS signals transmitted by a first eNodeB such as eNodeB 305 for a particular cell, as a consequence of receiving the information at step 8 or step 9 may be at least partly orthogonal to the PRS signals transmitted by a second eNodeB, such as eNodeB 410, for a second cell in the time domain, the frequency domain, and/or the code domain. As a consequence, the PRS signals transmitted by the first eNodeB for the first cell and the PRS signals transmitted by the second eNodeB for the second cell may be transmitted at different times, using different PRS frequency shifts, or using different PRS code sequences. The orthogonality may also apply to PRS transmission from the same eNodeB for two different cells supported by the eNodeB.

Transmitting PRS signals in one cell that are partly or completely orthogonal to PRS signals transmitted in another cell may reduce or eliminate interference between the PRS signals and assist in PRS signal acquisition and accurate measurement by the target UE (e.g. UE 302 in the example of FIG. 7). For example, PRS signals that are orthogonal in the frequency domain may not interfere with one another even when transmitted at the same time, although they may prevent a UE from measuring both PRS signals at the same time. PRS signals that are orthogonal in the time domain may be transmitted at different times and will then be non-interfering and may both be measured by a target UE.

PRS signals that use different code sequences of symbols may be transmitted at the same time and using the same frequencies but may encounter reduced interference if the UE acquires and measures only one of the code sequences.

An operator may preconfigure emergency PRS parameters (e.g., PRS bandwidth, PRS power, PRS frequency shifts, PRS code sequence, PRS subframes, muted subframes, etc.) in a controlling entity such as an E-SMLC or in recipient eNBs such that emergency PRS transmission in different cells from different eNBs (e.g., between a nearby eNB and a more distant eNB) or from the same eNB is partly or completely orthogonal relative to the frequency domain, time domain, and/or code domain.

Returning to FIG. 7, at step 10, the E-SMLC 355 sends assistance data to the UE 302 in the form of an LPP and/or LPPe Provide Assistance Data message. The assistance data includes, in addition to the typical assistance data for OTDOA (e.g. such as the identities of a reference cell and neighbor cells for which OTDOA measurements are needed), at least part of the PRS schedule of each cell the UE 302 will need to measure (e.g. the cells of eNodeBs 305 and 410 in the example of FIG. 7). The PRS schedule provided to UE 302 may include the scheduling and/or muting sequence for emergency PRS mode from each cell UE 302 may need to attempt to measure (e.g., may include the parameters discussed in association with FIG. 5, extensions to these parameters such as higher bandwidth BW, increased periodicity $T_{PRS}$, increased number of subframes $N_{PRS}$, information on when emergency PRS mode will start and stop, and/or may include other parameters such as PRS frequency shifts and/or PRS transmit diversity). Additional information may also be sent to UE 302 at step 10 such as eNB location coordinates and eNB transmission timing relative to other eNBs. Some or all of the information transferred at step 10 may be conveyed in some implementations using an LPPe message embedded in an LPP message. In some implementations, the LPP and/or LPPe Provide Assistance Data message sent at step 10 may provide assistance data for other position methods in addition to OTDOA—e.g. may provide assistance data to UE 302 for A-GNSS, ECID and/or WLAN positioning.

At step 11, the E-SMLC 355 sends the UE 302 an LPP and/or LPPe Request Location Information message, which instructs the UE 302 to begin making OTDOA measurements making use of the assistance data received at step 10. The LPP and/or LPPe Request Location Information message sent at step 11 may provide additional information to UE 302 (e.g., concerning PRS emergency mode transmission from nearby cells) and may include an embedded LPPe massage when both LPP and LPPe are used. In some implementations, the LPP and/or LPPe Request Location Information message sent at step 11 may request UE 302 to make other measurements in addition to OTDOA measurements—e.g. may request UE 302 to make A-GNSS measurements, ECID measurements and/or WLAN measurements. Following step 11 (and not shown in FIG. 7), UE 302 performs some or all of the measurements requested at step 11 and may compute a location estimate—e.g. if requested at step 11. At step 12, the UE 302 sends an LPP and/or LPPe Provide Location Information message to the E-SMLC 355. The LPP and/or LPPe Provide Location Information message may include a location estimate of the UE (if the UE 302 was able to compute this based on information received at step 10 and/or step 11 and based on OTDOA and any other measurements made by the UE 302). The LPP and/or LPPe Provide Location Information message may also or instead include the OTDOA measurements (and any other measurements) made by UE 302 as instructed by the message transferred at step 11. The E-SMLC 355 can use the received measurements to compute the location of the UE 302.

At step 13, the E-SMLC 355 sends the UE 302's location to the MME 315. At step 14, the MME 315 sends the UE 302's location to the GMLC 345, which forwards the location to the IMS 370 at step 15. The IMS 370 (e.g. an LRF 375 in IMS 370) then forwards the location to the PSAP 385/395 at step 16.

If a user plane SUPL solution was being used to obtain the location of the UE 302 instead of a control plane solution as shown in and described above for FIG. 7, then steps 1 to 4 described previously for FIG. 7 may continue to be valid. However, at step 5, instead of the IMS 370 sending the location request to the GMLC 345, the IMS 370 would send the location request to an E-SLP, such as the E-SLP 335 shown and described with reference to FIG. 3A, and steps 6, 7, 13, 14 and 15 would not occur. Instead of steps 6 and 7, the E-SLP could notify the E-SMLC 355 of the location request received from the IMS 370 (e.g., notify a physically separate E-SMLC 355 or notify a function within the E-SLP able to perform some of the functions of a physically separate E-SMLC 355). The E-SMLC 355 would then send the messages shown and described for steps 8 and 9 to eNBs nearby to UE 302.

The E-SLP would then initiate a SUPL session with the UE 302 (e.g., by sending a SUPL INIT message to the UE 302 using UDP and IP via the PDN Gateway 235 and Serving Gateway 230 in the case of FIG. 3A). As part of this SUPL session, steps 10, 11 and 12 in FIG. 7 would now occur between the UE 302 and the E-SLP (i.e. with the E-SLP replacing the E-SMLC 355 shown in FIG. 7 for these 3 steps) wherein the LPP and/or LPPe messages transferred at steps 10, 11 and 12 in FIG. 7 would be transported inside SUPL ULP messages (e.g., inside SUPL POS messages defined by OMA). The E-SLP would then receive the location of UE 302 at step 12 or OTDOA (and possibly other) measurements at step 12 enabling the E-SLP to obtain or compute a location for UE 302 at step 12. The E-SLP would then send the location to the IMS 370. The IMS 370 would then forward the location to the PSAP 385/395 as at step 16 in FIG. 7.

In another aspect, one or more eNodeBs, such as eNodeB 305 and/or 410, can autonomously initiate the emergency PRS mode upon receiving or intercepting a request to support an emergency call associated with UE 302 (e.g., such as a request to obtain an emergency PDN connection at step 1 of FIG. 7, a request for an emergency attach at step 1 or a request to establish an emergency related bearer which may form part of step 1 in FIG. 7). The eNodeB(s) may have been preconfigured with an emergency PRS schedule that it (or they) can switch to in response to receiving (or intercepting) the request to support the emergency call. Each eNodeB in a given area may have been preconfigured with the same or complimentary emergency PRS mode schedules, thereby permitting the coordination of PRS scheduling described herein (e.g., with reference to FIGS. 6A-C). The eNodeBs may still receive additional emergency PRS scheduling information from the E-SMLC 355 at steps 8 and 9 in FIG. 7. In the case that only a single eNodeB receives or intercepts the request to support the emergency call (e.g. the serving eNB1 305), the eNodeB can advise other nearby eNBs of the emergency call using the 3GPP X2 interface and can in addition indicate the serving cell for the UE 302 to the other eNBs if the eNB is the serving eNB 305. An indication of a serving cell may be used by eNBs to select among different emergency PRS schedules and other different configuration information as described previously.

The one or more eNodeBs may also provide assistance data to UE 302 similarly to step 10 of FIG. 7 (e.g. instead of step 10 or in addition to step 10). In that case, each eNodeB may provide its own emergency PRS schedule as the assistance data. Each eNodeB may provide the assistance data point-to-point to UE 302 or may provide assistance data containing its normal PRS schedule and/or emergency PRS schedule via broadcast (e.g., using eMBMS or LTE SIBs) and not need to interact point-to-point with UE 302. Where multiple eNodeBs are preconfigured with the same or complimentary emergency PRS schedules, only one eNodeB may need to transmit a PRS schedule to the UE 302. For example, only one eNodeB may provide the emergency PRS schedule for itself and for other eNodeBs and may send messages to these other eNodeBs (e.g., using the LTE X2 interface) containing an emergency PRS schedule to enable these other eNodeBs to switch to emergency PRS. In the case of a standalone eNB Beacon, broadcast of information concerning an emergency PRS mode schedule (and normal PRS mode) may be a convenient way of sending this information to target UEs since a UE might not ever access a standalone PRS Beacon as a serving eNB.

Regarding inter-radio access technology (inter-RAT) OTDOA, a UE accessing a network with a radio technology different than LTE (e.g., a UE accessing a network or AP supporting cdma2000, GSM, WCDMA, or WiFi) could be positioned by a location server within or associated with this network (e.g., a location server that is an SMLC, SAS, PDE, SLP, or of some other type). The location server may still make use of OTDOA to locate the UE if there is an LTE network providing LTE radio coverage at the location of the UE (e.g., an LTE network belonging to the operator for the network that the UE is currently accessing). The location server may then redirect the UE to make OTDOA measurements (e.g., RSTD measurements of PRS signals transmitted by eNBs in the LTE network). The redirection may be accomplished if the location server sends assistance data and/or a measurement request to the UE indicating cells in the LTE network that the UE should measure (e.g., to obtain OTDOA measurements) and providing information (e.g., concerning LTE radio frequency, PRS positioning occasions, expected PRS timing) to the UE to enable the UE to acquire and measure PRS signals transmitted within these cells. The information sent by the location server to the UE to enable the redirection may be similar to or the same as the information sent at steps 10 and 11 in FIG. 7.

The information may be sent within a positioning protocol (e.g., RRLP, RRC, IS-801, LPP/LPPe) that is used between the location server and the UE and is particular to the network the UE is currently accessing. The UE may then tune to the frequency or frequencies used by the LTE network and make OTDOA measurements (e.g., RSTD measurements) for cells in the LTE network and may then return the OTDOA measurements or a computed location based on these measurements to the location server using the positioning protocol (e.g., RRLP, RRC, IS-801 or LPP/LPPe) used between the location server and the UE.

To reduce changes to this positioning protocol and UE and location server impacts to support these changes, the information sent by the location server to the UE and the information returned by the UE to the location server may be conveyed by embedding LPP or LPP/LPPe messages (e.g., LPP and/or LPP/LPPe messages similar to or the same as those described for steps 10-12 in FIG. 7) inside messages for this positioning protocol in the case that the positioning protocol is not LPP or LPP/LPPe. This may avoid the need to define a set of new parameters and/or new messages for the positioning protocol. The embedding may be accomplished by embedding an octet string containing an LPP or LPP/LPPe message (e.g., embed an LPP Provide Assistance Data to send PRS information to a UE for nearby eNBs as at step 10 in FIG. 7). Alternatively, new parameters (e.g. new ASN.1 parameters) can be added to the positioning protocol that are either imported from LPP and/or LPPe or based on LPP and/or LPPe to enable reuse of LPP and/or LPPe parameters.

Furthermore, in order to switch certain cells in the LTE network from normal PRS mode to emergency PRS mode and/or in order to schedule emergency PRS mode and adaptive PRS muting for these cells, the location server may send messages to eNBs in the LTE network to provide instructions regarding switchover to emergency PRS mode and information for emergency PRS scheduling and/or adaptive PRS muting. The messages may be sent as LPPa messages and may be sent by an E-SMLC (e.g., as in steps 8 and 9 in FIG. 7) if the location server contains E-SMLC capability or can instruct a separate E-SMLC to send these messages.

To support accurate OTDOA positioning for a target UE that is indoors, the UE receives and measures PRSs from at least 3 eNBs while indoors, and preferably a larger number of eNBs such as approximately 20 to 80. However, in some indoor environments, only a few eNBs, or sometimes only one eNB (e.g. a serving eNB), may be visible to a UE. In these cases, even though PRS signals can be sent by eNBs using emergency PRS mode with higher power and/or using a code that is more easily acquired and measured by the target UE through signal integration over time, the UE may not be able to measure sufficient PRSs to enable an accurate location to be determined Therefore, a network operator may deploy additional eNB beacons, such as eNB Beacon 400 in FIG. 4A, at various places in the environment, e.g., attached to the side of a building, mounted on a roof, inside of a building, etc., to ensure sufficient PRS coverage. Like other eNBs in the system, these standalone eNB beacons may be configured to connect to certain network entities such as an MME and/or E-SMLC in order to allow the network side (e.g., an MME and/or E-SMLC, etc.) to control PRS transmission from the eNB beacon (e.g., by instructing increases and/or reductions in PRS frequency, bandwidth, power, etc.) and allow an E-SMLC to obtain PRS information, such as PRS timing, from the eNB beacons.

Positioning beacons, such as standalone eNB beacons, may be deployed to extend LTE coverage and enable a UE that is being positioned to receive and measure PRS signals from a larger number of eNBs possibly oriented in different directions from a target UE. However, PRS transmission from eNB beacons may cause interference with PRS and non-PRS transmission from other eNBs, and may thus need to be limited (e.g. by limiting PRS bandwidth, PRS positioning occasions and/or PRS power) whenever no high priority location (e.g. location for an emergency call) of any nearby target UE is needed. Moreover, when a target UE needs to be located using OTDOA with high priority, PRS transmission from nearby eNB beacons may need to be increased (e.g. via increase of PRS positioning occasions, PRS power and/or PRS bandwidth) to enable PRS signal acquisition and accurate measurement by the target UE. This implies that normal and emergency PRS modes may need to be supported by eNB beacons (e.g. eNB Beacon 400 in FIG. 4A) just as for normal eNBs (e.g. eNB 305 and eNB 310 in FIG. 4A). In some cases, to limit interference and conserve power, normal PRS mode in some eNB beacons may comprise not transmitting any PRS signal, whereas emergency PRS mode may comprise transmitting a PRS signal at a high or even full duty cycle. The need to adjust PRS transmission from an eNB beacon implies the need for eNB beacons to be capable of control by an E-SMLC (e.g. using LPPa as illustrated in FIG. 7) or by an SLP or an MME or other eNodeB as described both previously and later herein. Connection of an eNB to network entities in a core network is generally achieved via the allocation of network backhaul resources by an operator, e.g., using a LAN cable or a microwave link to connect an eNB to an MME in the control plane and to a serving gateway (SGW) in the user plane. However, allocation of these backhaul resources to connect an eNB beacon to an operator's core network makes the deployment of eNB beacons potentially expensive. Accordingly, a wireless backhaul connection may be enabled to eNB beacons from core network entities such as SGWs and MMEs. For example, an eNB beacon capable of supporting a wireless backhaul connection may only need a local power source or may even be provided with its own battery power source and be enabled to function with minimal dependence on other entities.

The expenses associated with beacon backhaul connectivity as described above may be reduced by deploying eNB beacons in the form of relays or repeaters. For example, a repeater (i.e., a level 1 relay) eNB beacon may be supported by the eNB Beacon 400 in FIG. 4A and may be configured to repeat the PRS portion and (optionally) one or more System Information Blocks (SIBs) transmitted by another eNB (referred to as the donor eNB) such as eNB 305 in FIG. 4A. The timing of the repeater may be either fixed relative to the donor eNB or fixed absolutely using a GNSS receiver. As another example, a relay (e.g., a level 2 relay) may be configured to perform the above-described actions of the repeater in addition to changing the PRS coding and/or PRS frequency shift used by the source eNB, e.g., by using a different coding and/or different PRS frequency shift for the PRS signal based on a different Physical Cell ID (PCI) for the relay eNB or some other value for the relay eNB, thereby enabling a nearby target UE such as UE 305 to distinguish, and thus separately measure, the relayed PRS from the source PRS. More details of exemplary methods based on use of a relay are provided later herein.

As another example, the expenses associated with eNB beacon backhaul connectivity as described above may be reduced by deploying small cell eNB or HeNB beacons that include some internal UE capability. The internal UE capability may be used by a small cell eNB beacon (i.e., an HeNB beacon) to establish a wireless backhaul connection to the core network belonging to the operator who deploys the eNB beacon. An internal UE capability may also be added to eNB beacons able to transmit (e.g. using higher power) to a larger area than would normally be served by a small cell eNB or HeNB. However, even though the eNB beacon may serve a large area (e.g. several kilometers or more in a rural area), the eNB beacon may establish a wireless backhaul connection in the same way as a small cell eNB beacon (e.g. HeNB beacon). Thus, in the following description, reference to an eNB beacon may include an eNB beacon with wide area coverage as well as a small cell eNB beacon (e.g. HeNB beacon). An HeNB beacon is preferably configured to inhibit support of non-location-service LTE access by UEs (e.g., may not transmit or receive data or control information to support wireless access by UEs for the purpose of non-location LTE service(s) such as sending and receiving voice and data), but is configured to transmit and receive control information to support LTE location service(s). For example, an eNB or HeNB beacon may not include required apparatus (e.g., hardware, software, etc.) for supporting non-location LTE access and services, may include such required apparatus but have such required apparatus disabled or not used, may include apparatus actively to inhibit support of non-location LTE access and services by UEs (such as apparatus to broadcast indications that the eNB Beacon 400 will not support such access and service(s), but will support location service(s), or apparatus to reject requests for LTE non-location service(s)), or other configurations such that the eNB or HeNB beacon does not support LTE non-location service(s).

An eNB beacon containing wireless backhaul capability first attaches as a UE to its operator's core network and then establishes a secure data connection through a PDG to a Security Gateway (SeGW). The eNB beacon, now acting as an HeNB or small cell, can then use the established secure data connection to the SeGW to register with the operator's network as an HeNB. The operator's network (e.g., via an E-SMLC) can then control support of OTDOA and PRS transmission in the eNB beacon, e.g., via LPPa messages communicated between a network E-SMLC and the eNB beacon as illustrated in FIG. 7 (e.g. as in steps 8 and 9 of FIG. 7). As the eNB beacon may be used only for positioning of UEs and may not provide signaling, data and voice connectivity between UEs and the network, the data connection between the UE portion of the eNB beacon and the SeGW may only utilize a small amount of bandwidth (e.g., an amount of bandwidth sufficient to support control signaling) as compared to a fully-functional eNB. Therefore, the wireless backhaul provided by the UE portion of the eNB beacon may use few network resources (e.g. low spectrum usage and low processing and memory use in core network entities). Further, the data connection between the UE portion of the eNB beacon and the HeNB GW or SeGW may provide the backhaul utilized for LPPa control signaling by the E-SMLC associated with the eNB beacon.

Figure 8:
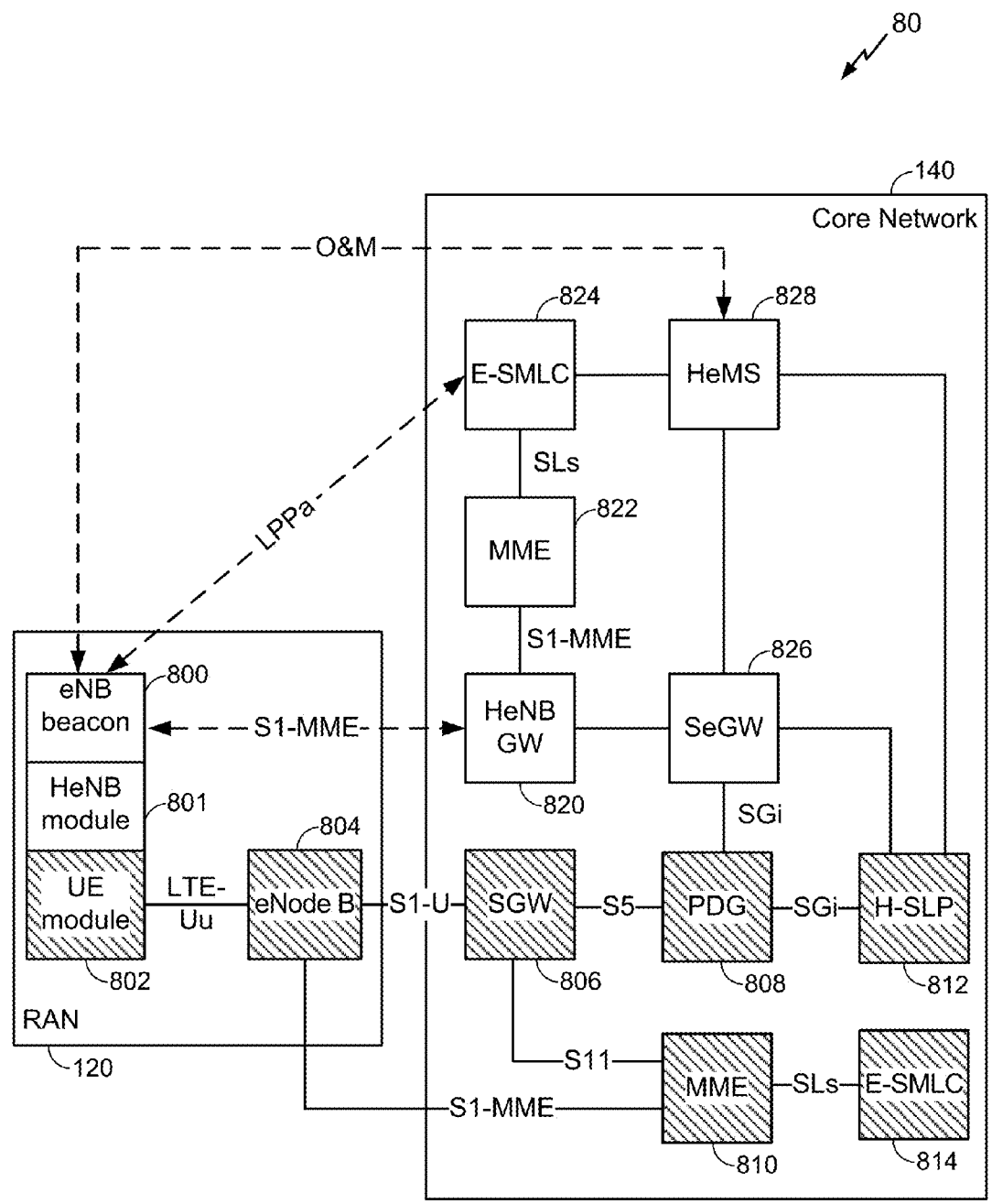
FIG. 8 is a block diagram of a wireless communication system that supports a positioning beacon using a Home eNodeB with wireless backhaul.

An example architecture that may be utilized to implement wireless backhaul from an eNB beacon as described above is illustrated by the system 80 in FIG. 8. In FIG. 8, solid lines denote interfaces between pairs of entities that are or may be directly connected to one another, and dashed double arrows denote protocols between pairs of entities that may be connected to each other via intermediate entities. FIG. 8 shows an example eNB beacon 800, that may correspond to eNB beacon 400 in FIG. 4A, and that includes an HeNB portion 801 (HeNB module) and a UE portion 802 (UE module). The portions 801, 802 may be communicatively coupled to each other to provide information to, and receive information from, each other. The HeNB portion 801 is configured to transmit PRS, and is a logical component separate from the UE portion 802. The HeNB portion 801 is configured to (i) connect to the Core network 140 using a wireless backhaul connection established by the UE portion 801 and (ii) respond to LPPa messaging from an E-SMLC 824 in Core Network 140 to switch between normal PRS mode and emergency PRS mode. The UE portion 802 comprises a mobile device wireless connectivity module configured to establish a wireless backhaul connection to entities in the core network 140 such as a PDG 808, SeGW 826 and/or HeNB GW 820. The system 80 also includes the core network 140 for the operator who owns and deploys the eNB beacon 800, a number of network entities (described further below) within the core network 140, and a RAN 120 associated with the core network 140 that may include one or more eNBs (e.g. eNB 804) and one or more eNB Beacons (e.g. eNB beacon 800). For purposes of clarity, the entities in FIG. 8 that support network access, data transfer and location for the UE portion 802 (rather than for the HeNB portion 801) are shown shaded in order to distinguish these entities from those that support the HeNB portion 801, which are shown unshaded. Although FIG. 8 shows just one core network 140 and one RAN 120, the exemplary method described in association with FIG. 8 is also applicable when there is more than one RAN and/or more than one core network. For example, some of the network entities shown shaded in FIG. 8 that support wireless backhaul from the UE portion 802 of eNB beacon 800 could be in a different RAN and/or different core network than the entities shown unshaded that support connection to the HeNB portion 801. In addition, RAN 120 and core network 140 may belong to or support a plurality of two or more network operators, enabling eNB beacon 800 to belong to and be deployed by one or more network operators in the plurality and to support OTDOA via transmission or PRS signals on behalf of UEs whose home operators comprise any operators in the plurality.

In FIG. 8, the UE portion 802 may be a logical or physical component of the physical eNB beacon 800. For example, UE portion 802 may be a separate hardware and software component of eNB beacon 800 or may be supported using common hardware, software and/or firmware in eNB beacon 800 such as common hardware, software and/or firmware that also supports the HeNB portion 801. Similarly, the HeNB portion 801 may be a separate hardware and software component of eNB beacon 800 or may be supported using common hardware, software and/or firmware in eNB beacon 800. In the case of a physically separate UE portion 802 or HeNB portion 801, communication between UE portion 802 and HeNB portion 801 may be via a wired or wireless connection. The UE portion 802, also referred to here simply as UE 802, may support only some functions of a normal UE (e.g. such as UEs UE 1 . . . UE N in FIG. 1 and UE 302 in FIGS. 3A, 3B, 4A and 4B) and may be enabled to attach to a network (e.g. to an LTE network), establish one or more PDN connections and data bearers to the network (e.g. to SGW 806 and PDG 808) and exchange data with other entities on the network side such as HeNB GW 820 using these data bearers and PDN connection(s). However, UE 802 may not support other functions of a normal UE, such as being able to establish voice connections, transfer text messages and perform any services on behalf of a normal user of a UE. Similarly, HeNB portion 801 may support only some functions of a normal eNB (such as eNB 305 in FIGS. 3A, 3B, 4A and 4B). For example, HeNB portion 801 may transmit a PRS signal to enable OTDOA positioning of target UEs but may not support voice or data connectivity on behalf of UEs. However, in some embodiments, HeNB portion 801 may support most or all functions of a normal eNB or normal HeNB including supporting mobility and voice and data connectivity for UEs. The eNB Beacon 800 may correspond to Standalone eNB Beacon 400 in FIG. 4A.

When eNB beacon 800 is first powered on or is otherwise instructed by a user of eNB beacon 800, the UE 802 may search for an available network corresponding to an operator who owns the eNB beacon 800, in this example assumed to be the operator who owns core network 140 and RAN 120. The UE 802 may then use LTE and/or another suitable radio access technology or combination of technologies to attach to this network and may subsequently obtain a PDN connection and one or more data bearers as exemplified in more detail further on herein. As shown in FIG. 8, the UE 802 may then have a serving eNB 804, a serving gateway (SGW) 806, and a PDN Gateway (PDG) 808 when in connected mode. The UE 802 may also have a serving MME 810. Upon the UE 802 being attached to the network, the eNB beacon 800 (e.g. the HeNB portion 801 in eNB Beacon 800) is able to communicate with the SeGW 826 via the UE 802 and the eNB 804, SGW 806 and PDG 808 as described further down in association with FIG. 9. The eNB beacon 800 behaves as a normal HeNB and (e.g. using the HeNB portion 801) establishes a secure connection to the SeGW 826 and then registers with the HeMS 828 and establishes an S1 signaling connection to the HeNB GW 820 and MME 822. The establishment of the S1 signaling connection enables E-SMLC 824 to control PRS transmission from the eNB beacon 800 in order to support OTDOA location of UEs nearby to eNB beacon 800. While FIG. 8 shows two separate logical MMEs 810 and 822 and two separate logical E-SMLCs 814 and 824 for ease of explanation, the MMEs 810 and 822 may be the same or different physical entities, and the E-SMLCs 814 and 824 may be the same or different physical entities. E-SMLC 824 and E-SMLC 814 in FIG. 8 may each correspond to E-SMLC 355 in FIGS. 3A, 3B, 4A, 4B and 7. H-SLP 812 in FIG. 8 may correspond to E-SLP 335 in FIG. 3A (e.g. may both be part of an SLP that can function as both an E-SLP and H-SLP).

Figure 9:
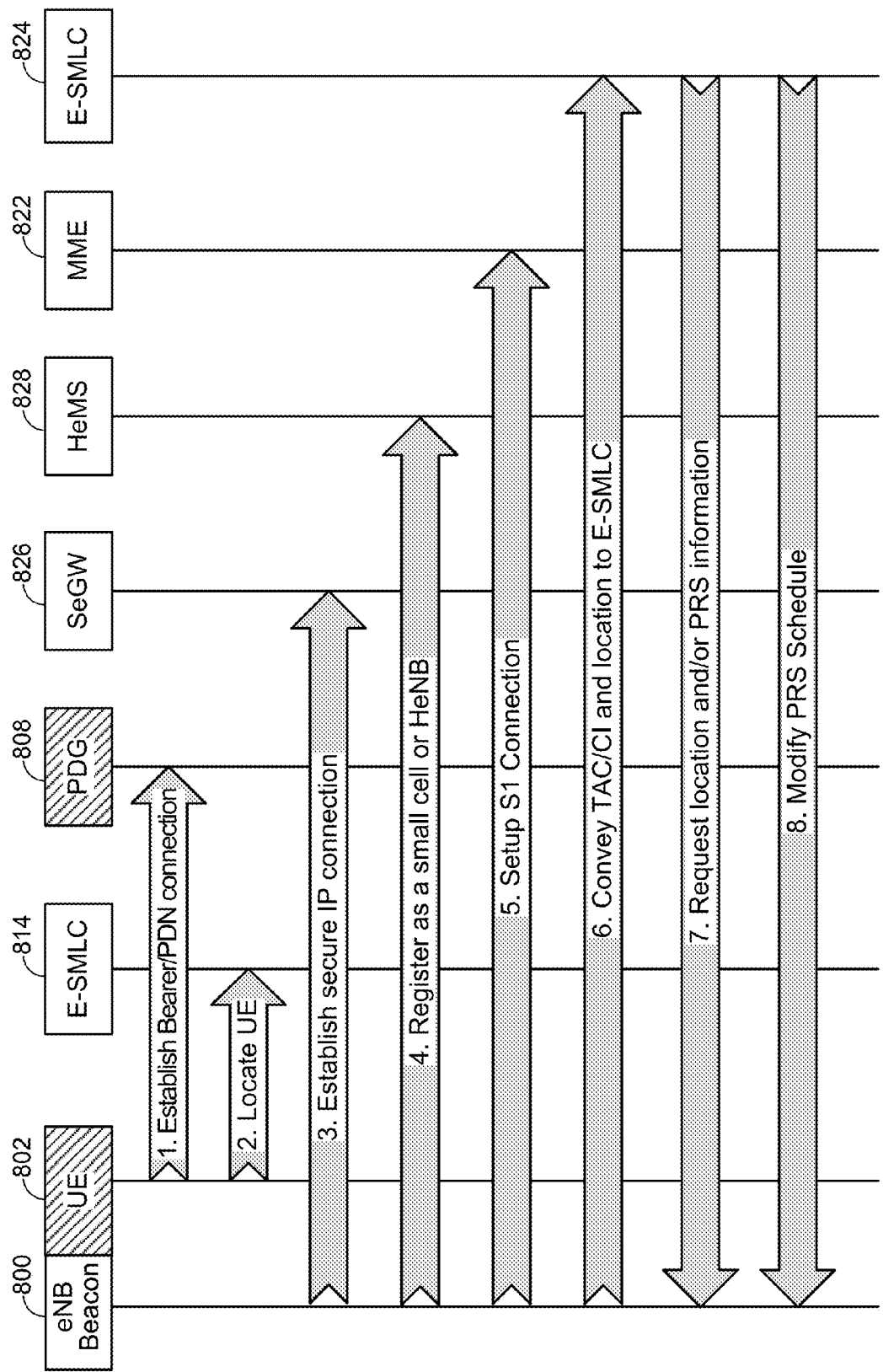
FIG. 9 shows an exemplary sequence of operations for the system of FIG. 8.

With reference to FIG. 8, FIG. 9 provides a more complete illustration of the establishment of a wireless backhaul from eNB beacon 800 in FIG. 8 and the subsequent use of the wireless backhaul to support OTDOA location of target UEs. Although FIG. 9 does not show the HeNB portion 801 of eNB Beacon 800, the actions of eNB Beacon 800 described in association with FIG. 9, that are not explicitly described as being performed by UE portion 802, may be partly or completely performed by HeNB portion 801 in FIG. 8. In FIG. 9, each arrow may represent more than one message being exchanged. At step 1 in FIG. 9, the UE portion 802 of the eNB beacon 800 may discover a suitable LTE serving cell supported by a nearby eNB 804 (e.g. by listening for radio transmissions from nearby eNBs after the eNB beacon 800 is first powered on) and may then attach to the core network 140 by performing an LTE attach procedure, as described in 3GPP TS 23.401. The LTE attach procedure may: (i) assign a serving eNB 804 and a serving MME 810 to the UE 802; (ii) establish a PDN connection from UE 802 to PDG 808 via the SGW 806 and eNB 804; (iii) assign or confirm an IP address for UE 802 and eNB beacon 800; and (iv) establish a default bearer capable of transferring signaling messages between eNB beacon 800 and other entities in core network 140 via the PDG 808. The PDN connection and default bearer established at step 1 may be regarded as a wireless backhaul connection from eNB beacon 800 to Core Network 140. In the event that eNB Beacon 800 is configured to support voice and data connectivity to external UEs in addition to providing OTDOA positioning support, the UE portion 802 may either as part of step 1 or at a later time (e.g. when later supporting an external UE) establish additional PDN connections and/or additional bearers to PDG 808 and/or other PDGs to support voice, data and signaling access by the external UEs.

At step 2 in FIG. 9, the UE 802 may use its attachment to the core network 140 to obtain assistance in determining or verifying the location of UE 802. The UE 802 may determine its own location using Assisted GPS (A-GPS), Assisted GNSS (A-GNSS), ECID and/or other positioning methods. In determining its location, the UE 802 may make use of the 3GPP control plane location solution for LTE described in 3GPP TSs 35.305 and 23.271 in which an E-SMLC 814, connected to the serving MME 810 for UE 802, is used to (i) provide A-GPS or A-GNSS assistance data to the UE 802, (ii) request measurements or a location estimate from UE 802 for A-GPS, A-GNSS, and/or other position methods and/or (iii) calculate the location of the UE 802. The control plane solution is illustrated in summary for step 2 in FIG. 9. However, instead of the control plane solution, UE 802 may use the SUPL user plane location solution by establishing a SUPL session with Home SLP (H-SLP) 812 via the PDG 808 and communicating with the H-SLP 812 using the SUPL User plane Location Protocol (ULP) defined by OMA. In this case, the H-SLP 812 may provide A-GPS or A-GNSS assistance data to UE 802 (e.g. by sending this assistance data to UE 802 in LPP or LPP/LPPe messages contained in SUPL POS messages) to assist UE 802 to measure and compute its location or may compute the location of UE 802 from A-GPS, A-GNSS and/or other measurements obtained by UE 802. The UE 802 may then store the location for future use. In addition or instead, the E-SMLC 814 or H-SLP 812 (whichever is used) may store the location of UE 802 (and thus of eNB Beacon 800) if the E-SMLC 814 or H-SLP 812, respectively, is aware that UE 802 is associated with eNB beacon 800—e.g. due to a unique or distinguished identity for UE 802 such as a unique or distinguished IMSI or IMEI that is conveyed to E-SMLC 814 or H-SLP 812 during the positioning of UE 802 that has already been configured in E-SMLC 814 or H-SLP 812 as corresponding to an eNB beacon. As an example of a distinguished identity, certain digits or digit values in an IMSI or IMEI might be reserved by the operator of Core Network 140 to identify an eNB Beacon, in which case E-SMLC 814 or H-SLP 812 may only need to be configured with information for the reserved digits or digit values. When E-SMLC 814 or H-SLP 812 stores the location of UE 802, the location may be used later to help position target UEs using OTDOA by providing the location of eNB beacon 800.

At step 3 in FIG. 9, the eNB beacon 800 may establish a secure IP connection (e.g. an IPsec connection or a TCP/TLS connection) to security Gateway (SeGW) 826 using the PDN connection and default bearer established by UE 802 to PDG 808 in step 1. Establishing the secure IP connection in step 3 may involve mutual authentication of the SeGW 826 by the eNB beacon 800 and the eNB beacon 800 by the SeGW 826 based on security credentials configured in both SeGW 826 and eNB beacon 800. The mutual authentication may prevent entities not associated with core network 140 from masquerading as an eNB beacon as well as ensuring eNB beacon 800 attaches to the correct core network 140. Following step 3, the eNB beacon 800 may access an HeNB Management System (HeMS) 828 via the SeGW 826 to register as a small cell eNB, as an HeNB or as an eNB beacon in step 4. Step 3 and step 4 may be supported as described in 3GPP TS 32.593, which describes registration of an HeNB or small cell eNB. Further, step 3 and step 4 may be accomplished, as descried in TS 32.593, by eNB beacon 800 first accessing an initial SeGW (not shown in either FIG. 8 or in FIG. 9) and an initial HeMS (also not shown in either FIG. 8 or in FIG. 9) with the initial HeMS providing eNB beacon 800 with IP addresses or FQDNs for the final SeGW 826 and final HeMS 828. During the registration in step 4, the eNB beacon 800 may provide its identity to HeMS 828 (e.g. a unique ID assigned by and configured in eNB beacon 800 by the operator of core network 140) and any location for eNB beacon 800 that may have been previously obtained—e.g. as described for step 2. HeMS 828 may assign a unique LTE cell identity to eNB beacon 800 (e.g. a TAC plus CI) and one or more PLMN IDs. HeMS 828 may also configure information concerning PRS scheduling and PRS signaling by eNB beacon 800—e.g. may configure parameters for a normal PRS mode and an emergency PRS mode. If HeMS 828 is aware that eNB beacon 800 is an eNB beacon and not a normal HeNB or small cell eNB, HeMS 828 may configure PRS parameters suitable for an eNB beacon—e.g. may configure a high or full duty cycle for emergency PRS mode. HeMS 828 may also configure other data in eNB beacon 800 that may subsequently be broadcasted by eNB beacon 800 in one or more LTE SIBs and that may differ from similar data broadcast in SIBs by normal eNBs, normal HeNBs and normal small cell eNBs. Following step 4, HeMS 828 may configure information received from eNB beacon 800 during step 4 in one or more location servers for core network 140, such as in E-SMLC 824, E-SMLC 814 and/or H-SLP 812. The configured information may include an identity for eNB beacon 800 (e.g. a TAC and CI), the location of eNB beacon 800 if known and PRS scheduling and PRS signaling information for eNB beacon 800 (e.g. PRS scheduling information for a normal PRS mode and an emergency PRS mode and the PRS signaling parameters applicable to each mode such as PRS coding, PRS frequency shift, bandwidth BW, number of consecutive subframes $N_{PRS}$ and periodicity $T_{PRS}$). The configured information may be used later by the configured location server(s)—e.g. may be used later in step 8 in the case of E-SMLC 824.

Following step 4, eNB beacon 800 may establish an LTE S1 signaling connection at step 5 from eNB Beacon 800 to an HeNB GW 820 (shown in FIG. 8 but not in FIG. 9) and MME 822 by performing the S1 Setup procedure referenced in 3GPP TS 32.593 and described in 3GPP TS 36.413. The eNB beacon 800 may obtain the IP address for the HeNB GW 820 from the HeMS 828 during step 4 and may use the secure IP connection to the SeGW 826 obtained in step 3 as a way of exchanging messages using IP with the HeNB GW 820. The LTE S1 Signaling connection established at step 5 may use the secure IP connection to the SeGW 826 established at step 3 to support the transfer of signaling messages between the eNB Beacon 800 and the HeNB GW 820 and MME 822. The secure IP connection established at step 3 may in turn make use of the PDN connection and default bearer established by the UE portion 802 to the PDG 808 at step 1. Thus, the LTE S1 Signaling connection established at step 5 by the eNB Beacon 800 may be considered to be supported by a wireless backhaul connection (established in this example by UE portion 802 at step 1) as described elsewhere herein. After step 5, eNB beacon 800 may have a serving HeNB GW 820 and a serving MME 822. As mentioned previously, MME 822 may or may not be the same as the serving MME 810 for the wireless backhaul attachment by UE 802 in step 1. In some deployments, HeNB GW 820 and SeGW 826 may be combined (e.g. supported by the same physical entity) to reduce cost.

In an optional step 6, following step 5, eNB beacon 800 may convey information about eNB beacon 800 to one or more E-SMLCs accessible from or attached to MME 822. For example, eNB beacon 800 may send its identity (e.g. the TAC and CI assigned to HeNB beacon 800 by HeMS 828 at step 4), its location (e.g. as obtained at step 2) and/or information concerning its PRS transmission and scheduling (e.g. as obtained from HeMS 828 at step 4) to an E-SMLC 824 connected to MME 822. The information may also identify eNB beacon 800 as an eNB beacon (e.g. as opposed to being a normal HeNB or small cell eNB). The information may be transferred from eNB Beacon 800 to E-SMLC 824 via the LTE S1 signaling connection established at step 5 and via MME 822 and may be contained in LPPa protocol messages exchanged between eNB Beacon 800 and E-SMLC 824. E-SMLC 824 may then store the received information and make use of it later (e.g. in step 8) to help locate one or more target UEs using OTDOA.

In an embodiment, the information at step 6 may be conveyed to E-SMLC 824 by eNB beacon 800 emulating an external UE (e.g. a UE distinct from UE portion 802) that appears to be served by eNB Beacon 800 (and thus appears to be external to eNB beacon 800 even though emulated by eNB beacon and thus in reality internal to eNB beacon 800). In this embodiment, the eNB beacon 800 may first instigate an LTE attach procedure for the external UE with MME 822 and may then send a location request (e.g. mobile originated location request (MO-LR) as defined in 3GPP TS 24.171) to MME 822 according to the 3GPP control plane solution defined in 3GPP TS 23.271. In this case, MME 822 may pass on the location request to E-SMLC 824, which may in turn assist eNB beacon 800 to obtain the location for the external UE (and thus for eNB Beacon 800) by exchanging LPP messages with eNB beacon 800 (which may be treated as the external UE from the perspective of E-SMLC 824). After E-SMLC 824 obtains a location for the external UE (and thus for eNB beacon 800), this location and the identity (e.g. TAC and CI) for eNB beacon 800 may be stored by E-SMLC 824 if E-SMLC 824 is aware that, while appearing to have obtained the location for an external UE, the external UE is in fact being emulated by an eNB beacon. The E-SMLC 824 may be aware of this emulation via provision of a unique or distinguished IMEI or IMSI, for the external UE, by eNB beacon 800 to MME 822 and thence to E-SMLC 824 that is already configured in E-SMLC 824 and associated with an eNB beacon (e.g. similar to use of a distinguished or unique IMSI or IMEI described for step 2). E-SMLC 824 may similarly store the received information in this embodiment (e.g. the location of eNB Beacon 800 and the TAC and CI for eNB Beacon 800 that E-SMLC may receive as part of the positioning procedure for the emulated external UE) and may make use of it later (e.g. in step 8) to help locate one or more target UEs using OTDOA.

Following step 5 or step 6, eNB beacon 800 may start to support OTDOA by transmitting PRS signals and possibly LTE SIBs. The eNB beacon 800 may optionally provide LTE coverage for UEs (in addition to supporting OTDOA) by functioning as a normal eNB small cell or HeNB and enabling access from UEs to support data and voice connectivity. PRS (and other transmission) from eNB beacon 800 may be aligned with some absolute time source, such as GPS or some other GNSS, if eNB beacon has a GPS or GNSS receiver. Alternatively, PRS transmission may be aligned with a PRS transmission received from some nearby eNB such as eNB 804—e.g. may be exactly aligned taking into account the signal propagation time from the nearby eNB or may have some fixed known offset (e.g. provided by HMS 828 at step 4). The signal propagation delay between eNB Beacon 800 and the nearby eNB may be provided by the HeMS 828 at step 4 or may be measured by eNB beacon 800 and/or by eNB 804 if eNB 804 is the nearby eNB.

In an optional step 7, following step 5, E-SMLC 824 may request information from eNB beacon 800—e.g. using the LPPa protocol. For example, E-SMLC 824 may request the location of eNB beacon 800 and/or information about its PRS transmission. The eNB beacon 800 may return the requested information to E-SMLC 824 (e.g. using LPPa), and E-SMLC 824 may store the information for future use—e.g. in step 8. In order to trigger step 7 and enable E-SMLC 824 to know in advance the identity (e.g. TAC and CI) for eNB beacon 800 (e.g. which may be needed in order to correctly route the information request from E-SMLC 824 to eNB beacon 800 via MME 822 and HeNB GW 820), E-SMLC 824 may make use of information obtained during step 6 (if step 6 occurs) or otherwise obtained from HeMS 828 following step 4 as described above.

In an alternative embodiment, step 7 of FIG. 9 may be triggered if a location request for a target UE (e.g. UE 302 in FIGS. 3A, 3B, 4A, 4B and 7) is sent to E-SMLC 824 (e.g. from MME 822 as at step 7 in FIG. 7 with MME 822 then corresponding to MME 315 in FIG. 7 and E-SMLC 824 then corresponding to E-SMLC 355 in FIG. 7). The E-SMLC 824 may have no information uniquely configured for the serving cell for the target UE in this embodiment (or may have no location or PRS information configured for the serving cell) but may receive the serving cell ID (e.g. TAC and CI) as part of the location request (e.g. as part of the location request as at step 7 in FIG. 7). The serving cell ID that is received may contain an indication that the serving cell is or may be associated with an eNB beacon such as eNB beacon 800 in the case that eNB beacon 800 supports normal LTE service for at least some UEs (e.g. mobility management and voice and data connectivity) as well as positioning. The indication may be contained in certain digits or bits in the serving cell ID (e.g. the TAC or CI). For example, the network operator for the core network 140 may have reserved a range of TAC values or CI values or certain values of certain TAC bits or CI bits to indicate an eNB beacon and may have configured this reserved range or these reserved values in E-SMLC 824. Based on such a configuration, the E-SMLC 824 may use the serving cell ID to send and route a request for location and other information to the eNB beacon 800 as shown for step 7 in FIG. 9. The request sent to eNB beacon 800 in this embodiment may comprise an LPPa request for ECID information for the target UE (e.g. may comprise an LPPa ECID Measurement Initiation Request). The eNB beacon 800 may then return an LPPa ECID response (e.g. an LPPa ECID Measurement Initiation Response) to the E-SMLC 824 which may include the location coordinates for the eNB beacon 800, PRS information for the eNB beacon 800 and/or other information such as ECID measurements made by the eNB beacon 800 and/or by the target UE. The LPPa ECID request and response may be as defined in the 3GPP TS 36.455 for LPPa. In a variant of this embodiment, the E-SMLC 824 may instead receive the ID of a cell nearby to a UE that is being positioned by the E-SMLC 824 that is not a serving cell for the UE. For example, the UE that is being positioned may provide the cell ID to the E-SMLC 824 as part of ECID measurements requested by the E-SMLC 824 from the UE. If the E-SMLC 824 recognizes the received cell ID as indicating an eNB beacon for the network operator for core network 140 (e.g. as just described in the case of a serving cell ID) but has no information (or no location or PRS related information) configured for this cell, the E-SMLC 824 may trigger step 7 in FIG. 9 to obtain information from the eNB beacon such as the eNB beacon's location and PRS information.

At step 8, a target UE (not shown in FIG. 8 or FIG. 9) such as the UE 302 in FIG. 4A, FIG. 4B or FIG. 7 may need to be located, and E-SMLC 824 may be requested by an MME (e.g. by MME 822) to support the location. The location may occur in association with an emergency call and proceed as described in FIG. 7. E-SMLC 824 may then identify one or more eNBs, HeNBs and/or eNB beacons to support OTDOA location of the target UE. In particular, based on (i) a known location for eNB beacon 800 (e.g. as configured by the operator of E-SMLC 824 in E-SMLC 824, or as obtained by E-SMLC 824 as a consequence of step 4 from HeMS 828, or from HeNB beacon 800 or positioning of HeNB beacon 800 using step 6 or as obtained by requesting the information from eNB beacon 800 in step 7), and (ii) an approximate position for the target UE (e.g. as obtained from a serving cell for the target UE), E-SMLC 824 may decide to employ eNB beacon 800 in supporting OTDOA positioning for the target UE. The E-SMLC 824 may also decide to employ eNB beacon 800 in supporting OTDOA positioning for the target UE if eNB beacon 800 supports a serving cell for the target UE (e.g. if eNB beacon 800 supports normal LTE services as well as positioning). E-SMLC 824 may then send a message to eNB beacon 800 (e.g. an LPPa message) via an MME (e.g. MME 822) and HeNB GW 820 to adapt the PRS scheduling from eNB beacon—e.g. as in step 8 or step 9 or FIG. 7. In this case, eNB beacon 800 may correspond to eNB1 305 or eNB2 410 in FIG. 7. The eNB beacon 800 may then modify its PRS transmission (e.g. temporarily switch from normal PRS mode to emergency PRS mode) which may assist positioning of the target UE—e.g. as described in FIG. 7. The signaling messages (e.g. LPPa signaling messages, LPP signaling messages and/or MO-LR request) that may be exchanged between eNB Beacon 800 and MME 822 and/or E-SMLC 824 in steps 6, 7 and 8 as described above may be conveyed using the S1 signaling connection established at step 5, the secure IP connection established at step 3 and the wireless backhaul connection (e.g. the PDN connection and default bearer) established at step 1.

Figure 10:
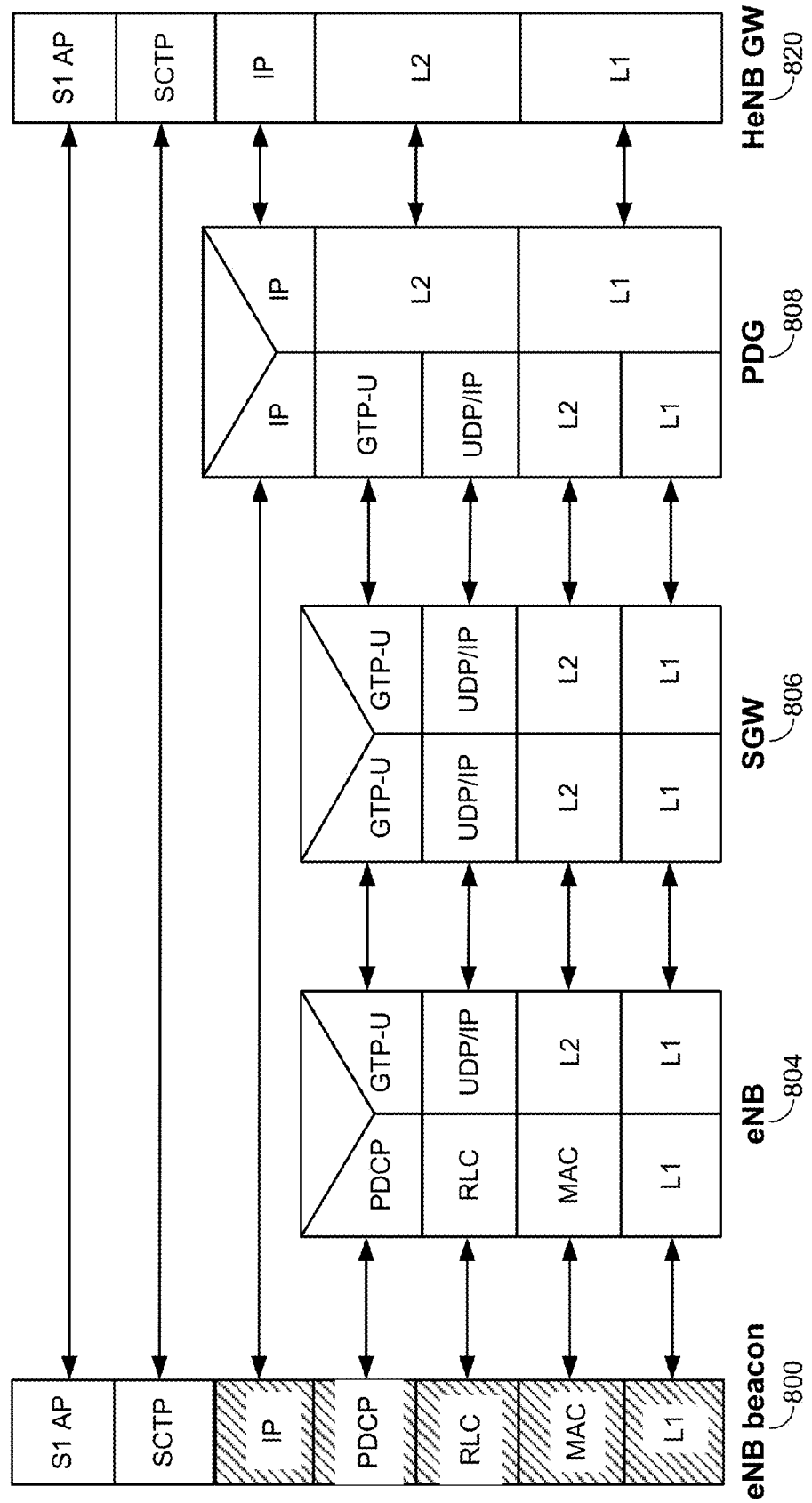
FIGS. 10 and 11 illustrate exemplary protocol layering in the system of FIG. 8.

FIG. 10 shows exemplary protocol stacks for the wireless backhaul connection established at step 1 in FIG. 9 and the LTE S1 signaling connection from eNB beacon 800 to HeNB GW 820 established at step 5 in FIG. 9. SeGW 826 is omitted in FIG. 10 and may just provide relaying at the IP level from PDG 808 to HeNB GW 820. MME 822 is also omitted in FIG. 10 and may support the same protocols as HeNB GW 820 in support of the LTE S1 signaling connection established at step 5 in FIG. 9. The protocols shown in FIG. 10 correspond to protocols used for LTE access by a UE (e.g. as described in 3GPP TS 23.401) and protocols used for HeNB access to an HeNB GW and MME (e.g. as described in 3GPP TS 36.300 and TS 23.401). The protocol layers shown in FIG. 10 include the S1 Application Protocol (S1 AP) described in 3GPP TS 36.413, the Stream Control Transmission Protocol (SCTP) defined in IETF RFC 4960, the GPRS Tunneling Protocol user plane (GTP-U) described in 3GPP TS 29.281, the User Datagram Protocol (UDP) defined in IETF RFC 768, the Packet Data Convergence Protocol (PDCP) described in 3GPP TS 36.323, the Radio Link Control (RLC) protocol described in 3GPP TS 36.322 and the Medium Access Control (MAC) protocol described in 3GPP TS 36.321. The protocol layers at and below the IP level in FIG. 10 that are shown as supported by the eNB beacon 800, eNB 804, SGW 806 and PDG 808 may support the wireless backhaul connection from the eNB beacon 800 (established at step 1 in FIG. 9), whereas protocol layers above the IP level (as well as protocol layers at and below the IP level) in FIG. 10 may support the LTE S1 signaling connection (established at step 5 in FIG. 9). The protocols layers that may be supported by the UE portion 802 of the eNB beacon 800 are shown shaded in FIG. 10 and comprise the L1, MAC, RLC, PDCP and IP layers.

Figure 11:
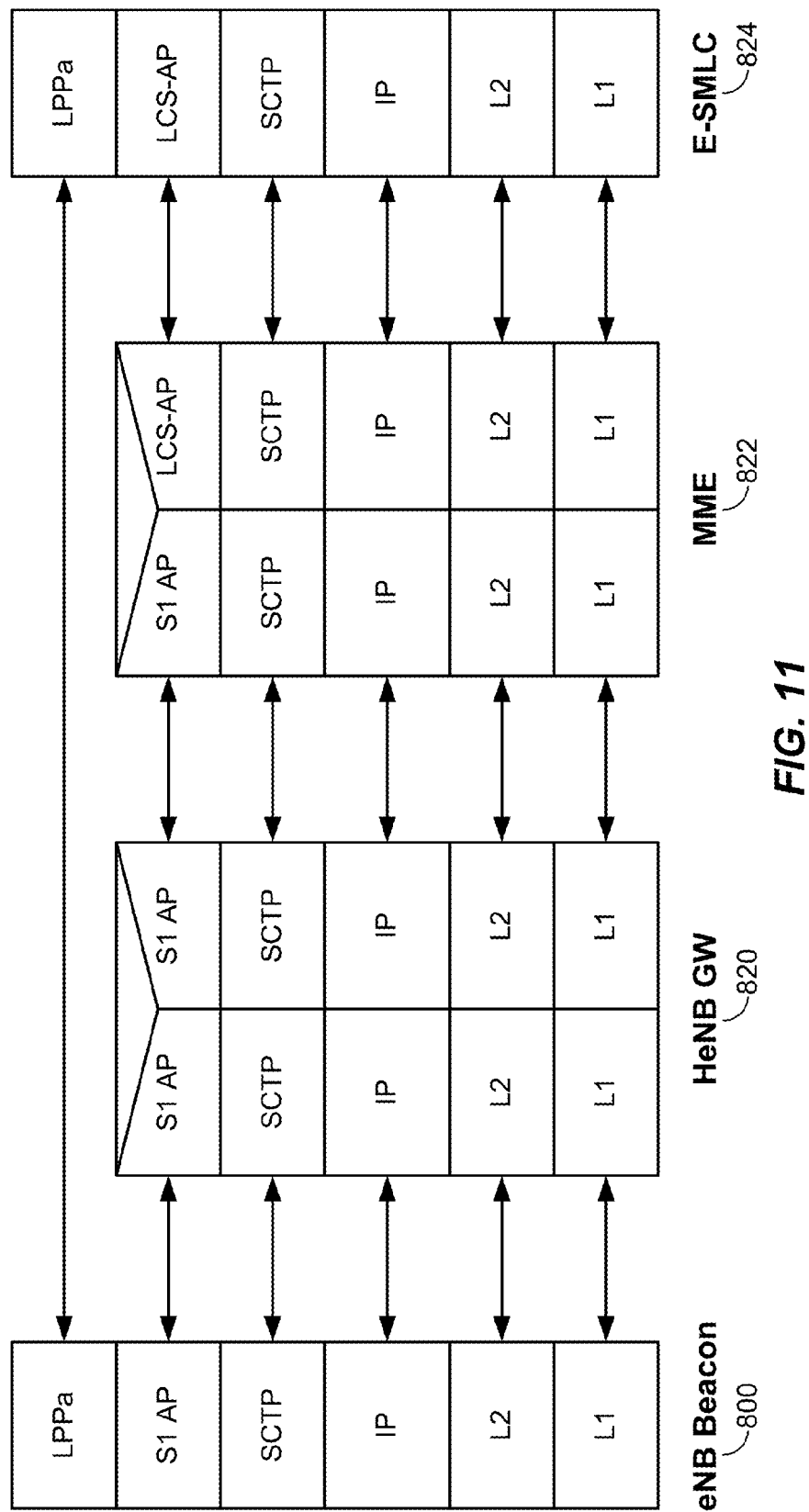

FIG. 11 shows exemplary protocol stacks that may be used in step 6, step 7, and/or step 8 of FIG. 9 to enable transfer of information between eNB beacon 800 and E-SMLC 824 using the LPPa protocol. The protocols shown in FIG. 11 correspond to protocols used for HeNB access to an HeNB GW and MME (e.g. as described in 3GPP TS 36.300) and to protocols used between an MME and E-SMLC (e.g. as described in 3GPP TS 29.171). As in FIG. 10, the protocol abbreviations are listed in Table 1 and correspond to well-known protocols with publicly available definitions. Transfer of information between eNB beacon 800 and HeNB GW 820 in FIG. 11 may employ the wireless backhaul connection to the eNB beacon 800 (established in step 1 of FIG. 9) and may use the protocol stacks and intermediate entities shown in FIG. 10 (though are not shown in FIG. 11). Referring to FIG. 11, eNB beacon 800 and E-SMLC 824 may communicate end-to-end via LPPa, which may reside at the top of the protocol stacks for eNB beacon 800 and E-SMLC 824. LPPa messages may be used to (i) enable eNB beacon 800 to send information to E-SMLC 824 (e.g. at step 6 and/or step 7 in FIG. 9), (ii) enable E-SMLC 824 to request information from eNB beacon 800 (e.g. at step 7 in FIG. 9) and/or (iii) enable E-SMLC 824 to send information and/or instructions to eNB beacon 800 to configure new PRS scheduling in eNB beacon (e.g. at step 8 in FIG. 9). The protocol stacks between eNB beacon 800 and HeNB GW 820, and the protocol stacks between HeNB GW 820 and MME 822, that are shown in FIG. 11 may include the S1 Application Protocol (S1 AP), the Stream Control Transmission Protocol (SCTP), IP, Layer 2 (L2), and Layer 1 (L1). The protocol stacks between MME 822 and E-SMLC 824 that are shown in FIG. 11 may include the Location Services Application Protocol (LCS-AP) described in 3GPP TS 29.171, SCTP, IP, Layer 2, and Layer 1.

In order to make use of eNB beacon 800 to assist OTDOA positioning of a target UE at step 8 of FIG. 9, the E-SMLC 824 may be previously configured with information for the eNB beacon 800, such as its identity (e.g. TAC and CI) and location coordinates, in various manners. For instance, information for the eNB beacon 800 may be configured in the E-SMLC 824 in advance by the network operator for core network 140 and RAN 120 or by a network operations manager on behalf of this operator. The location of the eNB beacon 800 could then be obtained from a site survey, using an accurate map or building plan or by using a GPS or GNSS positioning receiver placed next to or nearby to eNB beacon 800. Alternatively, the existence and/or location of the eNB beacon 800 can be made known to the E-SMLC 824 by the HeMS 828 following step 4 of FIG. 9 or by the eNB beacon 800 itself (e.g. as described for step 6 and step 7 of FIG. 9). Once the E-SMLC 824 is aware of the existence and identity of the eNB beacon 800, additional information for the eNB beacon 800 (e.g. the location and/or PRS related information) may be obtained by a request from the E-SMLC 824 to the eNB beacon as described for step 7 of FIG. 9. By utilizing the procedures described above in combination with the architecture illustrated by FIG. 8, the eNB beacon 800 can be deployed without additional backhaul support. In addition, deployment of the eNB beacon 800 can be performed quickly, thereby enabling portable eNB beacons to be quickly deployed—e.g. by public safety for emergency situations and/or in other implementations that preferably utilize quickly-deployed positioning beacons.

The deployment of eNB beacon 800, as described in association with FIG. 8 and FIG. 9, assumes that wireless backhaul is provided using LTE (e.g. as described for step 1 of FIG. 9). However, other types of wireless backhaul are possible. For example, instead of using LTE to establish a wireless backhaul in step 1 of FIG. 9, UE portion 802 could attach to a WCDMA network, a cdma2000 network, an HRPD network or to a WiFi IEEE 802.11 AP and establish IP connectivity (e.g. establish the equivalent of the PDN connection and default bearer established in step 1 of FIG. 9). UE 802 could then make use of this IP connectivity to establish the secure IP connection to SeGW 826 as in step 3 of FIG. 9 and perform the remaining steps of FIG. 9 as previously described. In this case, step 2 of FIG. 9 could also be replaced by an equivalent but different step in which the UE portion 802 obtains its own location using SUPL or, in the case of attachment to a WCDMA or cdma2000 network, a control plane location solution applicable to WCDMA or cdma2000, respectively. When some other type of wireless backhaul is used (such as WCDMA, cdma2000 or WiFi) that is not LTE, the entities shown shaded in FIG. 8 could be physically or functionally different. For example, UE portion 802 would continue to be used but would now support network attachment using a wireless technology different to LTE. The eNB 804 would be replaced by a base station or AP for the wireless technology used for the backhaul (e.g. would be replaced by a WiFi AP in the case of WiFi attachment or by a 3GPP Node B in the case of WCDMA attachment). The H-SLP 812 might continue to be present but could be connected to a core network entity different to PDG 808. The other core network entities (SGW 806, PDG 808, MME 810 and E-SMLC 814) could be removed and/or replaced by other equivalent or similar entities associated with the wireless technology used for the backhaul. For example, in the case of WCDMA backhaul, E-SMLC 814 may be replaced by an SAS; SGW 806 and MME 810 may both be replaced by an SGSN; and PDG 808 may be replaced by a GGSN.

Use of the 3GPP control plane location solution to position a target UE as in step 8 of FIG. 9 may be replaced by a different location solution, such as the SUPL user plane location solution. For example, instead of using E-SMLC 824 in FIG. 8 to position a target UE using the 3GPP control plane solution for LTE in step 8 of FIG. 9, H-SLP 812 in FIG. 8 might be used instead with the SUPL location solution. In that case, H-SLP 812 would need to be aware of the existence of eNB beacons, such as eNB beacon 800, and would need information for these eNB beacons, such as the associated cell identity (e.g. TAC and CI) or associated cell identities when several cells are supported, the location and possibly the PRS scheduling and PRS signaling information (e.g. regarding normal PRS mode and emergency PRS mode and the PRS signaling parameters applicable to each mode such as PRS coding, PRS frequency shift, bandwidth BW, number of consecutive subframes $N_{PRS}$ and periodicity $T_{PRS}$). Similar to the case for E-SMLC 824, this information could be: (i) configured in advance in H-SLP 812 by the operator or manager for core network 140 and RAN 120; (ii) provided by HeMS 828 to H-SLP 812 following step 4 of FIG. 9; (iii) provided to H-SLP 812 by an E-SMLC such as E-SMLC 824 that is connected to H-SLP 812 or part of H-SLP 812 (e.g. with the E-SMLC obtaining the information as described earlier for FIG. 9); or (iv) provided indirectly by the eNB beacon 800 if eNB beacon 800 requests its location at step 6 in FIG. 9 from H-SLP 812 (instead of from MME 822 and E-SMLC 824) using SUPL if H-SLP 812 is able to recognize eNB beacon 800 as an eNB beacon (e.g. via a reserved IMSI or TAC or CI that signifies an eNB beacon). H-SLP 812 may control PRS scheduling in eNB beacon 800 at step 8 in FIG. 9 (e.g. to switch eNB beacon 800 between normal and emergency PRS modes) using new LPP messages conveyed in a SUPL session or by using LPPa as described previously herein in which H-SLP 812 either performs some functions of an E-SMLC or has a link to a normal E-SMLC such as E-SMLC 824 that enables H-SLP 812 to send and receive information to and from eNB beacon 800 via the E-SMLC using LPPa. As an alternative, H-SLP 812 may exchange LPPa messages directly with eNB beacon 800 using IP transport and possibly also using the SCTP protocol above IP and below LPPa by making use of IP connectivity via SeGW 826—e.g. where H-SLP 812 sends an LPPa message using IP (and possibly SCTP) to SeGW 826 which then routes the LPPa message to eNB Beacon 800 via the wireless backhaul established by UE portion 802. In some embodiments, when a target UE is being positioned using OTDOA and the target UE belongs to a different operator than the operator for RAN 120 and core network 140, the H-SLP 812 may be replaced by, or function, as a Discovered SLP (D-SLP) but without significant change to the procedure and interactions described above to support OTDOA positioning.

The use of an eNB beacon to provide additional PRS coverage to support OTDOA in which the PRS schedules of eNBs and eNB beacons may be controlled from an E-SMLC or H-SLP (or D-SLP) and as exemplified in FIGS. 8-11 may build upon an existing capability of a network operator to support HeNBs and/or small cell eNBs via a security gateway (e.g. SeGW 826) and an HeNB Gateway (e.g. HeNB GW 820). For an operator with this existing capability, the addition of eNB beacons (e.g. eNB beacon 800) may not add new impact (or may not add much new impact) to certain core network entities such as MMEs (e.g. MME 810 or MME 822) or to existing RAN entities (e.g. eNB 804). Instead, new impacts may be restricted to (or mainly restricted to) O&M (e.g. HeMS 828) and to certain location servers (e.g. E-SMLC 824 or H-SLP 812) as well as to eNB beacon 800. The exemplary methods of supporting eNB beacons may thus be suitable by operators who have the necessary HeNB or eNB small cell capability already deployed. For operators without HeNB or eNB small cell capability, an operator may deploy one or more relay nodes (RNs) instead of deploying one or more eNB beacons.

The use of relay nodes to extend LTE coverage is described in 3GPP TS 36.300 for 3GPP Release 11 and later. A relay node connects to another eNB, known as a donor eNB (DeNB) using a wireless backhaul and provides extended LTE coverage for the DeNB by enabling access from UEs too far from the DeNB to obtain LTE coverage directly from the DeNB. The DeNB would normally have a wired or dedicated wireless (e.g. microwave) backhaul to the operator core network. The solution in 3GPP TS 36.300 requires that an RN accesses core network entities such as an MME or E-SMLC via its DeNB. Core network entities (except for O&M) may not have direct access to RNs and so may not be able control PRS scheduling from an RN or query an RN for its PRS transmission parameters (e.g. using LPPa). In particular, RNs are defined by 3GPP to extend LTE coverage on behalf of UEs and not to extend PRS coverage to support OTDOA. However, some extensions to the RN solution defined in 3GPP TS 36.300 may be employed as described further down to enable RN deployment to support OTDOA. Support of RNs to extend LTE coverage may require new impacts to some existing RAN entities (e.g. to a DeNB) and to some core network entities (e.g. an MME) as well as to O&M. Additionally, use of RNs as described further down to support OTDOA may impact location servers such as an E-SMLC or H-SLP.

Figure 12:
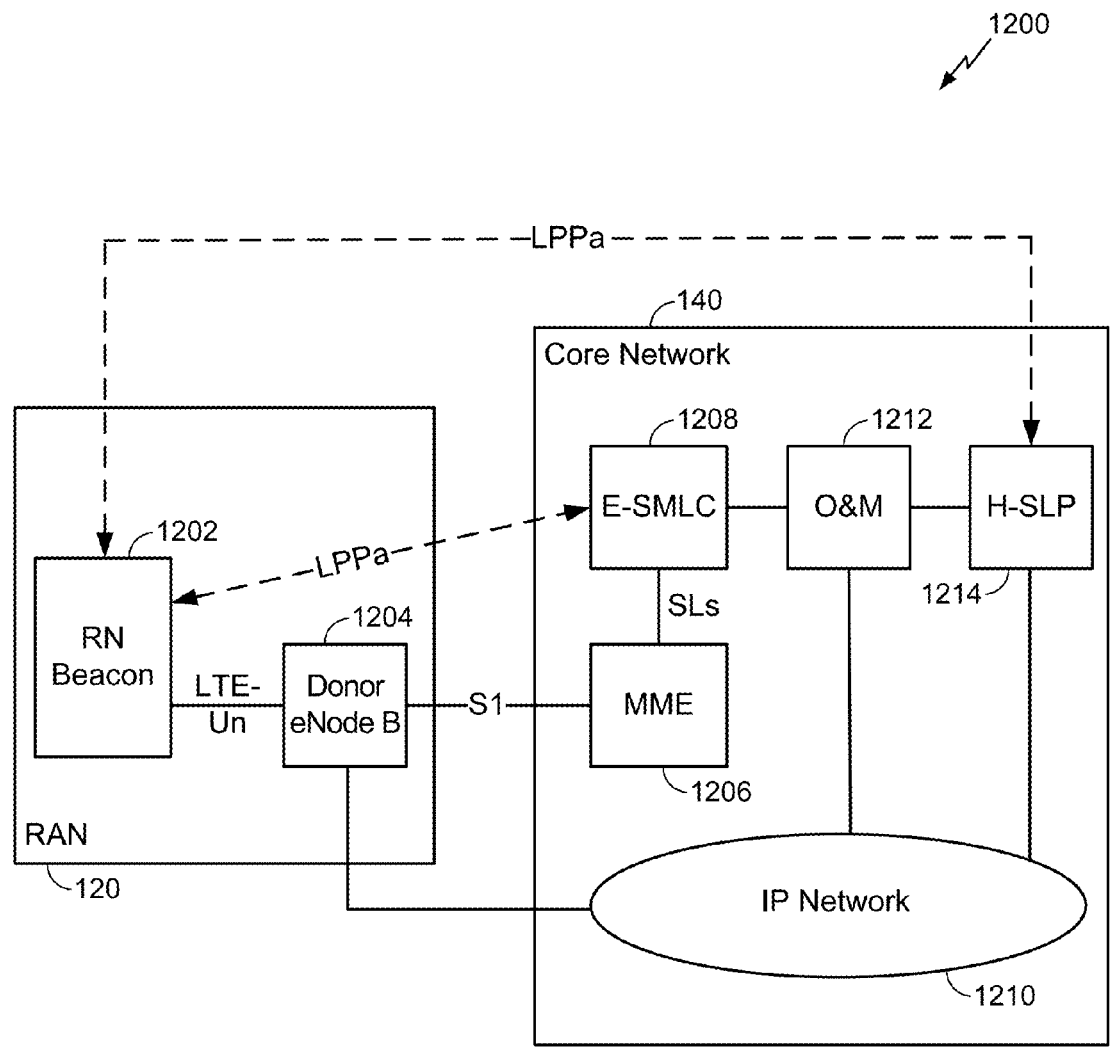
FIG. 12 is a block diagram of a wireless communication system that supports a positioning beacon using an LTE Relay Node with wireless backhaul.

FIG. 12 shows an exemplary architecture 1200 in which an RN beacon 1202 is deployed to support extended PRS coverage for OTDOA, and optionally to support extended LTE coverage for UEs, in which UEs are able to attach to an RN beacon and receive normal network services like voice and data connectivity in addition to receiving PRS signals to support OTDOA. The RN beacon 1202 has a single DeNB 1204 and a serving MME 1206. The RN beacon 1202 may correspond to eNB beacon 400 in FIG. 4A. The RN beacon 1202 may also interact with an E-SMLC 1208, an O&M function 1212 and an H-SLP (or D-SLP) 1214 as described further down. The RN beacon 1202 may contain a UE portion and a logically or physically separate eNB portion (not shown in FIG. 12). For example, the UE portion may support steps 1 and 2 described later in FIG. 13 and the eNB portion may support at least part of the other steps in FIG. 13. The DeNB 1204 is connected to MME 1206 (e.g. via a wireless or wireline backhaul connection) and well as possibly to other MMEs (not shown in FIG. 12) and may be connected to an operator IP network 1210 (e.g. a LAN network and/or set of IP routers) that is also connected to the O&M function 1212 and H-SLP 1214. In some embodiments, DeNB 1204 may be connected directly to O&M function 1212 and/or to H-SLP 1214. RN beacon 1202 transmits PRS signals to support OTDOA and possibly transmits one or more LTE SIBs when used only to support OTDOA. When also used to support LTE access from UEs, RN beacon may support other functions for an RN as defined in 3GPP TS 36.300, such as supporting RRC connections from UEs and providing bearer connectivity for voice and/or data access. E-SMLC 1208 in FIG. 12 may correspond to E-SMLC 355 in FIGS. 3A, 3B, 4A, 4B and 7 and H-SLP 1214 in FIG. 12 may correspond to E-SLP 335 in FIG. 3A (e.g. may both be part of an SLP that can function as both an E-SLP and H-SLP).

Figure 13:
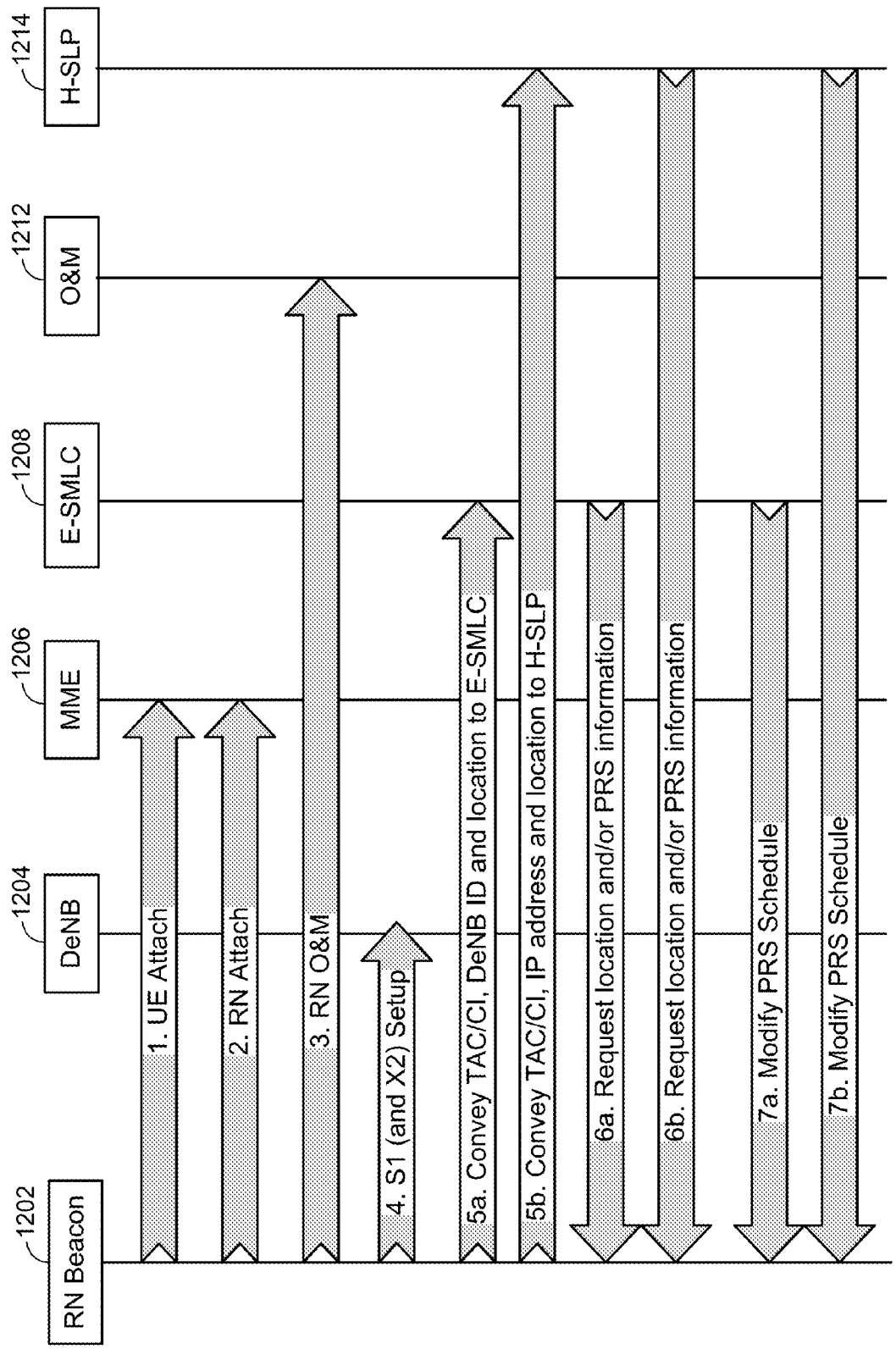
FIG. 13 shows an exemplary sequence of operations for the system of FIG. 12.

FIG. 13 shows an exemplary method associated with the architecture 1200 of FIG. 12 in which an RN beacon is deployed and operated to support OTDOA. In FIG. 13, each arrow may represent more than one message being exchanged. At step 1 in FIG. 13, the RN beacon 1202 in FIG. 12 is powered on and attaches to the core network 140 for the operator who owns or deploys RN beacon 1202 via a nearby serving eNB which may be, though does not have to be, the DeNB 1204. The attachment in step 1 of FIG. 13 is performed by RN beacon 1202 acting as a UE and may correspond to the phase I attach for an RN described in 3GPP TS 36.300. The attachment in step 1 of FIG. 13 enables RN beacon 1202 to obtain certain information from an O&M function, which may be (but need not be) the same as O&M function 1212 in FIG. 12. The information obtained may tell RN beacon 1202 which LTE cells may be used for the later RN attachment in step 2. After RN beacon has attached as a UE in step 1 and different to the RN description in 3GPP TS 36.300, RN beacon 1202 may request its location, or request assistance data to help RN beacon 1202 determine its location, from core network 140 using either the 3GPP control plane location solution for LTE defined in 3GPP TS 23.271 and TS 36.305 or the OMA SUPL user plane solution. If the control plane solution is used, RN beacon 1202 may send a Mobile Originated Location Request (MO-LR) to its serving MME (e.g. MME 1206 or some other MME), after which an E-SMLC (e.g. E-SMLC 1208 or some other E-SMLC) may be requested to support the location request by the MME and begin an LPP or LPP/LPPe session with the RN beacon 1202. If the SUPL solution is used, the RN beacon 1202 may establish a secure IP connection with an H-SLP in core network 140 (e.g. H-SLP 1214) and may send a SUPL START message to the H-SLP to begin a SUPL session in which LPP or LPP/LPPe messages are exchanged between the H-SLP and RN beacon 1202 by transferring the LPP or LPP/LPPe messages inside SUPL ULP messages (e.g. SUPL POS messages). For either the control plane solution or the SUPL solution, the location server (e.g. E-SMLC 1208 or H-SLP 1214) may send assistance data to the RN beacon 1202 (e.g. assistance data for A-GPS or A-GNSS), which may assist RN beacon 1202 to obtain its own location accurately (e.g. using A-GPS or A-GNSS). Alternatively, the location server may request measurements from the RN beacon 1202 (e.g. of GPS or GNSS satellites), may provide assistance data to help the RN beacon 1202 make these measurements, and may compute a location from the resulting measurements and return the location to RN beacon 1202. After the RN beacon 1202 has obtained O&M information and possibly obtained its location, RN beacon 1202 may detach from the core network 140 and RAN 120. RN beacon 1202 may obtain its location without assistance from Core Network 140 at any time—e.g. using standalone GPS or GNSS or with the assistance of some location server not associated with Core network 140 (e.g. a location server operated by the vendor of RN beacon 1202).

Next, at step 2 in FIG. 13, RN beacon 1202 may attach to core network 140 as an RN via a DeNB for a cell that RN beacon 1202 is allowed to access (e.g. according to O&M information received in step 1). During the RN attach, the RN beacon 1202 will obtain a serving DeNB 1204, a serving MME 1206 and may obtain IP connectivity via an SGW and PDG in core network 140 (not shown in FIG. 12) which may be used later (e.g. in step 3). The RN beacon 1202 may also obtain access to a logical SGW/PDG function embedded in DeNB 1204 via one or more data and/or signaling bearers that may be used later to (i) support voice and data access on behalf of any UEs served by RN beacon 1202 and/or (ii) support access to E-SMLC 1208 in steps 5a, 6a and 7a. The attachment in step 2 may correspond to the phase II RN attach described in 3GPP TS 36.300. At any time after RN beacon 1202 has attached as an RN in step 2 and different to the RN description in 3GPP TS 36.300, RN beacon 1202 may request its location or request assistance data to help RN beacon 1202 determine its location from core network 140 using either the 3GPP control plane location solution for LTE defined in 3GPP TS 23.271 and TS 36.305 or the OMA SUPL user plane solution. The determination of location by RN beacon 1202 may proceed similarly to that described earlier for RN beacon 1202 location following the attachment in step 1. The location determination following either step 1 or step 2 may be useful to obtain an accurate location for RN beacon 1202 that may be used later to support OTDOA positioning of a target UE in the event that RN beacon 1202 has not been located by other methods (e.g. a site survey or use of a separate GPS or GNSS receiver).

Following the RN attach in step 2, at step 3 of FIG. 13, RN beacon 1202 may access O&M function 1212 using IP transport via the DeNB 1204, the operator IP network 1210 and/or via an SGW and PDG that were assigned to RN beacon in core network 140 during step 2. The O&M function 1212 may provide additional information for RN beacon 1202 operation not obtained in step 1, such as one or more PLMN IDs, a TAC and a cell ID (or cell IDs) to be used by RN beacon 1202. Any cell ID for RN beacon 1202 may differ from the cell ID for DeNB 1204 or may be the same cell ID. In addition, and unlike the description of RN operation in 3GPP TS 36.300, RN beacon 1202 may provide its location to O&M function 1212 (e.g. a location obtained as described for step 1 or step 2) or may obtain its location from O&M function 1212 (e.g. if the operator for core network 140 determines the location for RN beacon 1202 in advance using a site survey or a using a GPS positioning receiver placed near to RN beacon 1202 and then configures the location in O&M function 1212). Further, and also unlike the description in 3GPP TS 36.300, O&M function 1212 may provide information to RN beacon 1202 on required PRS transmission and scheduling, which may include parameters for a normal PRS schedule and an emergency PRS schedule.

At step 4, which may occur before, after, or at the same time as step 3, RN beacon 1202 may setup a single LTE S1 signaling connection to the DeNB 1204 and may set up an X2 signaling connection to the DeNB 1204 as described in 3GPP TS 36.300. The LTE S1 signaling connection may allow RN beacon 1202 to function as an eNB—e.g. to support data and voice access by UEs and support positioning via interaction with an E-SMLC using LPPa as described later for steps 5a, 6a and 7a. When functioning as an eNB, RN beacon 1202 may treat DeNB 1204 as an MME or SGW with respect to certain signaling and data exchange procedures.

Following step 4, RN beacon 1202 may start to function as an RN to support extended LTE coverage for UEs as described in 3GPP TS 36.300. Also or alternatively, and unlike the description in 3GPP TS 36.300, RN beacon 1202 may start to transmit PRS signals and possibly SIBs to support OTDOA (e.g. may initially support a normal PRS mode). PRS transmissions (and other transmissions) from RN beacon 1202 that are intended to be received by UEs (as opposed to by DeNB 1204) may be aligned with some absolute time source, such as GPS or some other GNSS if RN beacon 1202 has a GPS or GNSS receiver. Alternatively, PRS transmission may be aligned with PRS transmission from DeNB 1204—e.g. may be exactly aligned taking into account the signal propagation time from DeNB 1204 (e.g. which may be provided by O&M function 1212 at step 3 or measured by RN beacon 1202 or DeNB 1204), or may have some fixed known offset to PRS transmission from DeNB 1204 (e.g. provided by O&M function 1212 at step 3).

Several alternatives may be used to configure information for RN beacon 1202 in location servers such as E-SMLC 1208 and H-SLP 1214 to assist ODTOA positioning of target UEs. The information that is configured may include the identity of RN beacon 1202 (e.g. a TAC and CI for a cell supported by RN beacon 1202 assigned by the O&M function at step 2), the location of RN beacon 1202, the identity (e.g. cell identity) of DeNB 1204 and PRS signaling and scheduling information for RN beacon 1202 (such as PRS timing, frequency of PRS occasions, PRS coding, number of consecutive subframes $N_{PRS}$, bandwidth BW for each of normal and emergency PRS modes). The information may be partly or completely configured in location servers by O&M prior to RN beacon 1202 going into operation or after RN beacon 1202 goes into operation—e.g. by O&M function 1212 following step 3 in FIG. 13. The information may also or instead be provided by RN beacon 1202 at step 5 in FIG. 13, in which RN beacon 1202 may send one or more messages (e.g. LPPa messages) directly to an E-SMLC (e.g. to E-SMLC 1208 at step 5a in FIG. 13) and/or to an H-SLP (e.g. H-SLP 1214 at step 5b in FIG. 13). Message transfer (e.g. LPPa message transfer) in step 5b from RN beacon 1202 to H-SLP 1214 may use IP transport (possibly assisted by SCTP) via DeNB 1204 and via either or both of IP network 1210 and any SGW and PDG in core network 140 assigned to RN beacon 1202 in step 2. Message transfer (e.g. LPPa message transfer) in step 5a from RN beacon 1202 to E-SMLC 1208 may be sent via DeNB 1204, in which DeNB 1204 forwards any LPPa messages received from RN beacon 1202 to one or more MMEs (e.g. such as MME 1206) for onward transfer to one or more E-SMLCs (e.g. such as E-SMLC 1208). As an example of step 5a, RN beacon 1202 may send an S1-AP Non-UE Associated Uplink LPPa Transport message containing an LPPa message to DeNB 1204 using the LTE S1 signaling connection established at step 4 and may include an E-SMLC indication (e.g. as provided to RN beacon 1202 at step 3 by O&M function 1212) in the S1-AP message. DeNB 1204 may then forward the received S1-AP Non-UE Associated Uplink Transport message to an MME (e.g. MME 1206) which may extract the contained LPPa message and forward the LPPa message to an E-SMLC (e.g. E-SMLC 1208) that is indicated in the received S1-AP Non-UE Associated Uplink Transport message.

Some or all of the configuration information for RN beacon 1202 may also or instead be requested by one or more location servers at step 6a and/or step 6b in FIG. 13. For example, at step 6b, H-SLP 1214 may be aware of the existence of RN beacon 1202 and know an IP address assigned to RN beacon 1202 by DeNB 1204, or by core network 140 (e.g. by a PDG in core network 140) during RN beacon attachment in step 2, due to information provided earlier by RN beacon 1202 (e.g. at step 5b) or provided earlier by O&M function 1212. H-SLP 1214 may then use this IP address to send a request message (e.g. an LPPa message) to RN beacon 1202 via core network 140 and DeNB 1204 and RN beacon 1202 may respond with the information requested. Alternatively or in addition at step 6a, E-SMLC 1208 may be aware of the existence of RN beacon 1202 and know the identity (e.g. LAC and CI) for DeNB 1204 and for RN beacon 1202 due to information provided earlier by RN beacon 1202 (e.g. at step 5a) or provided earlier by O&M function 1212. E-SMLC 1208 may then send a request message (e.g. an LPPa message) to RN beacon 1202 via MME 1206 and DeNB 1204 (e.g. using S1-AP non-UE associated transport between MME 1206 and DeNB 1204), and RN beacon 1202 may respond with the information requested. For example, an LPPa request message may be routed from E-SMLC 1208 to DeNB 1204 via MME 1206 based on the identity (e.g. cell ID) for DeNB 1204 and may then be forwarded by DeNB 1204 to RN beacon 1202 based on an identity (e.g. cell ID) for RN beacon 1202 which may be included either as part of the LPPa request message or in an S1-AP message (e.g. an S1-AP Downlink Non-UE Associated LPPa Transport message) that transfers the LPPa request message from MME 1206 to DeNB 1204.

In an embodiment, step 6a or step 6b may be triggered when E-SMLC 1208 or H-SLP 1214, respectively, receives a location request for a UE served by RN beacon 1202 or to which RN beacon 102 is visible. E-SMLC 1208 or H-SLP 1214 may then also receive the cell identity for RN beacon 1202 (e.g. as part of the location request or from the UE being positioned such as within ECID measurements provided by the UE). The received cell identity may indicate association with an RN beacon. For example, the indication may be contained in certain digits or bits in the cell identity (e.g. the TAC or CI). Moreover, the network operator for the core network 140 may have reserved a range of TAC values or CI values or certain values for certain bits in a TCA or CI to indicate an eNB beacon and may have configured this reserved range or these reserved values in E-SMLC 1208 and/or H-SLP 1214. Upon determining the received cell identity may correspond to an RN beacon, the E-SMLC 1208 or H-SLP 1214 may instigate step 6a or step 6b, respectively, as described above.

In order to control PRS transmission from RN beacon 1202 (e.g. perform step 8 or 9 described for FIG. 7), a location server may send a message to RN beacon 1202 containing PRS related information (e.g. instructions to temporarily switch from a normal to an emergency PRS mode). A location server that is an E-SMLC (e.g. E-SMLC 1208) may send the message (e.g. an LPPa message) at step 7a in FIG. 13 via an MME (e.g. MME 1206) and DeNB 1204. A location server that is an SLP (e.g. H-SLP 1214) may send the message (e.g. an LPPa message) at step 7b in FIG. 13 using IP transport via Core network 140 and DeNB 1204. The message transfer in steps 7a and 7b may be similar to or the same as that described earlier for steps 6a and 6b, respectively.

Figure 14:
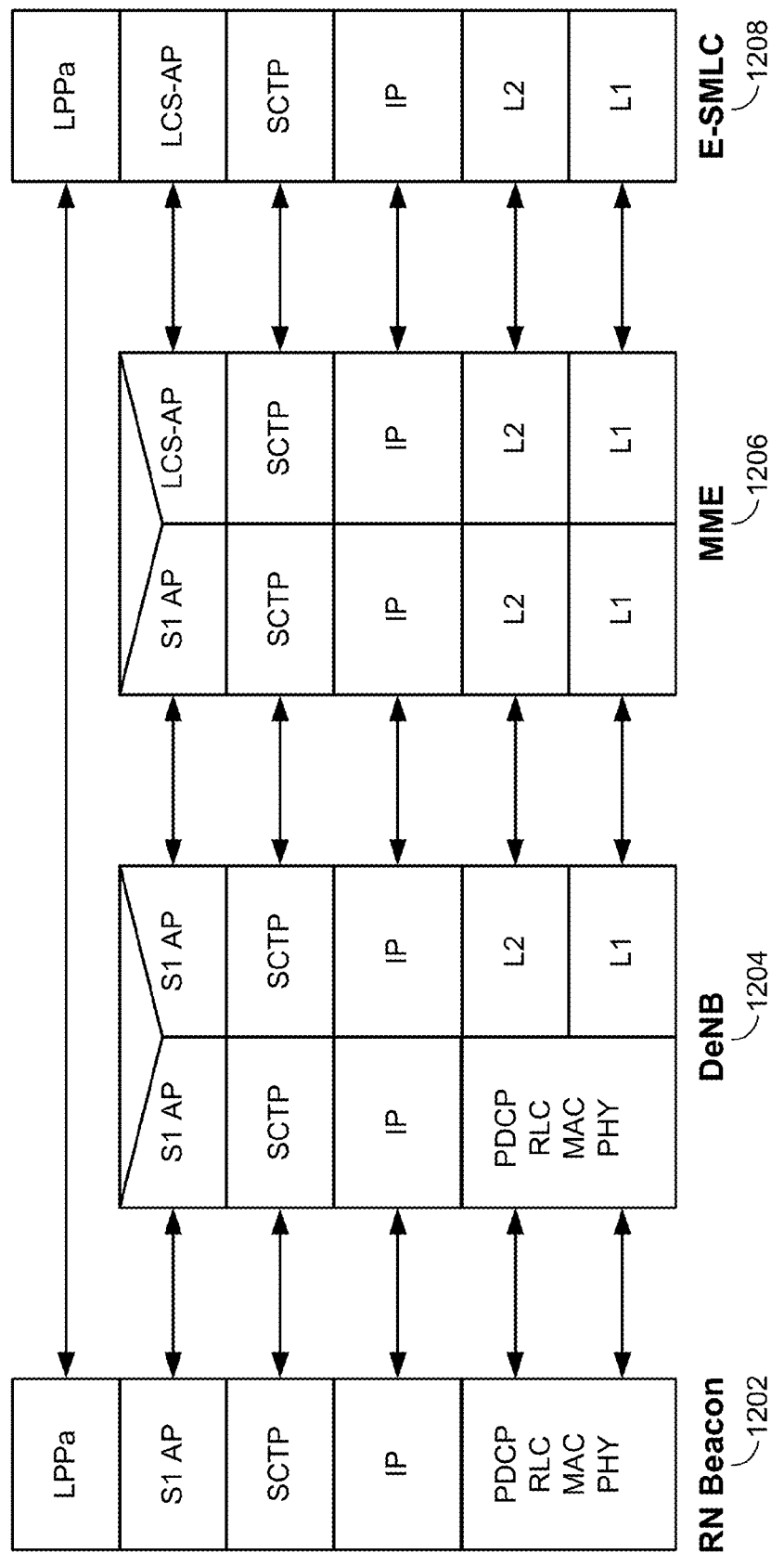
FIG. 14 illustrates an exemplary protocol layering in the system of FIG. 12.

Referring again to FIG. 13, to support the message transfers in step 5a, step 6a, and step 7a, support of relay nodes described in 3GPP TSA 36.300 may be enhanced. For example, S1 AP protocol messages that transfer LPPa messages not associated with a particular UE from an MME to an eNB may be extended to include the ID (e.g. CI and possibly TAC) of an RN beacon (e.g. RN beacon 1202) in the downlink direction to allow a recipient DeNB to forward the LPPa message to the correct destination RN beacon (e.g. using the wireless backhaul established by the RN beacon in step 2 of FIG. 13 and the LTE S1 signaling connection established in step 4 of FIG. 13). In the uplink direction, S1 AP messages that convey LPPa messages not associated with a particular UE may be extended to carry the ID (e.g. CI and TAC) of the source RN beacon to allow the recipient MME to indicate this (e.g. as well as an ID for the DeNB for the source RN beacon) when forwarding the LPPa message to the destination E-SMLC. Protocol layering that may be used in association with these enhancements and/or to support LPPa message transfer to support step 5a, step 6a, and step 7a without these enhancements is shown in FIG. 14 for the particular example of LPPa message transfer between RN beacon 1202 and E-SMLC 1208 in FIG. 12. The protocol layers supported between the RN beacon 1202 an DeNB 1204 in FIG. 14 may support the LTE S1 signaling link between the RN beacon 1202 and DeNB 1204 that is established in step 4 of FIG. 13 with messages for the S1-AP and SCTP signaling layers transferred using a data bearer between the RN beacon 1202 and DeNB 1204 that is supported by the protocol layers at and below the IP level shown in FIG. 14. The protocol layers supported between DeNB 1204 and MME 1206 in FIG. 14 may correspond to the normal protocols for the 3GPP S1 interface and the protocol layers supported between the MME 1206 and E-SMLC 1208 may correspond to the normal protocol layers for the 3GPP SLs interface.

In the case of LPPa message transfer between an SLP (e.g. H-SLP 1214) and an RN beacon (e.g. RN beacon 1202), IP transport may be used, possibly with SCTP being used above the IP layer and below LPPa with LPPa messages being routed using IP through IP network 1210 and/or core network 140 and via DeNB 1204 (using the wireless backhaul to RN beacon 1202 established with DeNB 1204 in step 2 in FIG. 13).

Similar techniques to those described above for supporting OTDOA positioning using eNB beacons with a wireless backhaul (e.g. as described in association with FIGS. 1-11) and/or RN beacons with a wireless backhaul (e.g. as described in association with FIGS. 1-7 and 12-14) can be used to support other positioning methods. For example, positioning using GPS pseudolites, GNSS pseudolites, or some other positioning method reliant on the transmission and measurement of downlink positioning related signals, may be supported by an eNB beacon 800 of FIG. 8 or RN beacon 1202 of FIG. 12, where an E-SMLC (e.g. E-SMLC 824 or E-SMLC 1208) or an H-SLP or D-SLP (e.g. H-SLP 812 or H-SLP 1214) uses LPPa (or some other protocol) to control the transmission of the downlink positioning related signals from the eNB beacon 800 or the RN beacon 1202. In such cases, the eNB beacon 800 or RN beacon 1202 may support a positioning method that is not OTDOA and in which the eNB beacon 800 or RN beacon 1202 transmits some positioning reference signal (e.g. similar to or the same as signals used for GPS or GNSS) enabling acquisition and measurement by a target UE. All aspects of FIGS. 8-14 described previously to support positioning could then remain the same except for: (i) any information I1 transferred between the eNB beacon 800 or the RN beacon 1202 and the HeMS 828 or O&M function 1212, respectively (e.g. in step 4 of FIG. 9 or step 3 of FIG. 13), (ii) any information I2 transferred between the E-SMLC 824 and the eNB beacon 800 (e.g. in step 6, step 7, and step 8 in FIG. 9) and (iii) any information I3 transferred between the RN beacon 1202 and either E-SMLC 1208 or H-SLP 1214 (e.g. in steps 5a-7b in FIG. 13). The information I1, I2 and I3 for (i), (ii) and (ii) above may no longer be related to OTDOA positioning (e.g. may not contain information for PRS) but may instead relate to a positioning method different to OTDOA (e.g. such as use of GPS or GNSS pseudolites). The support of position methods other than OTDOA may apply similarly to other types of eNB beacon (e.g. eNB beacon 400 in FIG. 4A) that may differ, at least in some respects, from the exemplary eNB beacon 800 and RN beacon 1202.

In addition to or instead of supporting PRS transmission for OTDOA positioning or transmission of some other positioning related signal for another positioning method, a positioning beacon such as eNB beacon 800 or RN beacon 1202 may function as a Location Measurement Unit (LMU) and periodically measure (i) the timing differences between PRS signals (or between some other downlink positioning related signals) transmitted by other eNBs belonging to the same operator network or (ii) the absolute times of arrival of PRS signals (or some other positioning related signals) transmitted by other eNBs. For example, a positioning beacon could measure the Reference Signal Time Difference (RSTD) between PRS transmissions from pairs of eNBs and/or eNB beacons as defined in 3GPP TS 36.214. The measurements may be provided to an E-SMLC (e.g. using steps similar to steps 6-7 in FIG. 9 in the case of an eNB beacon 800 or steps 5a-6a in FIG. 13 in the case of an RN beacon 1202). The measurements may also or instead be provided to an H-SLP or D-SLP (e.g. using steps similar to steps 5b-6b in FIG. 13 in the case of an RN beacon 1202). The measurements may enable an E-SMLC and/or an SLP to (i) monitor the degree of PRS synchronization (or degree of synchronization for some other positioning related signals) between different eNBs and/or different eNB beacons and/or (ii) update any timing differences between eNBs and/or eNB beacons which may be needed to support OTDOA (or some other positioning method) on behalf of different target UEs. By deploying positioning beacons (e.g. eNB beacons or RN beacons) with an efficient wireless backhaul, a network operator may be able to support OTDOA (or some other positioning method that uses downlink related positioning signals) more precisely and at lower cost by including the LMU function in some or all of the positioning beacons.

Figure 15:
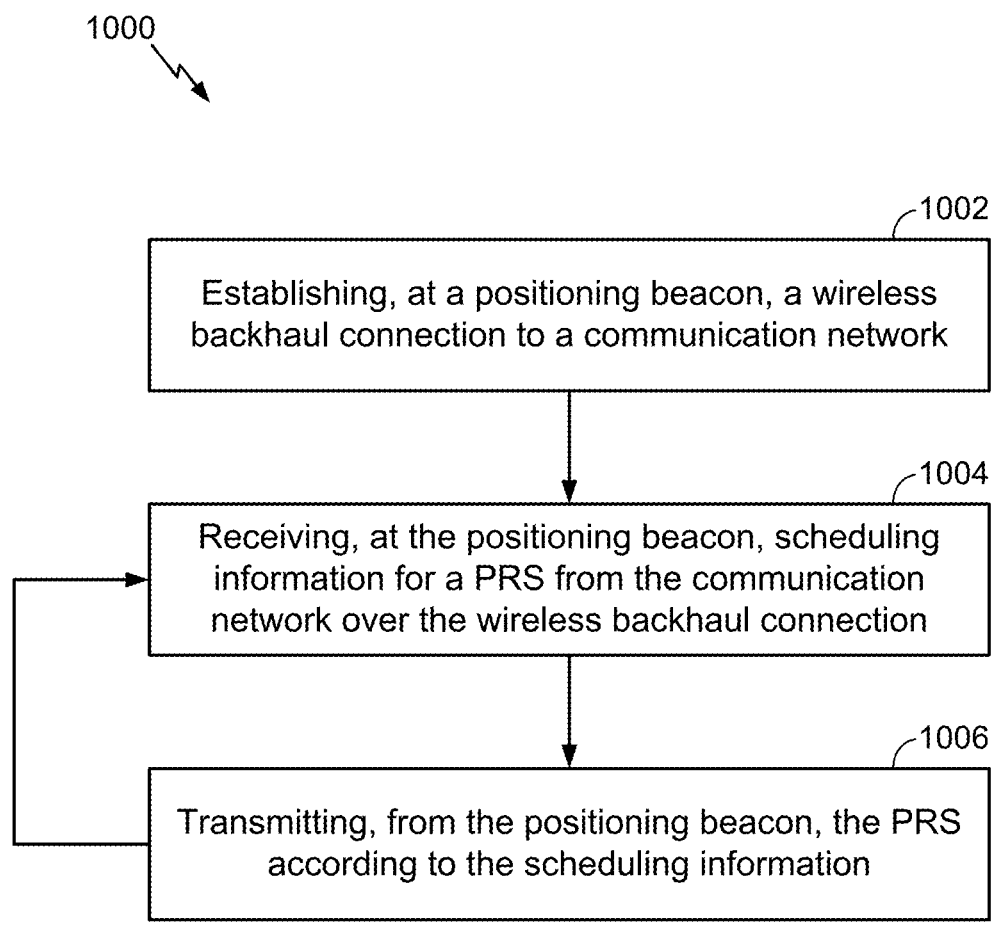
FIGS. 15-16 are block flow diagrams of respective processes for initializing a positioning beacon in a wireless communication system.

Referring to FIG. 15, with further reference to FIGS. 1-14, a process 1000 of initializing a positioning beacon in a wireless communication system includes the stages shown. The process 1000 is, however, an example only and not limiting. The process 1000 can be altered, e.g., by having stages added, removed, rearranged, combined, and/or performed concurrently. Still other alterations to the process 1000 as shown and described are possible.

At stage 1002, the process 1000 includes establishing, at a positioning beacon, a wireless backhaul connection to a communication network. A positioning beacon, e.g., a beacon comprising an eNB beacon 800 (that may comprise an HeNB portion 801 and a UE portion 802) as shown in FIGS. 8-9 or a beacon comprising an RN beacon 1202 as shown in FIGS. 12-13, establishes a wireless backhaul connection to a communication network. In the case of a positioning beacon comprising an eNB beacon 800, the wireless backhaul connection may be established as described for steps 1-5 in FIG. 9. In the case of a positioning beacon comprising an RN beacon 1202, the wireless backhaul connection may be established as described for steps 1-4 in FIG. 13.

At stage 1004, the process 1000 includes receiving, at the positioning beacon, scheduling information for a PRS from the communication network over the wireless backhaul connection. The positioning beacon receives scheduling information for a PRS from the communication network, e.g., from a location server such as an E-SMLC or SLP in the network. The entity from which the scheduling information is obtained at stage 1004 may vary based on a location solution utilized by the positioning beacon, and/or other factors. For instance, if the location server is accessed by the positioning beacon from an MME (e.g., MME 822 or MME 1206) according to the LTE control plane location solution for 3GPP, the positioning beacon may obtain the scheduling information from an E-SMLC (e.g., E-SMLC 824 or E-SMLC 1208) as described for step 8 in FIG. 9 and step 7a in FIG. 13. Alternatively, if the positioning beacon accesses the location server using IP (e.g. via an IP network such as IP network 1210 and/or via a PDG such as PDG 808) according to a user plane location solution, the positioning beacon may obtain the scheduling information from an H-SLP and/or a D-SLP (e.g. H-SLP 812 or H-SLP 1214) as described for step 7b in FIG. 13. Further, the scheduling information may instruct the positioning beacon to adjust its PRS mode, e.g., from a normal PRS mode to an emergency PRS mode, or vice versa.

At stage 1006, the process 1000 includes transmitting, from the positioning beacon, the PRS according to the received scheduling information. The positioning beacon begins transmitting the PRS according to the scheduling information received at stage 1004. The positioning beacon may receive further updated PRS scheduling information and/or other control information relating to the PRS during transmission of the PRS at some later time at stage 1004, in response to which the positioning beacon may update a schedule and/or one or more other properties of the PRS transmission and continue transmitting the PRS according to the updated properties at stage 1006.

Figure 16:
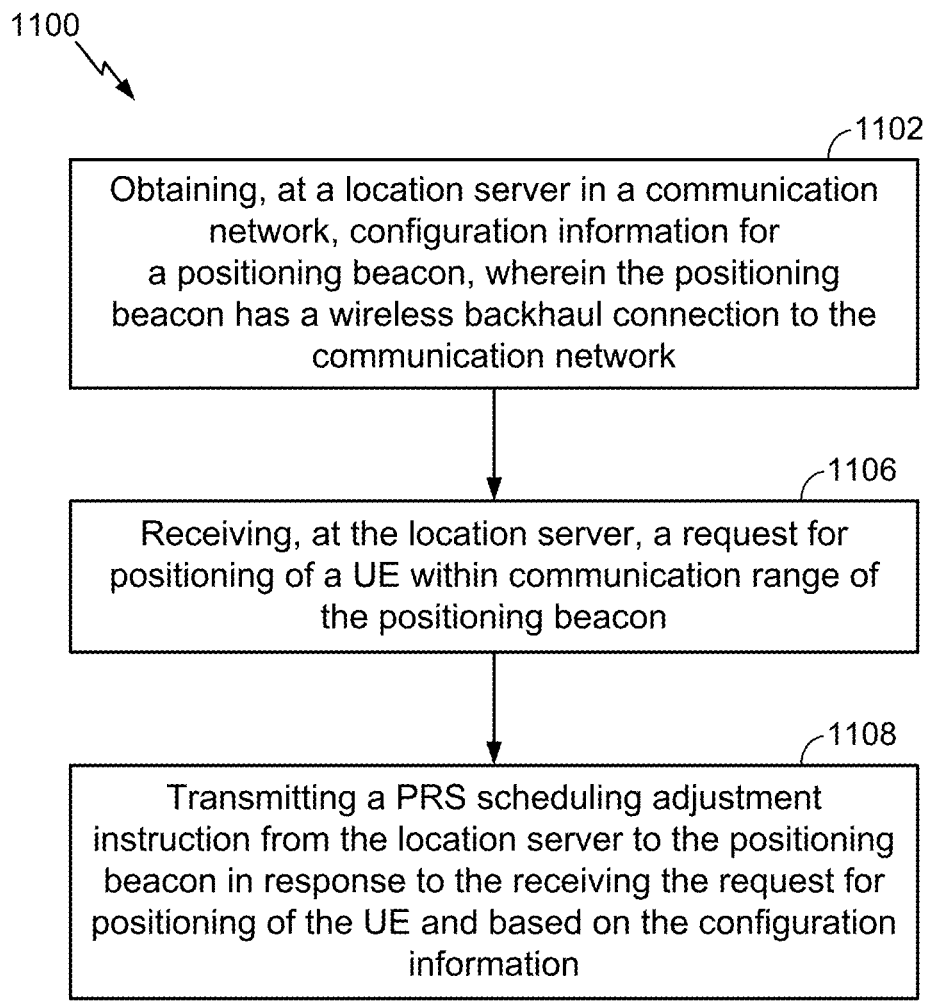

Referring next to FIG. 16, with further reference to FIGS. 1-14, another process 1100 of initializing a positioning beacon in a wireless communication system includes the stages shown. The process 1100 is, however, an example only and not limiting. The process 1100 can be altered, e.g., by having stages added, removed, rearranged, combined, and/or performed concurrently. Still other alterations to the process 1100 as shown and described are possible.

At stage 1102, the process 1100 includes obtaining, at a location server in a communication network, configuration information for a positioning beacon, wherein the positioning beacon has a wireless backhaul connection to the communication network. A location server in a communication network obtains configuration information for a positioning beacon, where the positioning beacon has a wireless backhaul connection to the communication network. The positioning beacon may be an eNB beacon such as eNB beacon 800 in FIG. 8, in which case the location server may obtain the configuration information as described for step 6 and step 7 of FIG. 9 when the location server is an E-SMLC. The positioning beacon may instead be an RN beacon such as RN beacon 1202 in FIG. 12, in which case the location server may obtain the configuration information as described for step 5a and step 6a of FIG. 13 when the location server is an E-SMLC or as described for step 5b and step 6b of FIG. 13 when the location server is an SLP. The configuration information may comprise one or more of a TAC, CI, location, PRS scheduling information. PRS signaling information or a DeNB identity (e.g. cell ID) for the positioning beacon.

At stage 1106, the process 1100 includes receiving, at the location server, a request for positioning of a user equipment (UE) within communication range of the positioning beacon. The location server receives a request for positioning of a UE within communication range of the positioning beacon. This may be triggered by the UE requesting a location-based service, initiating an emergency call, or a location request being received and transferred to the location server from an external client (e.g. a PSAP) etc.

At stage 1108, the process 1100 includes transmitting a positioning reference signal (PRS) scheduling adjustment instruction from the location server to the positioning beacon in response to the receiving and based on the configuration information. A PRS scheduling adjustment instruction is transmitted from the location server to the positioning beacon in response to receiving the request at stage 1106. The transmission may make use of the configuration information received at stage 1102—e.g. the CI, TAC or DeNB identity for the positioning beacon. As noted above with respect to FIG. 15, transmissions from the location server to the positioning beacon may be conducted through one or more intermediate entities, such as an MME, PDG, IP network, etc., based on the particular network configuration and the positioning technique utilized by the positioning beacon and the location server (e.g., user plane or control plane). As further described above with respect to FIG. 15, the instruction transmitted to the positioning beacon may cause the positioning beacon to alter its PRS transmission schedule in one or more ways, e.g., by switching from a normal PRS mode to an emergency PRS mode, or vice versa.

In some embodiments of the process 1100, stage 1102 may occur after stage 1106 but before stage 1108 as a result of the location server receiving a request for positioning of a UE at stage 1106. In such embodiments, stage 1102 may be triggered by stage 1106 as described for triggering of step 7 in FIG. 9 by a request for a UE location to a location server in the case of a positioning beacon that is an eNB beacon (e.g. eNB beacon 800) and a location server that is an E-SMLC (e.g. E-SMLC 824). Alternatively, stage 1102 may be triggered by stage 1106 as described for triggering of step 6a or step 6b in FIG. 13 by a request for a UE location to a location server in the case of a positioning beacon that is an RN beacon (e.g. RN beacon 1202) and a location server that is an E-SMLC (e.g. E-SMLC 1208) in the case of step 6a or an SLP (e.g. H-SLP 1214) in the case of step 6b. In this case, stage 1108 occurs after stage 1102.

Figure 17:
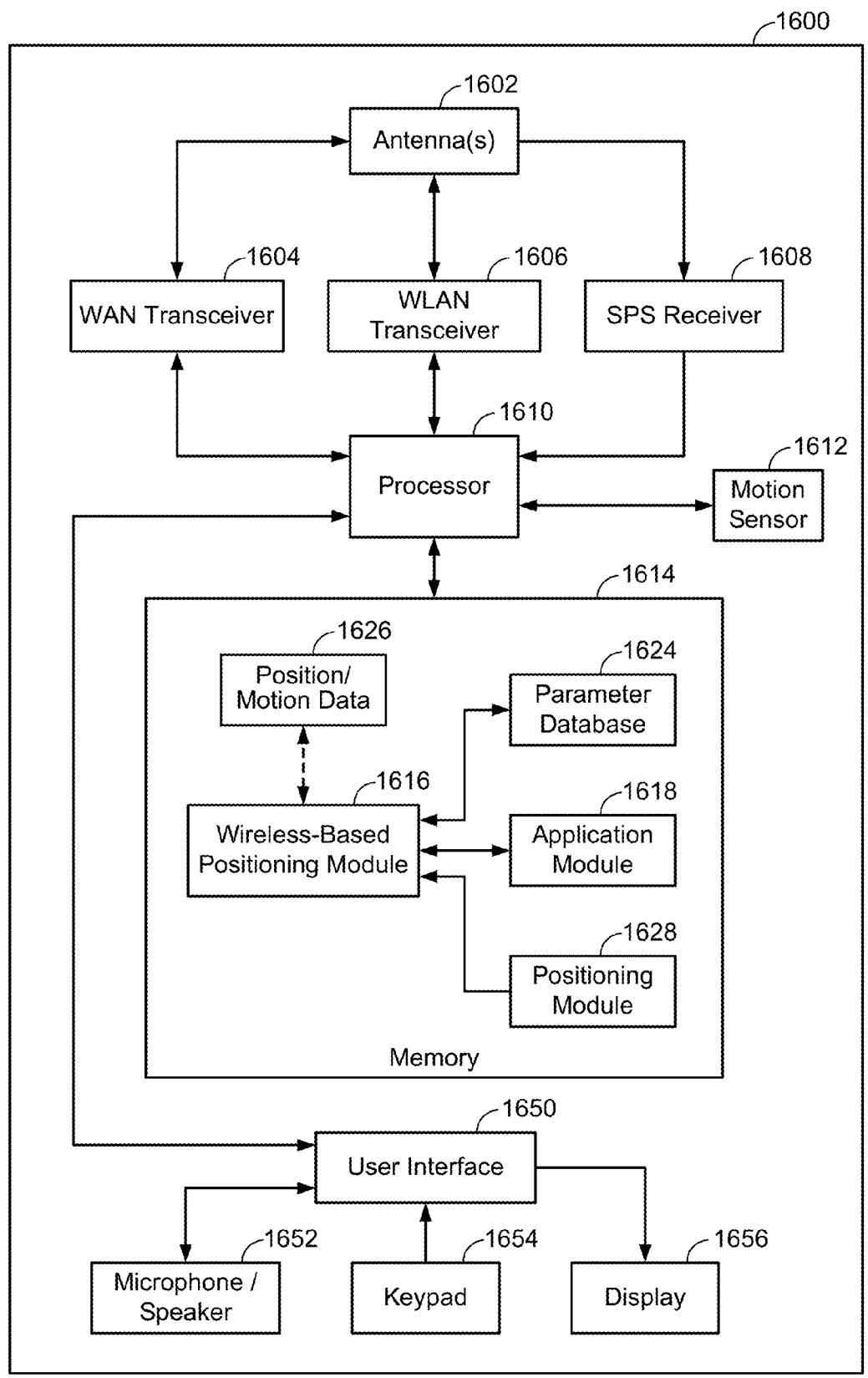
FIG. 17 illustrates an exemplary positioning beacon that may be used in an operating environment that can determine position using wireless techniques, according to one aspect of the disclosure.

FIG. 17 is a block diagram illustrating various components of an exemplary positioning beacon 1600. For the sake of simplicity, the various features and functions illustrated in the box diagram of FIG. 17 are shown connected together using a common processor 1610 and a number of dedicated links which are meant to represent that these various features and functions are operatively coupled together. Those skilled in the art will recognize that other connections, mechanisms, features, functions, or the like, (e.g. such as a common bus or common memory) may be provided and adapted as necessary to operatively couple and configure an actual portable wireless device. Further, it is also recognized that one or more of the features or functions illustrated in the example of FIG. 17 may be further subdivided or two or more of the features or functions illustrated in FIG. 17 may be combined. Positioning beacon 1600 may be an example of eNBs 202, 205 and/or 210 in FIG. 2, eNB 305 in FIG. 3A, FIG. 3B, FIG. 4A and/or FIG. 4B, eNB 410 and/or eNB Beacon 400 in FIG. 4A, eNB 305 and/or eNB 410 in FIG. 7, eNB beacon 800, HeNB portion 801 and/or UE portion 802 in FIGS. 8-11, and/or RN beacon 1202 and/or DeNB 1204 in FIGS. 12-14.

The positioning beacon 1600 may include one or more wide area network (WAN) transceiver(s) 1604 that may be connected to one or more antennas 1602. The WAN transceiver 1604 comprises suitable devices, hardware, and/or software for communicating with and/or detecting signals to/from (i) wireless access points or base stations, such as eNodeBs 202, 205, 210 and 305, (ii) UEs such as UEs UE 1 . . . UE N in FIG. 1, UEs 250, 252, 254 in FIG. 2, and UE 302 in FIGS. 3A, 3B, 4A, 4B, 7 and/or (iii) directly with other wireless devices within a network. In one aspect, the WAN transceiver 1604 may be suitable for communicating with an LTE system, WCDMA system, CDMA2000 system, TDMA, GSM or any other type of wide area wireless networking technologies. In an aspect, the WAN transceiver 1604 may support the transmission and scheduling of PRS signals used to support OTDOA positioning as described in association with FIGS. 7, 9 and 13 and may support an emergency PRS mode and a normal PRS mode. The positioning beacon 1600 may also include one or more wireless local area network (WLAN) transceivers 1606 that may be connected to one or more antennas 1602. The WLAN transceiver 1606 comprises suitable devices, hardware, and/or software for communicating with and/or detecting signals to/from WLAN APs, and/or directly with other wireless devices within a network. In one aspect, the WLAN transceiver 1606 may comprise a Wi-Fi (802.11x) communication system suitable for communicating with one or more wireless access points; however in other aspects, the WLAN transceiver 1606 comprise another type of local area network, personal area network, (e.g., Bluetooth). Additionally, any other type of wireless networking technologies may be used, for example, Ultra Wide Band, ZigBee, wireless USB, etc.

An SPS receiver 1608 may also be included in the positioning beacon 1600. The SPS receiver 1608 may be connected to the one or more antennas 1602 for receiving satellite signals. To this end, the antennas 1602 may include one or more dedicated SPS antennas, or alternatively one or more of the antennas 1602 could be utilized for multiple communication technologies that include SPS communication. The SPS receiver 1608 may comprise any suitable hardware and/or software for receiving and processing SPS signals. The SPS receiver 1608 requests information and operations as appropriate from the other systems, and performs the calculations necessary to determine or help determine the positioning beacon's 1600 position using measurements obtained by any suitable SPS algorithm. In an aspect, the SPS receiver 1608 may be used by positioning beacon 1600 to synchronize PRS transmission by positioning beacon 1600 to a common time used for PRS transmission from other APs, base stations and positioning beacons for the network to which positioning beacon 1600 may belong.

A motion sensor 1612 may be coupled to a processor 1610 to provide movement and/or orientation information, which is independent of motion data derived from signals received by the WAN transceiver 1604, the WLAN transceiver 1606 and the SPS receiver 1608.

The processor 1610 may be connected to the WAN transceiver 1604, WLAN transceiver 1606, the SPS receiver 1608 and the motion sensor 1612. The processor 1610 may include one or more microprocessors, microcontrollers, and/or digital signal processors that provide processing functions, as well as other calculation and control functionality. The processor 1610 may also include or be coupled to memory 1614 for storing data and software instructions for executing programmed functionality within the positioning beacon 1600. The memory 1614 may be on-board the processor 1610 (e.g., within the same integrated circuit package), and/or the memory may be external memory to the processor and functionally coupled over a data bus.

A number of software modules and data tables may reside in memory 1614 and be utilized by the processor 1610 in order to manage both communications and positioning determination functionality. As illustrated in FIG. 17, memory 1614 may include and/or otherwise receive a wireless-based positioning module 1616, an application module 1618, and a positioning module 1628. Memory 1614 may further include instructions (e.g. software or firmware) to enable positioning beacon 1600 to perform the various techniques described herein for a positioning beacon such as those exemplified in FIGS. 1-16. Memory 1614 may further include configuration information concerning PRS scheduling and/or PRS signaling that may have been configured in positioning beacon 1600 by an O&M function or by a location server (e.g. as exemplified in FIGS. 9 and 13). The organization of the memory contents as shown in FIG. 17 is merely exemplary, and as such the functionality of the modules and/or data structures may be combined, separated, and/or be structured in different ways depending upon the implementation of the positioning beacon 1600.

The application module 1618 may be a process running on the processor 1610 of the positioning beacon 1600, which requests position information from the wireless-based positioning module 1616. Applications typically run within an upper layer of the software architecture. The wireless-based positioning module 1616 may store and access position/motion data 1626 and may derive the position of the positioning beacon 1600 using information derived from SPS receiver 1608 and/or time information measured from signals exchanged with a plurality of APs, such as eNodeBs 202, 205, 210 and 305. The exchanged signals may include the (expanded) adaptive PRS scheduling messages disclosed herein.

While the modules shown in FIG. 17 are illustrated in the example as being contained in the memory 1614, it is recognized that in certain implementations such procedures may be provided for or otherwise operatively arranged using other or additional mechanisms. For example, all or part of the wireless-based positioning module 1616 and/or the application module 1618 may be provided in firmware. Additionally, while in this example the wireless-based positioning module 1616 and the application module 1618 are illustrated as being separate features, it is recognized, for example, that such procedures may be combined together as one procedure or perhaps with other procedures, or otherwise further divided into a plurality of sub-procedures.

The processor 1610 may include any form of logic suitable for performing at least the techniques provided herein. For example, the processor 1610 may be operatively configurable based on instructions in the memory 1614 to selectively initiate one or more routines that exploit motion data for use in other portions of the positioning beacon.

The positioning beacon 1600 may include a user interface 1650 which provides any suitable interface systems, such as a microphone/speaker 1652, keypad 1654, and display 1656 that allows user interaction with the positioning beacon 1600. The microphone/speaker 1652 provides for voice communication services using the WAN transceiver 1604 and/or the WLAN transceiver 1606. The keypad 1654 comprises any suitable buttons for user input. The display 1656 comprises any suitable display, such as, for example, a backlit LCD display, and may further include a touch screen display for additional user input modes.

Figure 18:
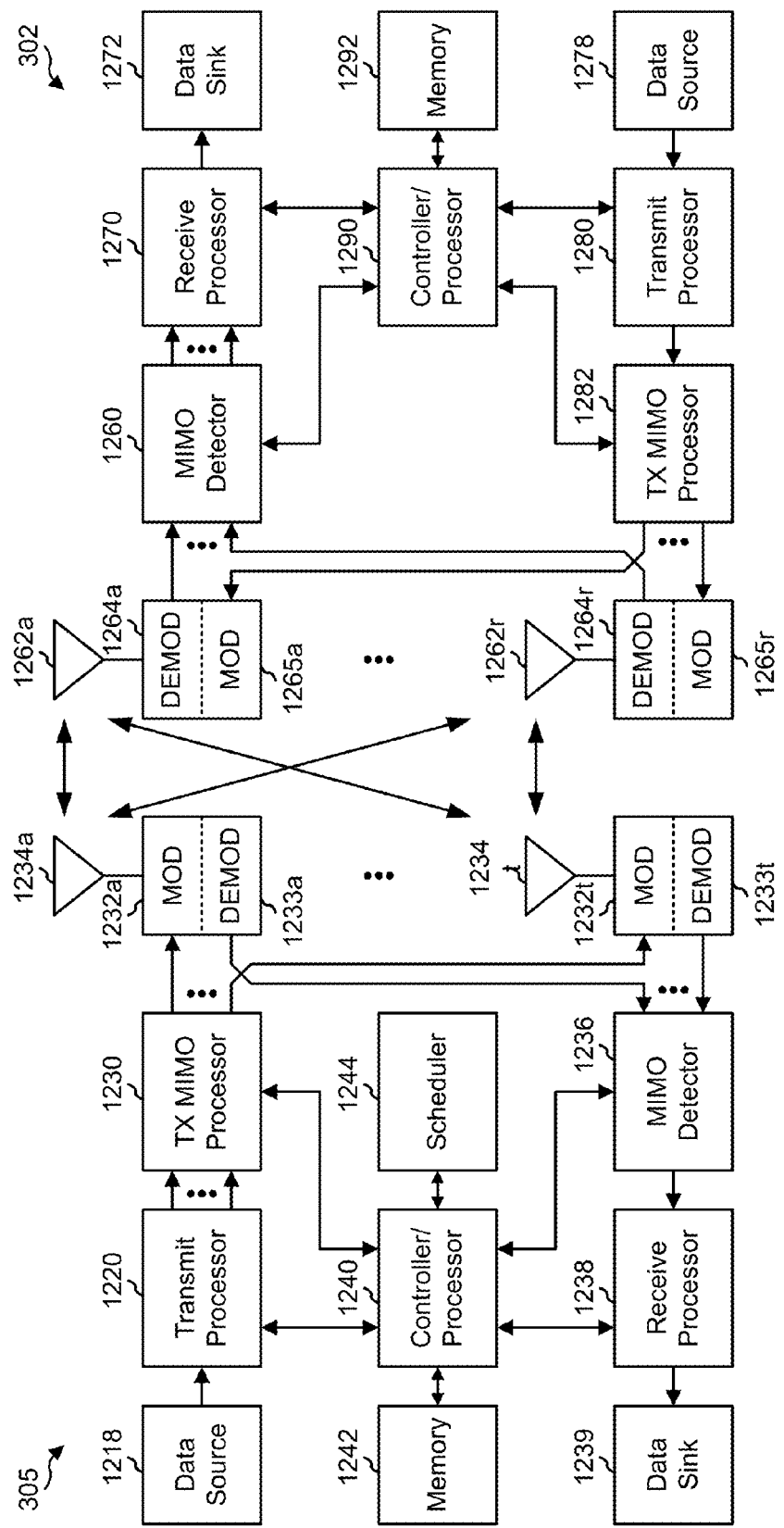
FIG. 18 illustrates an exemplary block diagram of a design of a positioning beacon and a user equipment (UE) according to one aspect of the disclosure.

FIG. 18 illustrates a block diagram of an exemplary design of a positioning beacon 305 and a UE 302, which may be one of the positioning beacons (e.g. eNB beacon 400, eNB beacon 800 or RN beacon 1202) and one of the UEs (e.g. UE 302) discussed herein in relation to the various embodiments. In this design, positioning beacon 305 is equipped with T antennas 1234a through 1234t, and UE 302 is equipped with R antennas 1262a through 1262r, where T and R are generally greater than or equal to 1.

At positioning beacon 305, a transmit processor 1220 may receive data representing a PRS schedule from a data source 1218 (e.g., directly or indirectly from location server 170). Transmit processor 1220 may process the data for each service to obtain data symbols. Transmit processor 1220 may also receive scheduling information, configuration information, control information, system information and/or other overhead information from a controller/processor 1240 and/or a scheduler 1244. Transmit processor 1220 may process the received overhead information and provide overhead symbols. A transmit (TX) multiple-input multiple-output (MIMO) processor 1230 may multiplex the data and overhead symbols with pilot symbols, process (e.g., precode) the multiplexed symbols, and provide T output symbol streams to T modulators (MOD) 1232a through 1232t. Each modulator 1232 may process a respective output symbol stream (e.g., for OFDM) to obtain an output sample stream. Each modulator 1232 may further process (e.g., convert to analog, amplify, filter, and upconvert) the output sample stream to obtain a downlink signal, such as a PRS signal. T downlink signals from modulators 1232a through 1232t may be transmitted via T antennas 1234a through 1234t, respectively. Transmission via T antennas 1234a through 1234t may employ transmit diversity whereby each PRS subframe (or part of each PRS subframe) is transmitted from only one antenna or a subset of antennas and not from all antennas. For example, the transmit diversity may alternate transmission of consecutive whole PRS subframes from each of two different antennas.

At UE 302, antennas 1262a through 1262r may receive the downlink signals (e.g. PRS signals) from positioning beacon 305 and provide received signals to demodulators (DEMOD) 1264a through 1264r, respectively. Each demodulator 1264 may condition (e.g., filter, amplify, downconvert, and digitize) a respective received signal to obtain received samples and may further process the received samples (e.g., for OFDM) to obtain received symbols. A MIMO detector 1260 may receive and process the received symbols from all R demodulators 1264a through 1264r and provide detected symbols. A receive processor 1270 may process the detected symbols, detect and measure a time of arrival or RSTD for a PRS signal, or provide decoded data for UE 302 and/or desired services to a data sink 1272, and provide decoded overhead information to a controller/processor 1290. In general, the processing by MIMO detector 1260 and receive processor 1270 is complementary to the processing by TX MIMO processor 1230 and transmit processor 1220 at positioning beacon 305.

On the uplink, at UE 302, data from a data source 1278 and overhead information from a controller/processor 1290 may be processed by a transmit processor 1280, further processed by a TX MIMO processor 1282 (if applicable), conditioned by modulators 1265a through 1265r, and transmitted via antennas 1262a through 1262r. At positioning beacon 305, the uplink signals from UE 302 may be received by antennas 1234, conditioned by demodulators 1233, detected by a MIMO detector 1236, and processed by a receive processor 1238 to obtain the data and overhead information transmitted by UE 302.

Controllers/processors 1240 and 1290 may direct the operation at positioning beacon 305 and UE 302, respectively. Scheduler 1244 may schedule UEs for downlink and/or uplink transmission, schedule transmission of PRS signals, and provide assignments of radio resources for the scheduled UEs and services. Controller/processor 1240 and/or scheduler 1244 may generate scheduling information and/or other overhead information for the PRS signals.

Controller/processor 1290 may implement processes for the techniques described herein. Memories 1242 and 1292 may store data and program codes for eNodeB 305 and UE 302, respectively. Accordingly, adaptive PRS scheduling can be accomplished in accordance with the various embodiments disclosed herein, while still remaining compliant with the existing standards.

Figure 19:
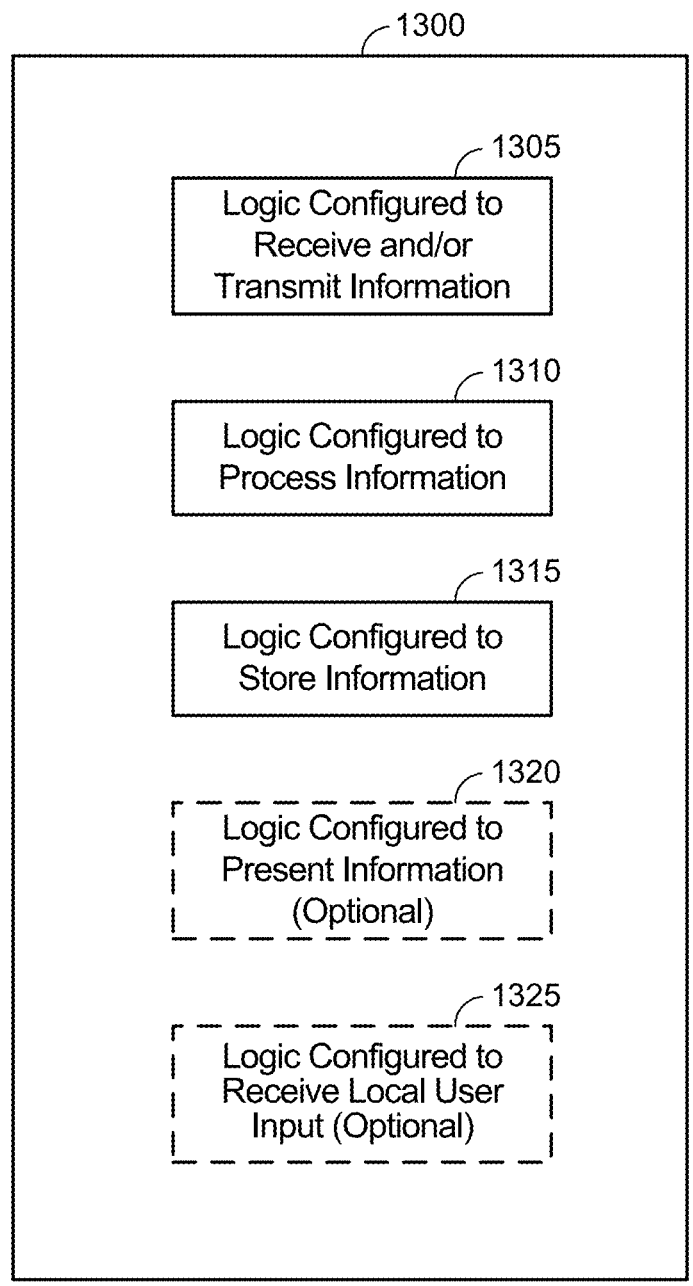
FIG. 19 illustrates a communication device that includes logic configured to perform functionality in accordance with an aspect of the disclosure.

FIG. 19 illustrates a communication device 1300 that includes logic configured to perform functionality. The communication device 1300 can correspond to any of the above-noted communication devices, including but not limited to UEs 250, 252, 254, any component of the RAN 120 (e.g., eNodeBs 202, 205, 210, eNB beacon 400, eNB beacon 800, RN beacon 1202, etc.), any component of the core network 140 (e.g., MME 215 or 220, SGW 230, PDG 235), any components coupled with the core network 140 and/or the Internet 175 (e.g., the location server 170), and any location server (e.g. location server 170, E-SMLC 355, 814, 824 or 1208, E-SLP 335 or H-SLP 812 or 1214) and so on. Thus, communication device 1300 can correspond to any electronic device that is configured to communicate with (or facilitate communication with) one or more other entities over the wireless communications system 100 of FIG. 1 and the systems/architectures illustrated in FIGS. 2-4.

Referring to FIG. 19, the communication device 1300 includes logic configured to receive and/or transmit information 1305. In an example, if the communication device 1300 corresponds to a wireless communications device (e.g., positioning beacon 1600, eNB beacon 800, RN beacon 1202, any of eNodeBs 202, 205, 210, 305, 400, etc.), the logic configured to receive and/or transmit information 1305 can include a wireless communications interface (e.g., Bluetooth, WiFi, 2G, CDMA2000, WCDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 1305 can correspond to a wired communications interface (e.g., a serial connection, a USB or Firewire connection, an Ethernet connection, packet cable connection, DSL connection, SONET connection through which the Internet 175 and/or other network entities can be accessed, etc.). Thus, if the communication device 1300 corresponds to some type of network-based server or other network element (e.g., SGSN, GGSN, SGW, PDG, MME, E-SMLC, SLP, the location server 170, etc.), the logic configured to receive and/or transmit information 1305 can correspond to an Ethernet card, in an example, that connects the network-based server to other communication entities via an Ethernet protocol. In a further example, the logic configured to receive and/or transmit information 1305 can include sensory or measurement hardware by which the communication device 1300 can monitor its local environment (e.g., an accelerometer, a temperature sensor, a light sensor, an antenna for monitoring local RF signals, etc.). The logic configured to receive and/or transmit information 1305 can also include software that, when executed, permits the associated hardware of the logic configured to receive and/or transmit information 1305 to perform its reception and/or transmission function(s). However, the logic configured to receive and/or transmit information 1305 may not correspond to software alone and may rely at least in part upon hardware to achieve its functionality.

Referring to FIG. 19, the communication device 1300 further includes logic configured to process information 1310. In an example, the logic configured to process information 1310 can include at least a processor. Example implementations of the type of processing that can be performed by the logic configured to process information 1310 includes but is not limited to performing determinations, establishing connections, making selections between different information options, performing evaluations related to data, interacting with sensors coupled to the communication device 1300 to perform measurement operations, converting information from one format to another. For example, the processor included in the logic configured to process information 1310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 1310 can also include software that, when executed, permits the associated hardware of the logic configured to process information 1310 to perform its processing function(s). However, the logic configured to process information 1310 may not correspond to software alone and may rely at least in part upon hardware to achieve its functionality.

Referring to FIG. 19, the communication device 1300 further includes logic configured to store information 1315. In an example, the logic configured to store information 1315 can include at least a non-transitory memory and associated hardware (e.g., a memory controller, etc.). For example, the non-transitory memory included in the logic configured to store information 1315 can correspond to RAM, flash memory, ROM, EPROM, EEPROM, registers, hard disk, a removable disk, a CD-ROM, or any other form of storage medium known in the art. The logic configured to store information 1315 can also include software that, when executed, permits the associated hardware of the logic configured to store information 1315 to perform its storage function(s). However, the logic configured to store information 1315 may not correspond to software alone and may rely at least in part upon hardware to achieve its functionality.

Referring to FIG. 19, the communication device 1300 further optionally includes logic configured to present information 1320. In an example, the logic configured to present information 1320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1300. For example, if the communication device 1300 corresponds to positioning beacon 1600 as shown in FIG. 17, the logic configured to present information 1320 can include the display 1656 of positioning beacon 1600. In a further example, the logic configured to present information 1320 can be omitted for certain communication devices, such as network communication devices that do not have a local user (e.g., network switches or routers, remote servers, etc.). The logic configured to present information 1320 can also include software that, when executed, permits the associated hardware of the logic configured to present information 1320 to perform its presentation function(s). However, the logic configured to present information 1320 may not correspond to software alone and may rely at least in part upon hardware to achieve its functionality.

Referring to FIG. 19, the communication device 1300 further optionally includes logic configured to receive local user input 1325. In an example, the logic configured to receive local user input 1325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 1300. For example, if the communication device 1300 corresponds to positioning beacon 1600 as shown in FIG. 17, the logic configured to receive local user input 1325 can include the microphone 1652, the keypad 1654, the display 1656, etc. In a further example, the logic configured to receive local user input 1325 can be omitted for certain communication devices, such as network communication devices that do not have a local user (e.g., network switches or routers, remote servers, etc.). The logic configured to receive local user input 1325 can also include software that, when executed, permits the associated hardware of the logic configured to receive local user input 1325 to perform its input reception function(s). However, the logic configured to receive local user input 1325 may not correspond to software alone and may rely at least in part upon hardware to achieve its functionality.

Referring to FIG. 19, while the configured logics of 1305 through 1325 are shown as separate or distinct blocks in FIG. 19, the hardware and/or software by which the respective configured logic performs its functionality can overlap in part. For example, any software used to facilitate the functionality of the configured logics of 1305 through 1325 can be stored in the non-transitory memory associated with the logic configured to store information 1315, such that the configured logics of 1305 through 1325 each performs their functionality (i.e., in this case, software execution) based in part upon the operation of software stored by the logic configured to store information 1315. Likewise, hardware that is directly associated with one of the configured logics can be borrowed or used by other configured logics from time to time. For example, the processor of the logic configured to process information 1310 can format data into an appropriate format before being transmitted by the logic configured to receive and/or transmit information 1305, such that the logic configured to receive and/or transmit information 1305 performs its functionality (i.e., in this case, transmission of data) based in part upon the operation of hardware (i.e., the processor) associated with the logic configured to process information 1310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 20:
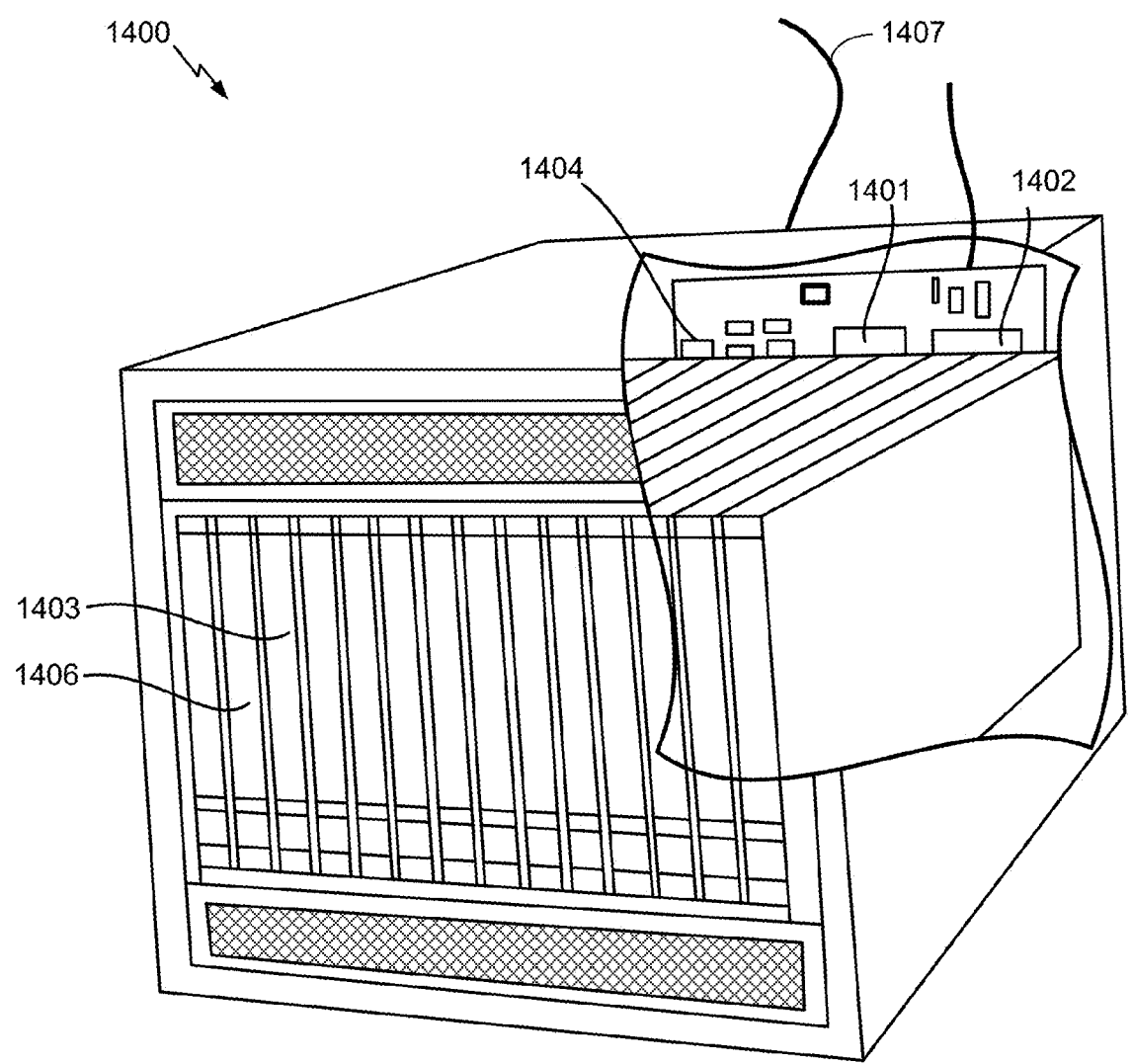
FIG. 20 illustrates a server in accordance with an aspect of the disclosure.

The various aspects may be implemented on any of a variety of commercially available server devices, such as server 1400 illustrated in FIG. 20. In an example, the server 1400 may correspond to one example configuration of the location server 170, the E-SMLC 355, 814, 824 or 1208, the SGW 230, the PDG 235, the E-SLP 335, the H-SLP 812 or 1214, or a PDE, SMLC, SAS or other SLP etc. described above. In FIG. 20, the server 1400 includes a processor 1401 coupled to volatile memory 1402 and a large capacity nonvolatile memory, such as a disk drive 1403. The server 1400 may also include a floppy disc drive, compact disc (CD) or DVD disc drive 1406 coupled to the processor 1401. The server 1400 may also include network access ports 1404 coupled to the processor 1401 for establishing data connections with a network 1407, such as a local area network coupled to other broadcast system computers and servers or to the Internet. In context with FIG. 19, the server 1400 of FIG. 20 illustrates one example implementation of the communication device 1300, whereby the logic configured to transmit and/or receive information 1305 corresponds to the network access ports 1404 used by the server 1400 to communicate with the network 1407, the logic configured to process information 1310 corresponds to the processor 1401, and the logic configuration to store information 1315 corresponds to any combination of the volatile memory 1402, the disk drive 1403 and/or the disc drive 1406. The optional logic configured to present information 1320 and the optional logic configured to receive local user input 1325 are not shown explicitly in FIG. 20 and may or may not be included therein. Thus, FIG. 20 helps to demonstrate that the communication device 1300 may be implemented as a server, in addition to a positioning beacon implementation as in FIG. 17.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

While various implementations described above may refer to network elements and/or utilize nomenclature specific to one or more network technologies, the techniques described herein are not intended to be limited to a specific technology and may be applied to any suitable technology or combination thereof, whether presently existing or developed in the future.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" or "one or more of" indicates a disjunctive list such that, for example, a list of "at least one of A, B, or C" or "one or more of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the embodiments. Also, a number of steps may be undertaken before, during, or after the above elements are considered. Accordingly, the above description does not bound the scope of the claims Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

Examples of embodiments on non-transitory processor-readable medium are provided in the following example claims.

1. A non-transitory processor-readable medium comprising processor-executable instructions configured to cause a processor to:
   establish a wireless backhaul connection from a positioning beacon to a communication network;
   receive scheduling information for a positioning reference signal (PRS) from the communication network over the wireless backhaul connection; and
   transmit the PRS according to the scheduling information.

2. The processor-readable medium of claim 1, further comprising instructions configured to cause the processor to:
   implement a User Equipment (UE) module and a Home eNodeB (HeNB) module:
   establish, by the UE module to a Packet Data Network Gateway (PDG) in the communication network, the wireless backhaul connection with support for IP connectivity; and
   transmit the PRS via the HeNB module.

3. The processor-readable medium of claim 2, further comprising instructions configured to cause the processor to:
   establish a secure IP connection from the HeNB module to a security Gateway (SeGW) in the communication network using the wireless backhaul connection to the PDG;
   access an HeNB Management System (HeMS) from the SeGW;
   register the HeNB module with the HeMS;
   send first information for the positioning beacon to the HeMS; and
   receive second information for the positioning beacon from the HeMS.

4. The processor-readable medium of claim 3, wherein the first information for the positioning beacon comprises a location or the scheduling information for the PRS or combination thereof and the second information for the positioning beacon comprises a tracking area code (TAC), a cell identity (CI), a location, or the scheduling information for the PRS or combination thereof.

5. The processor-readable medium of claim 3, further comprising instructions configured to cause the processor to:
   establish a signaling connection to an HeNB Gateway (HeNB GW) and a Mobility Management Entity (MME) using the secure IP connection to the SeGW;
   access a location server from either the MME or the SeGW; and
   receive third information and/or send fourth information for the positioning beacon from and/or to the location server.
6. The processor-readable medium of claim 5, wherein the instructions configured to cause the processor to receive and/or send the third information or the fourth information, respectively, for the positioning beacon comprise instructions configured to cause the processor to receive and/or send messages according to an LTE Positioning Protocol A (LPPa) defined by 3GPP.
7. The processor-readable medium of claim 5, wherein the third information comprises the scheduling information for the PRS.
8. The processor-readable medium of claim 5, wherein the fourth information comprises a Tracking Area Code (TAC), a Cell Identity (CI), a location, or the scheduling information for the PRS or combination thereof.
9. The processor-readable medium of claim 2, wherein the UE module is further configured to inhibit support of non-location service(s).
10. The processor-readable medium of claim 1, further comprising instructions configured to cause the processor to establish the wireless backhaul connection to a core network for Long Term Evolution (LTE) wireless technology defined by the 3rd Generation Partnership Project (3GPP).
11. The processor-readable medium of claim 1, wherein the PRS supports location of a User Equipment (UE) according to Observed Time Difference Of Arrival (OTDOA).
12. The processor-readable medium of claim 1, further comprising instructions configured to cause the processor to switch between a normal PRS mode and an emergency PRS mode in response to the scheduling information.
13. The processor-readable medium of claim 1, further comprising instructions configured to cause the processor to determine a location for the positioning beacon based at least in part on communication, via the wireless backhaul connection, with a location server in the communication network.
14. The processor-readable medium of claim 13, wherein the instructions configured to cause the processor to determine a location for the positioning beacon comprise instructions configured to cause the processor to communicate with an Evolved Serving Mobile Location Center (E-SMLC) according to a Long Term Evolution (LTE) control plane protocol.
14. The processor-readable medium of claim 13, wherein the instructions configured to cause the processor to determine a location for the positioning beacon comprise instructions configured to cause the processor to communicate with a Secure User Plane Location (SUPL) Location Platform (SLP) according to a SUPL protocol defined by Open Mobile Alliance (OMA).
16. The processor-readable medium of claim 1, wherein the positioning beacon comprises a Long Term Evolution (LTE) Relay Node (RN), and wherein the instructions configured to cause the processor to establish the wireless backhaul connection comprise instructions configured to cause the processor to establish an Internet Protocol connection to an LTE Donor eNodeB (DeNB) in a radio access network (RAN) for the communication network.
17. The processor-readable medium of claim 16, further comprising instructions configured to cause the processor to:
   access an Operations and Maintenance (O&M) function from the DeNB;
   send fifth information for the positioning beacon to the HeMS, the fifth information comprising an identity for the DeNB, a location, or the scheduling information for the PRS or combination thereof; and
   receive sixth information for the positioning beacon from the HeMS, the sixth information comprising a tracking area code (TAC), a cell identity (CI), a location, or the scheduling information for the PRS or combination thereof.
18. The processor-readable medium of claim 16, further comprising instructions configured to cause the processor to:
   accessing a location server from the DeNB; and
   send and/or receive seventh information for the positioning beacon to and/or from the location server according to an LTE Positioning Protocol A (LPPa) defined by 3GPP.
19. The processor-readable medium of claim 18, further comprising instructions to cause the processor to access the location server from the DeNB according to an LTE control plane location solution for 3GPP.
20. The processor-readable medium of claim 18, further comprising instructions to cause the processor to access the location server from the DeNB using IP signaling.

Examples of location server embodiments are provided in the following claims.

1. A location server comprising:
   means for obtaining configuration information for a positioning beacon, wherein the positioning beacon has a wireless backhaul connection to a communication network;
   means for receiving a request for positioning of a user equipment (UE) within communication range of the positioning beacon; and
   means for transmitting a positioning reference signal (PRS) scheduling adjustment instruction from the location server to the positioning beacon in response to the request for positioning of the UE and based on the configuration information.
2. The location server of claim 1 wherein the configuration information comprises a tracking area code, a cell identity, a location, PRS scheduling information, or a Donor eNodeB identity or combination thereof.
3. The location server of claim 2 wherein means for obtaining the configuration information are for obtaining the configuration information from the positioning beacon using an LTE Positioning Protocol A (LPPa) defined by 3GPP.
4. The location server of claim 1 wherein the means for transmitting are for transmitting the PRS scheduling adjustment instruction from the location server to the positioning beacon according to an LTE Positioning Protocol A (LPPa) defined by 3GPP.
5. The location server of claim 1 wherein the PRS scheduling adjustment instruction comprises an instruction to switch the positioning beacon from a normal PRS mode to an emergency PRS mode.

6. The location server of claim 1 wherein the location server comprises one of an Evolved Serving Mobile Location Center (E-SMLC) or a Secure User Plane Location (SUPL) Location Platform (SLP).

7. The location server of claim 1 wherein:
the positioning beacon comprises an LTE Relay Node (RN); and
the means for transmitting the PRS scheduling adjustment instruction are for transmitting the PRS scheduling adjustment instruction to the RN through an LTE Donor eNodeB (DeNB) associated with the RN.

8. The location server of claim 1 wherein the positioning beacon comprises an LTE eNodeB beacon containing a UE function and the means for transmitting the PRS scheduling adjustment instruction are for transmitting the PRS scheduling adjustment instruction to the LTE eNodeB beacon using the wireless backhaul connection to the UE function.

Further examples of location server embodiments are provided in the following example claims.

1. A location server comprising:
a memory storing instructions; and
a processor coupled to the memory and configured to execute the instructions to:
obtain configuration information for a positioning beacon, wherein the positioning beacon has a wireless backhaul connection to a communication network;
receive a request for positioning of a user equipment (UE) within communication range of the positioning beacon; and
transmit a positioning reference signal (PRS) scheduling adjustment instruction to the positioning beacon in response to receiving the request for positioning of the UE and based on the configuration information.

2. The location server of claim 1 wherein the configuration information comprises a tracking area code, a cell identity, a location, PRS scheduling information, or a Donor eNodeB identity or combination thereof.

3. The location server of claim 2 wherein the instructions configured to cause the processor to obtain the configuration information are configured to cause the processor to obtain the configuration information from the positioning beacon using an LTE Positioning Protocol A (LPPa) defined by 3GPP.

4. The location server of claim 1 wherein the instructions configured to cause the processor to transmit the PRS scheduling adjustment instruction are configured to cause the processor to transmit the PRS scheduling adjustment instruction to the positioning beacon according to an LTE Positioning Protocol A (LPPa) defined by 3GPP.

5. The location server of claim 1 wherein the PRS scheduling adjustment instruction comprises an instruction to switch the positioning beacon from a normal PRS mode to an emergency PRS mode.

6. The location server of claim 1 wherein the location server comprises one of an Evolved Serving Mobile Location Center (E-SMLC) or a Secure User Plane Location (SUPL) Location Platform (SLP).

7. The location server of claim 1 wherein:
the positioning beacon comprises an LTE Relay Node (RN); and
the instructions configured to cause the processor to transmit the PRS scheduling adjustment instruction are configured to cause the processor to transmit the PRS scheduling adjustment instruction to the RN through an LTE Donor eNodeB (DeNB) associated with the RN.

8. The location server of claim 1 wherein the positioning beacon comprises an LTE eNodeB beacon containing a UE function and the instructions configured to cause the processor to transmit the PRS scheduling adjustment instruction are configured to cause the processor to transmit the PRS scheduling adjustment instruction to the LTE eNodeB beacon using the wireless backhaul connection to the UE function.

Further examples of non-transitory processor-readable media embodiments are provided in the following example claims.

1. A non-transitory processor-readable medium comprising processor-executable instructions configured to cause a processor to:
obtain configuration information for a positioning beacon, wherein the positioning beacon has a wireless backhaul connection to a communication network;
receive a request for positioning of a user equipment (UE) within communication range of the positioning beacon; and
transmit a positioning reference signal (PRS) scheduling adjustment instruction to the positioning beacon in response to receiving the request for positioning of the UE and based on the configuration information.

2. The processor-readable medium of claim 1 wherein the configuration information comprises a tracking area code, a cell identity, a location, PRS scheduling information, or a Donor eNodeB identity or a combination thereof.

3. The processor-readable medium of claim 2 wherein the instructions configured to cause the processor to obtain the configuration information are configured to cause the processor to obtain the configuration information from the positioning beacon using an LTE Positioning Protocol A (LPPa) defined by 3GPP.

4. The processor-readable medium of claim 1 wherein the instructions configured to cause the processor to transmit the PRS scheduling adjustment instruction are configured to cause the processor to transmit the PRS scheduling adjustment instruction to the positioning beacon according to an LTE Positioning Protocol A (LPPa) defined by 3GPP.

5. The processor-readable medium of claim 1 wherein the PRS scheduling adjustment instruction comprises an instruction to switch the positioning beacon from a normal PRS mode to an emergency PRS mode.

6. The processor-readable medium of claim 1 wherein the location server comprises one of an Evolved Serving Mobile Location Center (E-SMLC) or a Secure User Plane Location (SUPL) Location Platform (SLP).

7. The processor-readable medium of claim 1 wherein:
the positioning beacon comprises an LTE Relay Node (RN); and
the instructions configured to cause the processor to transmit the PRS scheduling adjustment instruction are configured to cause the processor to transmit the PRS scheduling adjustment instruction to the RN through an LTE Donor eNodeB (DeNB) associated with the RN.

8. The processor-readable medium of claim 1 wherein the positioning beacon comprises an LTE eNodeB beacon containing a UE function and the instructions configured to cause the processor to transmit the PRS scheduling adjustment instruction are configured to cause the processor to transmit the PRS scheduling adjustment instruction to the LTE eNodeB beacon using the wireless backhaul connection to the UE function.

What is claimed is:

1. A method for providing positioning reference signals at a positioning beacon, the method comprising:
   establishing, at a User Equipment (UE) unit of the positioning beacon, a wireless backhaul connection to a communication network;
   receiving, at the UE unit of the positioning beacon, scheduling information for a positioning reference signal (PRS) from the communication network over the wireless backhaul connection;
   transmitting the scheduling information from the UE unit to a Home Evolved Node B (HeNB) unit via a wired connection; and
   transmitting, from the Home Evolved Node B (HeNB) unit of the positioning beacon, the PRS according to the scheduling information.

2. The method of claim 1, wherein the establishing comprises establishing, by the UE unit to a Packet Data Network Gateway (PDG) in the communication network, the wireless backhaul connection with support for Internet Protocol (IP) connectivity.

3. The method of claim 2, further comprising:
   establishing a secure IP connection to a security Gateway (SeGW) in the communication network using the wireless backhaul connection to the PDG;
   accessing an HeNB Management System (HeMS) from the SeGW;
   registering the positioning beacon with the HeMS;
   sending first information for the positioning beacon to the HeMS; and
   receiving second information for the positioning beacon from the HeMS.

4. The method of claim 3, wherein the second information for the positioning beacon comprises a tracking area code (TAC), a cell identity (CI), a location, or the scheduling information for the PRS or combination thereof.

5. The method of claim 3, wherein the first information for the positioning beacon comprises a location or the scheduling information for the PRS or combination thereof.

6. The method of claim 3, further comprising:
   establishing a signaling connection to an HeNB Gateway (HeNB GW) and a Mobility Management Entity (MME) using the secure IP connection to the SeGW;
   accessing a location server from either the MME or the SeGW; and
   sending and/or receiving third information for the positioning beacon to and/or from the location server.

7. The method of claim 6, wherein the sending and/or receiving the third information for the positioning beacon to and/or from the location server comprises sending and/or receiving messages according to LTE Positioning Protocol A (LPPa) defined by 3GPP.

8. The method of claim 6, wherein the third information received from the location server comprises the scheduling information for the PRS.

9. The method of claim 6, wherein the third information sent to the location server comprises a Tracking Area Code (TAC), a Cell Identity (CI), a location, or the scheduling information for the PRS or combination thereof.

10. The method of claim 6, wherein the location server is accessed from the MME according to an LTE control plane location solution for 3 GPP and wherein the location server comprises an Evolved Serving Mobile Location Center (E-SMLC).

11. The method of claim 6, wherein the location server is accessed from the SeGW and wherein the location server comprises a Home SLP (H-SLP) or a Discovered SLP (D-SLP).

12. The method of claim 1, further comprising the UE unit inhibiting support of non-location service(s).

13. The method of claim 1, wherein the communication network is a core network for Long Term Evolution (LTE) wireless technology defined by the 3rd Generation Partnership Project (3GPP).

14. The method of claim 1, wherein the PRS supports location of a User Equipment (UE) according to Observed Time Difference Of Arrival (OTDOA).

15. The method of claim 1, further comprising switching between a normal PRS mode and an emergency PRS mode in response to the scheduling information.

16. The method of claim 1, further comprising:
   using the wireless backhaul connection to have a communication with a location server in the communication network; and
   determining a location for the positioning beacon based at least in part on the communication with the location server.

17. The method of claim 16, wherein the location server is an Enhanced Serving Mobile Location Center (E-SMLC) and using the wireless backhaul connection comprises communicating with the location server according to a Long Term Evolution (LTE) control plane protocol.

18. The method of claim 16, wherein the location server is a Secure User Plane Location (SUPL) Location Platform (SLP) and using the wireless backhaul connection comprises communicating with the location server according to a SUPL protocol defined by Open Mobile Alliance (OMA).

19. The method of claim 1, wherein the positioning beacon comprises a Long Term Evolution (LTE) Relay Node (RN), the method further comprising:
   establishing an Internet Protocol connection, by the RN using the wireless backhaul connection, to an LTE Donor eNodeB (DeNB) in a radio access network (RAN) for the communication network.

20. The method of claim 19 further comprising:
   accessing an Operations and Maintenance (O&M) function from the DeNB;
   sending fourth information for the positioning beacon to the HeMS; and
   receiving fifth information for the positioning beacon from the HeMS.

21. The method of claim 20, wherein the fifth information comprises a tracking area code (TAC), a cell identity (CI), a location, or the scheduling information for the PRS or combination thereof.

22. The method of claim 20, wherein the fourth information comprises an identity for the DeNB, a location, or the scheduling information for the PRS or combination thereof.

23. The method of claim 19 further comprising:
   accessing a location server from the DeNB; and
   sending and/or receiving sixth information for the positioning beacon to and/or from the location server.

24. The method of claim 23, wherein the sending and/or receiving the sixth information for the positioning beacon with the location server comprises sending and/or receiving messages according to LTE Positioning Protocol A (LPPa) defined by 3GPP.

25. The method of claim 23, wherein the location server is accessed from the DeNB according to an LTE control plane location solution for 3GPP and wherein the location server comprises an Evolved Serving Mobile Location Center (E-SMLC).

26. The method of claim 23, wherein the location server is accessed from the DeNB using Internet Protocol (IP) signaling and wherein the location server comprises a Home SLP (H-SLP) or a Discovered SLP (D-SLP).

27. A positioning beacon for providing a positioning reference signal (PRS), the positioning beacon comprising:
means for establishing a wireless backhaul connection to a communication network;
means for receiving scheduling information for the PRS from the communication network over the wireless backhaul connection; and
means for transmitting the PRS according to the scheduling information,
wherein the means for transmitting the PRS is communicatively coupled to the means for receiving scheduling information via a wired connection and is configured to receive the scheduling information from the means for receiving scheduling information via the wired connection.

28. The positioning beacon of claim 27, wherein the means for establishing includes a User Equipment (UE) unit and the means for transmitting includes a Home eNodeB (HeNB) unit and wherein:
the means for establishing are for establishing, by the UE unit to a Packet Data Network Gateway (PDG) in the communication network, the wireless backhaul connection with support for Internet Protocol (IP) connectivity; and
the means for transmitting are for transmitting the PRS via the HeNB unit.

29. The positioning beacon of claim 28, further comprising:
means for establishing a secure IP connection from the HeNB unit to a security Gateway (SeGW) in the communication network using the wireless backhaul connection to the PDG;
means for accessing an HeNB Management System (HeMS) from the SeGW;
means for registering the HeNB unit with the HeMS;
means for sending first information for the positioning beacon to the HeMS; and
means for receiving second information for the positioning beacon from the HeMS.

30. The positioning beacon of claim 29, wherein the first information for the positioning beacon comprises a location or the scheduling information for the PRS or a combination thereof, and the second information for the positioning beacon comprises a tracking area code (TAC), a cell identity (CI), a location, or the scheduling information for the PRS or a combination thereof.

31. The positioning beacon of claim 29, further comprising:
means for establishing a signaling connection to an HeNB Gateway (HeNB GW) and a Mobility Management Entity (MME) using the secure IP connection to the SeGW;
means for accessing a location server from either the MME or the SeGW;
means for receiving third information for the positioning beacon from the location server; and
means for sending fourth information for the positioning beacon to the location server.

32. The positioning beacon of claim 31, wherein the means for receiving the third information and the means for sending the fourth information are for sending and receiving, respectively, messages according to LTE Positioning Protocol A (LPPa) defined by 3GPP.

33. The positioning beacon of claim 31, wherein the third information comprises the scheduling information for the PRS.

34. The positioning beacon of claim 31, wherein the fourth information comprises a Tracking Area Code (TAC), a Cell Identity (CI), a location, or the scheduling information for the PRS or combination thereof.

35. The positioning beacon of claim 28, wherein the UE unit is configured to inhibit support of non-location service(s).

36. The positioning beacon of claim 27, wherein the means for establishing are for establishing the wireless backhaul connection to a core network for Long Term Evolution (LTE) wireless technology defined by the 3rd Generation Partnership Project (3GPP).

37. The positioning beacon of claim 27, wherein the PRS supports location of a User Equipment (UE) according to Observed Time Difference Of Arrival (OTDOA).

38. The positioning beacon of claim 27, wherein the means for transmitting include means for switching between a normal PRS mode and an emergency PRS mode in response to the scheduling information.

39. The positioning beacon of claim 27, further comprising means for determining a location for the positioning beacon based at least in part on communication, via the wireless backhaul connection, with a location server in the communication network.

40. The positioning beacon of claim 39, wherein the means for determining are for communicating with an Evolved Serving Mobile Location Center (E-SMLC) according to a Long Term Evolution (LTE) control plane protocol.

41. The positioning beacon of claim 39, wherein the means for determining are for communicating with a Secure User Plane Location (SUPL) Location Platform (SLP) according to a SUPL protocol defined by Open Mobile Alliance (OMA).

42. The positioning beacon of claim 27, wherein the positioning beacon comprises a Long Term Evolution (LTE) Relay Node (RN), and wherein the means for establishing are for establishing an Internet Protocol connection to an LTE Donor eNodeB (DeNB) in a radio access network (RAN) for the communication network.

43. The positioning beacon of claim 42 further comprising:
means for accessing an Operations and Maintenance (O&M) function from the DeNB;
means for sending fifth information for the positioning beacon to the HeMS, the fifth information comprising an identity for the DeNB, a location, or the scheduling information for the PRS or combination thereof; and
means for receiving sixth information for the positioning beacon from the HeMS, the sixth information comprising a tracking area code (TAC), a cell identity (CI), a location, or the scheduling information for the PRS or combination thereof.

44. The positioning beacon of claim 42 further comprising:
means for accessing a location server from the DeNB; and
means sending and/or receiving seventh information for the positioning beacon to and/or from the location server according to LTE Positioning Protocol A (LPPa) defined by 3GPP.

45. The positioning beacon of claim 44, wherein the means for accessing the location server are for accessing the location server from the DeNB according to an LTE control plane location solution for 3GPP.

46. The positioning beacon of claim 44, wherein the means for accessing the location server are for accessing the location server from the DeNB using Internet Protocol (IP) signaling.

47. A positioning beacon for providing a positioning reference signal (PRS), the positioning beacon comprising:
a User Equipment (UE) unit configured to:
establish a wireless backhaul connection to a communication network;
receive scheduling information for the PRS from the communication network over the wireless backhaul connection; and
a Home eNodeB (HeNB) unit communicatively coupled via a wired connection to the UE unit and configured to:
receive the scheduling information from the UE unit via the wired connection; and
transmit the PRS according to the scheduling information.

48. The positioning beacon of claim 47, wherein to be able to establish the wireless backhaul connection to the communication network, the UE unit is configured to establish the wireless backhaul connection to a Packet Data Network Gateway (PDG) in the communication network with support for Internet Protocol (IP) connectivity.

49. The positioning beacon of claim 48, wherein the HeNB unit is further configured to:
establish a secure IP connection from the HeNB unit to a security Gateway (SeGW) in the communication network using the wireless backhaul connection to the PDG;
access an HeNB Management System (HeMS) from the SeGW;
register the HeNB unit with the HeMS;
send first information for the positioning beacon to the HeMS; and
receive second information for the positioning beacon from the HeMS.

50. The positioning beacon of claim 49, wherein the first information for the positioning beacon comprises a location or the scheduling information or combination thereof for the PRS and the second information for the positioning beacon comprises a tracking area code (TAC), a cell identity (CI), a location, or the scheduling information for the PRS or combination thereof.

51. The positioning beacon of claim 49, wherein the HeNB unit is further configured to:
establish a signaling connection to an HeNB Gateway (HeNB GW) and a Mobility Management Entity (MME) using the secure IP connection to the SeGW;
access a location server from either the MME or the SeGW;
receive third information for the positioning beacon from the location server;
send fourth information for the positioning beacon to the location server.

52. The positioning beacon of claim 51, wherein to be able to receive the third information and send the fourth information for the positioning beacon, the HeNB unit is configured to receive and send messages according to an LTE Positioning Protocol A (LPPa) defined by 3GPP.

53. The positioning beacon of claim 51, wherein the third information comprises the scheduling information for the PRS.

54. The positioning beacon of claim 51, wherein the fourth information comprises a Tracking Area Code (TAC), a Cell Identity (CI), a location, or the scheduling information for the PRS or combination thereof.

55. The positioning beacon of claim 47, wherein the UE unit is further configured to inhibit support of non-location service(s).

56. The positioning beacon of claim 47, wherein the UE unit is further configured to establish the wireless backhaul connection to a core network for Long Term Evolution (LTE) wireless technology defined by the 3rd Generation Partnership Project (3GPP).

57. The positioning beacon of claim 47, wherein the PRS supports location of a User Equipment (UE) according to Observed Time Difference Of Arrival (OTDOA).

58. The positioning beacon of claim 47, wherein the HeNB unit is further configured to switch between a normal PRS mode and an emergency PRS mode in response to the scheduling information.

59. The positioning beacon of claim 47, further comprising a wireless-based positioning unit configured to determine a location for the positioning beacon based at least in part on (1) a communication, via the wireless backhaul connection, with a location server in the communication network or (2) a communication with satellites of a satellite positioning system.

60. The positioning beacon of claim 59, wherein to be able to determine a location for the positioning beacon, the wireless-based positioning unit is configured to communicate with an Evolved Serving Mobile Location Center (E-SMLC) according to a Long Term Evolution (LTE) control plane protocol.

61. The positioning beacon of claim 59, wherein to be able to determine a location for the positioning beacon, the wireless-based positioning unit is configured to communicate with a Secure User Plane Location (SUPL) Location Platform (SLP) according to a SUPL protocol defined by Open Mobile Alliance (OMA).

62. The positioning beacon of claim 47, wherein the UE unit comprises a Long Term Evolution (LTE) Relay Node (RN), and wherein to be able to establish the wireless backhaul connection, the UE unit is configured to establish an Internet Protocol connection to an LTE Donor eNodeB (DeNB) in a radio access network (RAN) for the communication network.

63. The positioning beacon of claim 62, wherein the UE unit is further configured to:
access an Operations and Maintenance (O&M) function from the DeNB;
send fifth information for the positioning beacon to the HeMS, the fifth information comprising an identity for the DeNB, a location, or the scheduling information for the PRS or combination thereof; and
receive sixth information for the positioning beacon from the HeMS, the sixth information comprising a tracking area code (TAC), a cell identity (CI), a location, or the scheduling information for the PRS or combination thereof.

64. The positioning beacon of claim 62, wherein the UE unit is further configured to:
access a location server from the DeNB; and
send and/or receive seventh information for the positioning beacon to and/or from the location server according to an LTE Positioning Protocol A (LPPa) defined by 3GPP.

65. The positioning beacon of claim 64, wherein to be able to access the location server from the DeNB, the UE unit is configured to operate according to an LTE control plane location solution for 3GPP.

66. The positioning beacon of claim 64, wherein the UE unit is configured to access the location server from the DeNB using Internet Protocol (IP) signaling.

* * * * *